(12) United States Patent
Gundersen et al.

(10) Patent No.: US 12,366,152 B2
(45) Date of Patent: Jul. 22, 2025

(54) WELL CONSTRUCTION WORKSTATION AND CONTROL

(71) Applicant: SCHLUMBERGER TECHNOLOGY CORPORATION, Sugar Land, TX (US)

(72) Inventors: Paal Gundersen, Kristiansand (NO); Anstein Jorud, Kristiansand (NO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 26 days.

(21) Appl. No.: 17/044,409

(22) PCT Filed: May 22, 2019

(86) PCT No.: PCT/US2019/033425
§ 371 (c)(1),
(2) Date: Oct. 1, 2020

(87) PCT Pub. No.: WO2019/236287
PCT Pub. Date: Dec. 12, 2019

(65) Prior Publication Data
US 2021/0115776 A1    Apr. 22, 2021

Related U.S. Application Data

(60) Provisional application No. 62/680,025, filed on Jun. 4, 2018.

(51) Int. Cl.
*E21B 44/00* (2006.01)
*E21B 19/16* (2006.01)
(Continued)

(52) U.S. Cl.
CPC ............ *E21B 44/00* (2013.01); *E21B 19/165* (2013.01); *E21B 41/00* (2013.01); *G05B 15/02* (2013.01);
(Continued)

(58) Field of Classification Search
CPC ........ E21B 44/00; E21B 41/00; E21B 19/165; G05B 15/02; G06F 3/0482;
(Continued)

(56) References Cited

U.S. PATENT DOCUMENTS 662,110 A    11/1900  Bell
6,484,816 B1  11/2002  Koederitz
(Continued)

FOREIGN PATENT DOCUMENTS

WO   WO-2016073319 A1 *  5/2016  ............. E21B 44/00
WO   WO-2017053491 A1 *  3/2017  ............ E21B 19/008
(Continued)

*Primary Examiner* — Andrew L Tank
(74) *Attorney, Agent, or Firm* — Jeffrey D. Frantz

(57) ABSTRACT

Apparatus and methods for performing well construction control. An example apparatus may be or include a control system operable to control a well construction system for performing well construction operations at an oil/gas wellsite, wherein the well construction system includes multiple pieces of equipment. The control system may have a processor and memory storing a computer program code, a touchscreen operable via finger contact with the touchscreen by a human wellsite operator to enter control commands to control automated operation of one or more pieces of equipment, and a video output device operable to display information indicative of operational status of the well construction system.

19 Claims, 15 Drawing Sheets

(51) Int. Cl.
  *E21B 41/00* (2006.01)
  *G05B 15/02* (2006.01)
  *G06F 3/0482* (2013.01)
  *G06F 3/04847* (2022.01)
  *G06F 3/04883* (2022.01)
  *G06F 3/04886* (2022.01)
  *G08B 21/18* (2006.01)
  *H04N 7/18* (2006.01)

(52) U.S. Cl.
  CPC ........ *G06F 3/0482* (2013.01); *G06F 3/04847* (2013.01); *G06F 3/04883* (2013.01); *G06F 3/04886* (2013.01); *G08B 21/187* (2013.01); *H04N 7/181* (2013.01)

(58) Field of Classification Search
  CPC ............. G06F 3/04847; G06F 3/04883; G06F 3/04886; G06F 3/04833; G08B 21/187; H04N 7/181
  See application file for complete search history.

(56) References Cited

U.S. PATENT DOCUMENTS

| | | | |
|---|---|---|---|
| 6,892,812 B2 | 5/2005 | Niedermayr et al. | |
| 6,896,055 B2 | 5/2005 | Koithan | |
| 6,931,621 B2 | 8/2005 | Green et al. | |
| 7,172,037 B2 | 2/2007 | Dashevskiy et al. | |
| 7,264,050 B2 | 9/2007 | Koithan et al. | |
| 7,357,196 B2 | 4/2008 | Goldman et al. | |
| 7,860,593 B2 | 12/2010 | Boone | |
| 7,895,220 B2 | 2/2011 | Evans et al. | |
| 7,938,197 B2 | 5/2011 | Boone et al. | |
| 7,945,488 B2* | 5/2011 | Karr | E21B 47/00 705/28 |
| 8,103,493 B2 | 1/2012 | Sagert et al. | |
| 8,121,971 B2* | 2/2012 | Edwards | E21B 44/00 706/50 |
| 8,131,510 B2 | 3/2012 | Wingky et al. | |
| 8,145,464 B2 | 3/2012 | Arnegaard et al. | |
| 8,215,417 B2* | 7/2012 | Annaiyappa | E21B 15/00 175/24 |
| 8,250,816 B2 | 8/2012 | Donnally et al. | |
| 8,286,726 B2* | 10/2012 | Muona | E21B 44/00 175/27 |
| 8,301,386 B1 | 10/2012 | Redmond et al. | |
| 8,386,059 B2 | 2/2013 | Boone | |
| 8,590,635 B2 | 11/2013 | Koederitz | |
| 8,615,364 B1* | 12/2013 | Selman | E21B 44/00 702/9 |
| 8,718,802 B2 | 5/2014 | Boone | |
| 8,812,334 B2 | 8/2014 | Givens et al. | |
| 9,027,671 B2 | 5/2015 | Koederitz | |
| 9,091,773 B1* | 7/2015 | Selman | E21B 7/04 |
| 9,223,594 B2 | 12/2015 | Brown et al. | |
| 9,285,794 B2 | 3/2016 | Wang et al. | |
| 9,322,247 B2 | 4/2016 | Rojas et al. | |
| 9,410,417 B2 | 8/2016 | Reckmann et al. | |
| 9,424,667 B2* | 8/2016 | Pena | G06T 11/206 |
| 9,429,009 B2 | 8/2016 | Paulk et al. | |
| 9,436,173 B2 | 9/2016 | Wang et al. | |
| 9,506,336 B2 | 11/2016 | Orbell | |
| 9,528,364 B2 | 12/2016 | Samuel et al. | |
| 9,593,567 B2 | 3/2017 | Pink et al. | |
| 9,598,947 B2 | 3/2017 | Wang et al. | |
| 9,645,559 B1* | 5/2017 | Ward | E21B 41/00 |
| 9,784,089 B2 | 10/2017 | Boone et al. | |
| 9,803,473 B2 | 10/2017 | Orban et al. | |
| 9,828,845 B2 | 11/2017 | Kpetehoto et al. | |
| 9,896,925 B2 | 2/2018 | Hernandez et al. | |
| 9,933,919 B2 | 4/2018 | Raja et al. | |
| 9,934,338 B2 | 4/2018 | Germain et al. | |
| 9,946,445 B2 | 4/2018 | Whalley | |
| 9,995,129 B2 | 6/2018 | Dykstra et al. | |
| 10,049,474 B2 | 8/2018 | Germain et al. | |
| 10,067,973 B2 | 9/2018 | Moore | |
| 10,113,408 B2 | 10/2018 | Pobedinski et al. | |
| 10,138,722 B2 | 11/2018 | Magnuson | |
| 10,161,226 B2 | 12/2018 | Bagnaro | |
| 10,198,159 B2 | 2/2019 | Ziegler et al. | |
| 10,202,837 B2 | 2/2019 | Ng et al. | |
| 10,209,400 B2 | 2/2019 | Bermudez Martinez et al. | |
| 10,221,671 B1 | 3/2019 | Zhang | |
| 10,233,728 B2 | 3/2019 | Kristjansson et al. | |
| 10,253,612 B2 | 4/2019 | Dashevskiy et al. | |
| 10,260,332 B2 | 4/2019 | Israel et al. | |
| 10,273,752 B2 | 4/2019 | Mebane, III | |
| 10,294,770 B2 | 5/2019 | Anghelescu et al. | |
| 10,301,923 B2 | 5/2019 | Andresen et al. | |
| 10,345,771 B2 | 7/2019 | Anno et al. | |
| 10,353,358 B2 | 7/2019 | Tunc et al. | |
| 10,392,918 B2 | 8/2019 | Harkless et al. | |
| 10,422,188 B2 | 9/2019 | Zheng et al. | |
| 10,443,325 B2 | 10/2019 | Zheng et al. | |
| 10,487,641 B2 | 11/2019 | Zheng et al. | |
| 10,550,640 B2 | 2/2020 | Orban et al. | |
| 10,550,642 B2 | 2/2020 | Zheng et al. | |
| 10,612,359 B2 | 4/2020 | Zheng et al. | |
| 10,623,703 B2 | 4/2020 | Pettersen et al. | |
| 10,677,045 B2 | 6/2020 | Saad | |
| 10,705,499 B2 | 7/2020 | Rojas et al. | |
| 10,718,162 B2 | 7/2020 | Van Duivendijk et al. | |
| 10,767,462 B2 | 9/2020 | Ng et al. | |
| 10,781,667 B2* | 9/2020 | Berry | E21B 41/00 |
| 10,782,677 B2 | 9/2020 | Zheng et al. | |
| 10,782,679 B2 | 9/2020 | Zheng et al. | |
| 10,830,921 B2 | 11/2020 | Bermudez Martinez et al. | |
| 10,851,645 B2 | 12/2020 | Mandava et al. | |
| 10,890,060 B2 | 1/2021 | Jorud et al. | |
| 10,907,463 B2 | 2/2021 | Zheng et al. | |
| 10,907,465 B2 | 2/2021 | Hay et al. | |
| 10,995,602 B2* | 5/2021 | Benson | E21B 47/047 |
| 2002/0060093 A1* | 5/2002 | Womer | E21B 44/00 175/24 |
| 2002/0103630 A1 | 8/2002 | Aldred et al. | |
| 2005/0060096 A1* | 3/2005 | Hutchinson | E21B 44/00 702/6 |
| 2005/0209912 A1* | 9/2005 | Veeningen | G06Q 10/10 705/7.12 |
| 2008/0173480 A1* | 7/2008 | Annaiyappa | E21B 15/00 175/24 |
| 2010/0147510 A1* | 6/2010 | Kwok | E21B 41/00 700/275 |
| 2011/0067882 A1* | 3/2011 | Yeriazarian | E21B 43/14 703/10 |
| 2013/0144531 A1* | 6/2013 | Johnston | E21B 44/00 702/9 |
| 2013/0325725 A1* | 12/2013 | Schoen | G01V 99/00 705/301 |
| 2014/0116776 A1* | 5/2014 | Marx | G06N 5/02 706/11 |
| 2014/0151120 A1* | 6/2014 | Ledbetter | E21B 21/16 175/57 |
| 2014/0246238 A1* | 9/2014 | Abbassian | E21B 47/005 175/40 |
| 2015/0029034 A1* | 1/2015 | Abbassian | E21B 47/12 340/853.2 |
| 2015/0134257 A1* | 5/2015 | Erge | E21B 49/003 702/9 |
| 2015/0186574 A1 | 7/2015 | Huang et al. | |
| 2015/0241871 A1 | 8/2015 | Yoshino et al. | |
| 2015/0294258 A1* | 10/2015 | Hildebrand | E21B 45/00 705/7.15 |
| 2015/0300151 A1* | 10/2015 | Mohaghegh | E21B 47/07 702/9 |
| 2015/0330204 A1* | 11/2015 | Hildebrand | E21B 44/06 700/282 |
| 2016/0053604 A1* | 2/2016 | Abbassian | E21B 44/00 702/6 |
| 2016/0222775 A1 | 8/2016 | Tunc et al. | |
| 2016/0290119 A1* | 10/2016 | Tunc | G05B 19/0421 |
| 2016/0291201 A1 | 10/2016 | Tunc et al. | |

(56) References Cited

U.S. PATENT DOCUMENTS

| | | |
|---|---|---|
| 2017/0037691 A1* | 2/2017 | Savage .................. E21B 44/06 |
| 2017/0122092 A1 | 5/2017 | Harmer |
| 2017/0124248 A1 | 5/2017 | Whalley et al. |
| 2017/0159372 A1 | 6/2017 | Zheng et al. |
| 2017/0167853 A1 | 6/2017 | Zheng et al. |
| 2017/0220125 A1 | 8/2017 | Gooch et al. |
| 2017/0308802 A1 | 10/2017 | Ramsoy et al. |
| 2018/0094518 A1 | 4/2018 | Kpetehoto et al. |
| 2018/0135401 A1 | 5/2018 | Dykstra et al. |
| 2018/0149010 A1 | 5/2018 | Zheng et al. |
| 2018/0152319 A1 | 5/2018 | Rojas et al. |
| 2018/0156023 A1 | 6/2018 | Dykstra et al. |
| 2018/0163527 A1* | 6/2018 | Curry .................... E21B 44/00 |
| 2018/0283137 A1 | 10/2018 | Peyregne et al. |
| 2018/0283138 A1 | 10/2018 | Peyregne et al. |
| 2018/0298693 A1 | 10/2018 | Van Duivendijk et al. |
| 2018/0334887 A1 | 11/2018 | Dashevskiy et al. |
| 2018/0351952 A1 | 12/2018 | Rojas et al. |
| 2018/0355700 A1 | 12/2018 | Zheng et al. |
| 2018/0359130 A1 | 12/2018 | Zheng et al. |
| 2018/0359339 A1 | 12/2018 | Zheng et al. |
| 2019/0018871 A1 | 1/2019 | Zheng et al. |
| 2019/0032466 A1 | 1/2019 | Wilson et al. |
| 2019/0033845 A1 | 1/2019 | Cella et al. |
| 2019/0048703 A1 | 2/2019 | Samuel et al. |
| 2019/0048704 A1 | 2/2019 | Kumaran |
| 2019/0078045 A1 | 3/2019 | Khan |
| 2019/0078425 A1 | 3/2019 | Gillan |
| 2019/0078427 A1 | 3/2019 | Gillan |
| 2019/0078428 A1 | 3/2019 | Fang et al. |
| 2019/0106978 A1 | 4/2019 | Etaje et al. |
| 2019/0106982 A1 | 4/2019 | Willerth et al. |
| 2019/0128079 A1 | 5/2019 | Omrani |
| 2019/0136650 A1 | 5/2019 | Zheng et al. |
| 2019/0234202 A1 | 8/2019 | Orban et al. |
| 2019/0242219 A1* | 8/2019 | Valleru .................. E21B 44/00 |
| 2019/0345811 A1 | 11/2019 | Orban |
| 2019/0356696 A1 | 11/2019 | Rojas et al. |
| 2019/0368299 A1 | 12/2019 | Jorud |
| 2020/0003046 A1 | 1/2020 | Zheng et al. |
| 2020/0012240 A1 | 1/2020 | Tunc et al. |
| 2020/0040672 A1 | 2/2020 | Zheng et al. |
| 2020/0057569 A1 | 2/2020 | Rojas et al. |
| 2020/0059474 A1 | 2/2020 | Rojas et al. |
| 2020/0102795 A1 | 4/2020 | Zheng et al. |
| 2020/0157893 A1 | 5/2020 | Jorud |
| 2020/0173233 A1 | 6/2020 | Orban et al. |
| 2020/0173235 A1 | 6/2020 | Zheng et al. |
| 2020/0244928 A1 | 7/2020 | Pettersen et al. |
| 2020/0277847 A1 | 9/2020 | Rojas et al. |
| 2020/0277849 A1 | 9/2020 | Harmer |
| 2020/0278193 A1 | 9/2020 | Orban et al. |
| 2020/0300081 A1 | 9/2020 | Saad |
| 2020/0347714 A1 | 11/2020 | Kilic et al. |
| 2021/0002995 A1 | 1/2021 | Botnan et al. |
| 2021/0010365 A1 | 1/2021 | Botnan et al. |
| 2021/0071486 A1 | 3/2021 | Botnan et al. |

FOREIGN PATENT DOCUMENTS

| | | | |
|---|---|---|---|
| WO | 2017116474 A1 | 7/2017 | |
| WO | 2017142540 A1 | 8/2017 | |
| WO | 2017160993 A1 | 9/2017 | |
| WO | 2017187368 A1 | 11/2017 | |
| WO | 2017204655 A1 | 11/2017 | |
| WO | WO-2017190122 A1 * | 11/2017 | ............ E21B 15/00 |
| WO | 2018186745 A1 | 10/2018 | |
| WO | 2018213126 A1 | 11/2018 | |
| WO | 2019035848 A1 | 2/2019 | |
| WO | 2019066932 A1 | 4/2019 | |
| WO | 2019090029 A1 | 5/2019 | |
| WO | 2019236287 A1 | 12/2019 | |
| WO | 2020061134 A1 | 3/2020 | |
| WO | 2020086680 A1 | 4/2020 | |

* cited by examiner

WELL CONSTRUCTION WORKSTATION AND CONTROL

CROSS-REFERENCE TO RELATED APPLICATIONS

This application claims priority to and the benefit of U.S. Provisional Application No. 62/680,025, titled "WELL CONSTRUCTION WORKSTATION AND CONTROL," filed Jun. 4, 2018 and International Application No. PCT/US2019/033425 filed May 22, 2019 with the same title. Both applications are incorporated herein by reference.

BACKGROUND OF THE DISCLOSURE

Wells are generally drilled into the ground or ocean bed to recover natural deposits of oil, gas, and other materials that are trapped in subterranean formations. Such wells are drilled into the subterranean formations at the wellsite utilizing a well construction system having various surface and subterranean wellsite equipment operating in a coordinated manner. The wellsite equipment may be grouped into various subsystems, wherein each subsystem performs a different operation controlled by a corresponding local and/or a remotely located controller. The subsystems may include a rig control system, a fluid control system, a managed pressure drilling control system, a gas monitoring system, a closed-circuit television system, a choke pressure control system, and a well pressure control system, among other examples.

The wellsite equipment is monitored and controlled from a control center located at a wellsite surface. A typical control center contains a wellsite control station utilized by several human wellsite operators (e.g., drillers) to monitor and control the wellsite equipment. Although the equipment subsystems may operate in a coordinated manner, there is little or no communication between the subsystems and their controllers. Accordingly, monitoring and control of the wellsite equipment or equipment subsystems may be performed via corresponding control panels of the wellsite control station. Each control panel comprises an associated video output device (e.g., a video monitor) and a plurality of input devices (e.g., buttons, switches, joysticks, etc.).

Because there is no communication between the equipment subsystems, interactions and coordination between the various wellsite equipment are typically initiated by the wellsite operators. For example, the wellsite operators may monitor the equipment subsystems to identify operational and safety events and manually implement processes to counteract such events. Accordingly, a typical wellsite control center may be manned by multiple wellsite operators, each monitoring and controlling different wellsite equipment or equipment subsystem via a corresponding control panel. Relying on multiple wellsite operators to monitor and manually control the wellsite equipment increases cost and limits speed, efficiency, and safety of well construction operations.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a workstation operable to control a well construction system for performing well construction operations at an oil/gas wellsite. The workstation includes a chair for a human wellsite operator, a video output device disposed in association with the chair and operable to display information indicative of operational status of the well construction operations, and input devices disposed in association with the chair and operable for entering control commands for controlling the well construction system by the human wellsite operator while sitting in the chair. The input devices include a touchscreen operable via finger contact by the human wellsite operator. The touchscreen is operable to display multiple control screens each associated with a different piece of equipment of the well construction system. Each control screen is operable via finger contact with the touchscreen by the human wellsite operator to control the associated piece of equipment.

The present disclosure also introduces an apparatus including a control system operable to control a well construction system for performing well construction operations at an oil/gas wellsite. The well construction system includes multiple pieces of equipment. The control system includes a processor and memory storing a computer program code, a touchscreen operable via finger contact with the touchscreen by a human wellsite operator to enter control commands to control automated operation of one or more of the pieces of equipment, and a video output device operable to display information indicative of operational status of the well construction system.

The present disclosure also introduces a method including operating a workstation to control a well construction system to perform well construction operations at an oil/gas wellsite. Operating the workstation includes displaying on a video output device information indicative of operational status of the well construction operations, displaying on a touchscreen a selected one of multiple control screens each associated with a different piece of equipment of the well construction system, and receiving control commands from a human wellsite operator via finger contact with the touchscreen to control operation of the piece of equipment associated with the selected one of the control screens.

The present disclosure also introduces a method including operating a control system to control a well construction system to perform well construction operations at an oil/gas wellsite. The well construction system comprises multiple pieces of equipment. The control system includes a processor and memory storing a computer program code. Operating the control system includes receiving control commands from a human wellsite operator via finger contact with a touchscreen to control operation of a selected first one or more of the pieces of equipment, and displaying on a video output device information indicative of operational status of a selected second one or more of the pieces of equipment.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
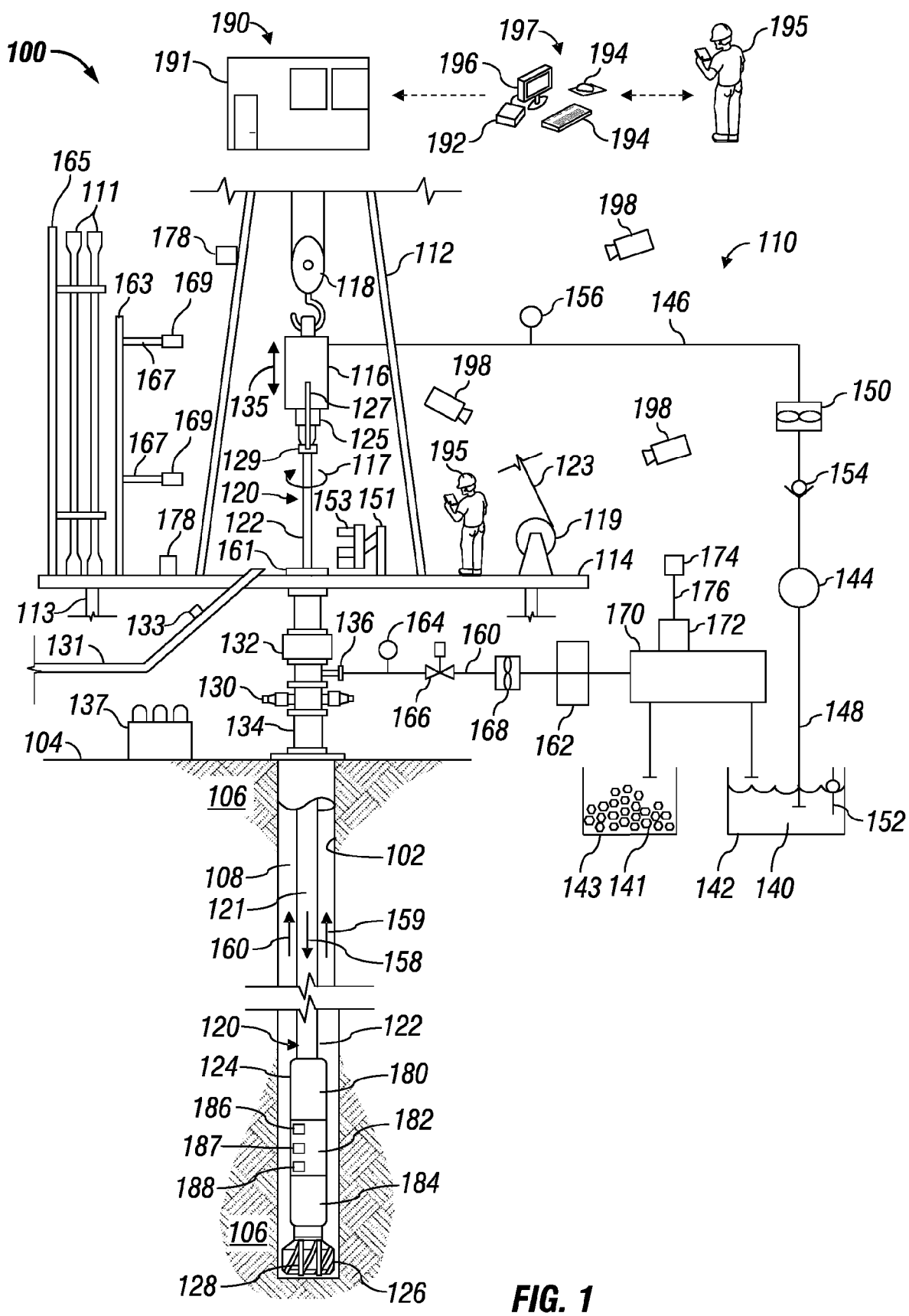
FIG. 1 is a schematic side view of at least a portion of an example implementation of apparatus according to one or more aspects of the present disclosure.

It is to be understood that the following disclosure describes many example implementations for different aspects introduced herein. Specific examples of components and arrangements are described below to simplify the present disclosure. These are merely examples, and are not intended to be limiting. In addition, the present disclosure may repeat reference numerals and/or letters in the various examples. This repetition is for simplicity and clarity, and does not in itself dictate a relationship between the various implementations described herein. Moreover, the formation of a first feature over or on a second feature in the description that follows may include implementations in which the first and second features are formed in direct contact, and may also include implementations in which additional features may be formed interposing the first and second features, such that the first and second features may not be in direct contact.

FIG. 1 is a schematic view of at least a portion of an example implementation of a well construction system 100 according to one or more aspects of the present disclosure. The well construction system 100 represents an example environment in which one or more aspects described below may be implemented. Although the well construction system 100 is depicted as an onshore implementation, the aspects described below are also applicable to offshore and inshore implementations.

The well construction system 100 is depicted in relation to a wellbore 102 formed by rotary and/or directional drilling from a wellsite surface 104 and extending into a subterranean formation 106. The well construction system 100 includes surface equipment 110 located at the wellsite surface 104 and a drill string 120 suspended within the wellbore 102. The surface equipment 110 may include a mast, a derrick, and/or another wellsite structure 112 disposed over a rig floor 114. The drill string 120 may be suspended within the wellbore 102 from the wellsite structure 112. The wellsite structure 112 and the rig floor 114 are collectively supported over the wellbore 102 by legs and/or other support structures 113.

The drill string 120 may comprise a bottom-hole assembly (BHA) 124 and means 122 for conveying the BHA 124 within the wellbore 102. The conveyance means 122 may comprise drill pipe, heavy-weight drill pipe (HWDP), wired drill pipe (WDP), tough logging condition (TLC) pipe, coiled tubing, and/or other means for conveying the BHA 124 within the wellbore 102. A downhole end of the BHA 124 may include or be coupled to a drill bit 126. Rotation of the drill bit 126 and the weight of the drill string 120 collectively operate to form the wellbore 102. The drill bit 126 may be rotated from the wellsite surface 104 and/or via a downhole mud motor (not shown) connected with the drill bit 126.

The BHA 124 may also include various downhole tools 180, 182, 184. One or more of such downhole tools 180, 182, 184 may be or comprise an acoustic tool, a density tool, a directional drilling tool, an electromagnetic (EM) tool, a formation sampling tool, a formation testing tool, a gravity tool, a monitoring tool, a neutron tool, a nuclear tool, a photoelectric factor tool, a porosity tool, a reservoir characterization tool, a resistivity tool, a sampling while drilling (SWD) tool, a seismic tool, a surveying tool, and/or other measuring-while-drilling (MWD) or logging-while-drilling (LWD) tools.

One or more of the downhole tools 180, 182, 184 may be or comprise an MWD or LWD tool comprising a sensor package 186 operable for the acquisition of measurement data pertaining to the BHA 124, the wellbore 102, and/or the formation 106. One or more of the downhole tools 180, 182, 184 and/or another portion of the BHA 124 may also comprise a telemetry device 187 operable for communication with the surface equipment 110, such as via mud-pulse telemetry. One or more of the downhole tools 180, 182, 184 and/or another portion of the BHA 124 may also comprise a downhole processing device 188 operable to receive, process, and/or store information received from the surface equipment 110, the sensor package 186, and/or other portions of the BHA 124. The processing device 188 may also store executable programs and/or instructions, including for implementing one or more aspects of the operations described herein.

The wellsite structure 112 may support a top drive 116 operable to connect (perhaps indirectly) with an uphole end of the conveyance means 122, and to impart rotary motion 117 and vertical motion 135 to the drill string 120 and the drill bit 126. However, a kelly and rotary table (neither shown) may be utilized instead of or in addition to the top drive 116 to impart the rotary motion 117. The top drive 116 and the connected drill string 120 may be suspended from the wellsite structure 112 via hoisting equipment, which may include a traveling block 118, a crown block (not shown), and a draw works 119 storing a support cable or line 123. The crown block may be connected to or otherwise supported by the wellsite structure 112, and the traveling block 118 may be coupled with the top drive 116, such as via a hook. The draw works 119 may be mounted on or otherwise supported by the rig floor 114. The crown block and traveling block 118 comprise pulleys or sheaves around which the support line 123 is reeved to operatively connect the crown block, the traveling block 118, and the draw works 119 (and perhaps an anchor). The draw works 119 may thus selectively impart tension to the support line 123 to lift and lower the top drive 116, resulting in the vertical motion 135. The draw works 119 may comprise a drum, a frame, and a prime mover (e.g., an engine or motor) (not shown) operable to drive the drum to rotate and reel in the support line 123, causing the traveling block 118 and the top drive 116 to move upward. The draw works 119 may be operable to release the support line 123 via a controlled rotation of the drum, causing the traveling block 118 and the top drive 116 to move downward.

The top drive 116 may comprise a grabber, a swivel (neither shown), a tubular handling assembly 127 terminating with an elevator 129, and a drive shaft 125 operatively connected with a prime mover (not shown), such as via a gear box or transmission (not shown). The drill string 120 may be mechanically coupled to the drive shaft 125 with or without a sub saver between the drill string 120 and the drive shaft 125. The prime mover may be selectively operated to rotate the drive shaft 125 and the drill string 120 coupled with the drive shaft 125. Hence, during drilling operations, the top drive 116 in conjunction with operation of the draw works 119 may advance the drill string 120 into the formation 106 and form the wellbore 102. The tubular handling assembly 127 and the elevator 129 of the top drive 116 may handle tubulars (e.g., drill pipes, drill collars, casing joints, and the like) that are not mechanically coupled to the drive shaft 125. For example, when the drill string 120 is being tripped into or out of the wellbore 102, the elevator 129 may grasp the tubulars of the drill string 120 such that the tubulars may be raised and/or lowered via the hoisting equipment mechanically coupled to the top drive 116. The grabber may include a clamp that clamps onto a tubular when making up and/or breaking out a connection of a tubular with the drive shaft 125. The top drive 116 may have a guide system (not shown), such as rollers that track up and down a guide rail on the wellsite structure 112. The guide system may aid in keeping the top drive 116 aligned with the wellbore 102, and in preventing the top drive 116 from rotating during drilling by transferring reactive torque to the wellsite structure 112.

The well construction system 100 may further include a well control system for maintaining well pressure control. For example, the drill string 120 may be conveyed within the wellbore 102 through various blowout preventer (BOP) equipment disposed at the wellsite surface 104 on top of the wellbore 102 and perhaps below the rig floor 114. The BOP equipment may be operable to control pressure within the wellbore 102 via a series of pressure barriers (e.g., rams) between the wellbore 102 and the wellsite surface 104. The BOP equipment may include a BOP stack 130 and an annular fluid control device 132 (e.g., an annular preventer and/or a rotating control device (RCD)). The BOP equipment 130, 132 may be mounted on top of a wellhead 134. The well control system may further include a BOP control unit 137 (i.e., a BOP closing unit) operatively connected with the BOP equipment 130, 132 and operable to actuate, drive, or otherwise operate the BOP equipment 130, 132 to control the BOP equipment 130, 132. The BOP control unit 137 may be or comprise a hydraulic fluid power unit fluidly connected with the BOP equipment 130, 132 and selectively operable to hydraulically drive various portions (e.g., rams, valves) of the BOP equipment 130, 132. The well control system may further include a BOP control station (e.g., a BOP control station 370 shown in FIG. 5) for controlling the BOP control unit 137 and the BOP equipment 130, 132.

The well construction system 100 may further include a drilling fluid circulation system operable to circulate fluids between the surface equipment 110 and the drill bit 126 during drilling and other operations. For example, the drilling fluid circulation system may be operable to inject a drilling fluid from the wellsite surface 104 into the wellbore 102 via an internal fluid passage 121 extending longitudinally through the drill string 120. The drilling fluid circulation system may comprise a pit, a tank, and/or other fluid container 142 holding drilling fluid 140, and a pump 144 operable to move the drilling fluid 140 from the container 142 into the fluid passage 121 of the drill string 120 via a fluid conduit 146 extending from the pump 144 to the top drive 116 and an internal passage extending through the top drive 116. The fluid conduit 146 may comprise one or more of a pump discharge line, a stand pipe, a rotary hose, and a gooseneck (not shown) connected with a fluid inlet of the top drive 116. The pump 144 and the container 142 may be fluidly connected by a fluid conduit 148, such as a suction line.

A flow rate sensor 150 may be operatively connected along the fluid conduit 146 to measure flow rate of the drilling fluid 140 being pumped downhole. The flow rate sensor 150 may be operable to measure volumetric and/or mass flow rate of the drilling fluid 140. The flow rate sensor 150 may be an electrical flow rate sensor operable to generate an electrical signal and/or information indicative of the measured flow rate. The flow rate sensor 150 may be a Coriolis flowmeter, a turbine flowmeter, or an acoustic flowmeter, among other examples.

A fluid level sensor 152 may be mounted or otherwise disposed in association with the container 142, and may be operable to measure the level of the drilling fluid 140 within the container 142. The fluid level sensor 152 may be an electrical fluid level sensor operable to generate signals or information indicative of the amount (e.g., level, volume) of drilling fluid 140 within the container 142. The fluid level sensor 152 may comprise conductive, capacitive, vibrating, electromechanical, ultrasonic, microwave, nucleonic, and/or other example sensors. A flow check valve 154 may be connected downstream from the pump 144 to prevent the drilling or other fluids from backing up through the pump 144.

A pressure sensor 156 may be connected along the fluid conduit 146, such as to measure the pressure of the drilling fluid 140 being pumped downhole. The pressure sensor 156 may be connected close to the top drive 116, such as may permit the pressure sensor 156 to measure the pressure within the drill string 120 at the top of the internal passage 121 or otherwise proximate the wellsite surface 104. The pressure sensor 156 may be an electrical sensor operable to generate electric signals and/or other information indicative of the measured pressure.

During drilling operations, the drilling fluid may continue to flow downhole through the internal passage 121 of the drill string 120, as indicated in FIG. 1 by directional arrow 158. The drilling fluid may exit the BHA 124 via ports 128 in the drill bit 126 and then circulate uphole through an annular space ("annulus") 108 of the wellbore 102 defined between an exterior of the drill string 120 and the wall of the wellbore 102, such flow being indicated in FIG. 1 by directional arrows 159. In this manner, the drilling fluid 140 lubricates the drill bit 126 and carries formation cuttings uphole to the wellsite surface 104. The returning drilling fluid may exit the annulus 108 via a wing valve, a bell nipple, or another ported adapter 136. The ported adapter 136 may be disposed below the annular fluid control device 132, above the BOP stack 130, or at another location along the BOP equipment permitting ported access or fluid connection with the annulus 108.

The drilling fluid exiting the annulus 108 via the ported adapter 136 may be directed into a fluid conduit 160, and may pass through various equipment fluidly connected along the conduit 160 prior to being returned to the container 142 for recirculation. For example, the drilling fluid may pass through a choke manifold 162 connected along the conduit 160. The choke manifold 162 may include at least one choke and a plurality of fluid valves (neither shown) collectively operable to control the flow through and out of the choke manifold 162. Backpressure may be applied to the annulus 108 by variably restricting flow of the drilling fluid or other fluids flowing through the choke manifold 162. The greater the restriction to flow through the choke manifold 162, the greater the backpressure applied to the annulus 108. Thus, downhole pressure (e.g., pressure at the bottom of the wellbore 102 around the BHA 124 or at a selected depth along the wellbore 102) may be regulated by varying the backpressure at an upper (i.e., uphole) end (e.g., within an upper portion) of the annulus 108 proximate the well site surface 104. Pressure maintained at the upper end of the annulus 108 may be measured via a pressure sensor 164 connected along the conduit 160 between the ported adapter 136 and the choke manifold 162. A fluid valve 166 may be connected along the conduit 160 to selectively fluidly isolate the annulus 108 from the choke manifold 162 and/or other surface equipment 110 fluidly connected with the conduit 160. The fluid valve 166 may be or comprise one or more fluid shut-off valves, such as ball valves, globe valves, and/or other types of fluid valves, which may be selectively opened and closed to permit and prevent fluid flow therethrough. The fluid valve 166 may be actuated remotely by a corresponding actuator operatively coupled with the fluid valve 166. The actuator may be or comprise an electric actuator, such as a solenoid or motor, or a fluid actuator, such as pneumatic or hydraulic cylinder or rotary actuator. The fluid valve 166 may also or instead be actuated manually, such as by a corresponding lever. A flow rate sensor 168 may be connected along the fluid conduit 160 to monitor the flow rate of the returning drilling fluid or another fluid being discharged from the wellbore 102.

Before being returned to the container 142, the drilling fluid may be cleaned and/or reconditioned by solids and gas control equipment 170, which may include one or more of shakers, separators, centrifuges, and other drilling fluid cleaning devices. The solids control equipment 170 may be operable for separating and removing solid particles 141 (e.g., drill cuttings) from the drilling fluid returning to the surface 104. The solids and gas control equipment 170 may also comprise fluid reconditioning equipment, such as may remove gas and/or finer formation cuttings 143 from the drilling fluid. The fluid reconditioning equipment may include a desilter, a desander, a degasser 172, and/or the like. The degasser 172 may form or be mounted in association with one or more portions of the solids and gas control equipment 170. The degasser 172 may be operable for releasing and/or capturing formation gasses entrained in the drilling fluid discharged from the wellbore 102. Intermediate tanks/containers (not shown) may be utilized to hold the drilling fluid 140 between the various portions of the solids and gas control equipment 170.

The degasser 172 may be fluidly connected with one or more gas sensors 174 (e.g., gas detectors and/or analyzers) via a conduit 176, such as may permit the formation gasses released and/or captured by the degasser 172 to be directed to and analyzed by the gas sensors 174. The gas sensors 174 may be operable for generating signals or information indicative of the presence and/or quantity of formation gasses released and/or captured by the degasser 172. The gas sensors 174 may be or comprise qualitative gas analyzers, which may be utilized for safety purposes, such as to detect presence of hazardous gases entrained within the returning drilling fluid. The gas sensors 174 may also or instead be or comprise quantitative gas analyzers, which may be utilized to detect levels or quantities of certain formation gasses, such as to perform formation evaluation.

The cleaned/reconditioned drilling fluid may be transferred to the fluid container 142, and the solid particles 141 removed from the fluid may be transferred to a solids container 143 (e.g., a reserve pit). The container 142 may include an agitator (not shown) to maintain uniformity of the drilling fluid 140 therein. A hopper (not shown) may be connected with or along the fluid conduit 148 to introduce chemical additives, such as caustic soda, into the drilling fluid 140 being pumped into the wellbore 102.

The surface equipment 110 may include tubular handling equipment operable to store, move, connect, and disconnect tubulars to assemble and disassemble the conveyance means 122 of the drill string 120 during drilling operations. For example, a catwalk 131 may be utilized to convey tubulars from a ground level, such as along the wellsite surface 104, to the rig floor 114, permitting the tubular handling assembly 127 to grab and lift the tubulars above the wellbore 102 for connection with previously deployed tubulars. The catwalk 131 may have a horizontal portion and an inclined portion that extends between the horizontal portion and the rig floor 114. The catwalk 131 may comprise a skate 133 movable along a groove (not shown) extending longitudinally along the horizontal and inclined portions of the catwalk 131. The skate 133 may be operable to convey (e.g., push) the tubulars along the catwalk 131 to the rig floor 114. The skate 133 may be driven along the groove by a drive system (not shown), such as a pulley system or a hydraulic system, among other examples. Additionally, one or more racks (not shown) may adjoin the horizontal portion of the catwalk 131. The racks may have a spinner unit for transferring tubulars to the groove of the catwalk 131.

An iron roughneck 151 may be positioned on the rig floor 114. The iron roughneck 151 may comprise a torqueing portion 153, such as may include a spinner and a torque wrench comprising a lower tong and an upper tong. The torqueing portion 153 of the iron roughneck 151 may be moveable toward and at least partially around the drill string 120, such as may permit the iron roughneck 151 to make up and break out connections of the drill string 120. The torqueing portion 153 may also be moveable away from the drill string 120, such as may permit the iron roughneck 151 to move clear of the drill string 120 during drilling operations. The spinner of the iron roughneck 151 may be utilized to apply low torque to make up and break out threaded connections between tubulars of the drill string 120, and the torque wrench may be utilized to apply a higher torque to tighten and loosen the threaded connections.

A reciprocating slip 161 may be located on the rig floor 114, such as may accommodate therethrough the conveyance means 122 during make up and break out operations and during the drilling operations. The reciprocating slip 161 may be in an open position during drilling operations to permit advancement of the drill string 120 therethrough, and in a closed position to clamp an upper end of the conveyance means 122 (e.g., assembled tubulars) to thereby suspend and prevent advancement of the drill string 120 within the wellbore 102, such as during the make up and break out operations.

During drilling operations, the hoisting equipment lowers the drill string 120 while the top drive 116 rotates the drill string 120 to advance the drill string 120 downward within the wellbore 102 and into the formation 106. During the advancement of the drill string 120, the reciprocating slip 161 is in an open position, and the iron roughneck 151 is moved away or is otherwise clear of the drill string 120. When the upper portion of the tubular in the drill string 120 that is made up to the drive shaft 125 is near the reciprocating slip 161 and/or the rig floor 114, the top drive 116 ceases rotating and the reciprocating slip 161 closes to clamp the tubular made up to the drive shaft 125. The grabber of the top drive 116 then clamps the upper portion of the tubular made up to the drive shaft 125, and the drive shaft 125 rotates in a direction reverse from the drilling rotation to break out the connection between the drive shaft 125 and the made up tubular. The grabber of the top drive 116 may then release the tubular of the drill string 120.

Multiple tubulars may be loaded on the rack of the catwalk 131 and individual tubulars (or stands of two or three tubulars) may be transferred from the rack to the groove in the catwalk 131, such as by the spinner unit. The tubular positioned in the groove may be conveyed along the groove by the skate 133 until an end of the tubular projects above the rig floor 114. The elevator 129 of the top drive 116 then grasps the protruding end, and the draw works 119 is operated to lift the top drive 116, the elevator 129, and the new tubular.

The hoisting equipment then raises the top drive 116, the elevator 129, and the tubular until the tubular is aligned with the upper portion of the drill string 120 clamped by the slip 161. The iron roughneck 151 is moved toward the drill string 120, and the lower tong of the torqueing portion 153 clamps onto the upper portion of the drill string 120. The spinning system rotates the new tubular (e.g., a threaded male end) into the upper portion of the drill string 120 (e.g., a threaded female end). The upper tong then clamps onto the new tubular and rotates with high torque to complete making up the connection with the drill string 120. In this manner, the new tubular becomes part of the drill string 120. The iron roughneck 151 then releases and moves clear of the drill string 120.

The grabber of the top drive 116 may then clamp onto the drill string 120. The drive shaft 125 (e.g., a threaded male end) is brought into contact with the drill string 120 (e.g., a threaded female end) and rotated to make up a connection between the drill string 120 and the drive shaft 125. The grabber then releases the drill string 120, and the reciprocating slip 161 is moved to the open position. The drilling operations may then resume.

The tubular handling equipment may further include a tubular handling manipulator (PHM) 163 disposed in association with a fingerboard 165. Although the PHM 163 and the fingerboard 165 are shown supported on the rig floor 114, one or both of the PHM 163 and fingerboard 165 may be located on the wellsite surface 104 or another area of the well construction system 100. The fingerboard 165 provides storage (e.g., temporary storage) of tubulars (or stands of two or three tubulars) 111 during various operations, such as during and between tripping out and tripping in the drill string 120. The PHM 163 may be operable to transfer the tubulars 111 between the fingerboard 165 and the drill string 120 (i.e., space above the suspended drill string 120). For example, the PHM 163 may include arms 167 terminating with clamps 169, such as may be operable to grasp and/or clamp onto one of the tubulars 111. The arms 167 of the PHM 163 may extend and retract, and/or at least a portion of the PHM 163 may be rotatable and/or movable toward and away from the drill string 120, such as may permit the PHM 163 to transfer the tubular 111 between the fingerboard 165 and the drill string 120.

To trip out the drill string 120, the top drive 116 is raised, the reciprocating slip 161 is closed around the drill string 120, and the elevator 129 is closed around the drill string 120. The grabber of the top drive 116 clamps the upper portion of the tubular made up to the drive shaft 125. The drive shaft 125 then rotates in a direction reverse from the drilling rotation to break out the connection between the drive shaft 125 and the drill string 120. The grabber of the top drive 116 then releases the tubular of the drill string 120, and the drill string 120 is suspended by (at least in part) the elevator 129. The iron roughneck 151 is moved toward the drill string 120. The lower tong clamps onto a lower tubular below a connection of the drill string 120, and the upper tong clamps onto an upper tubular above that connection. The upper tong then rotates the upper tubular to provide a high torque to break out the connection between the upper and lower tubulars. The spinning system then rotates the upper tubular to separate the upper and lower tubulars, such that the upper tubular is suspended above the rig floor 114 by the elevator 129. The iron roughneck 151 then releases the drill string 120 and moves clear of the drill string 120.

The PHM 163 may then move toward the tool string 120 to grasp the tubular suspended from the elevator 129. The elevator 129 then opens to release the tubular. The PHM 163 then moves away from the tool string 120 while grasping the tubular with the clamps 169, places the tubular in the fingerboard 165, and releases the tubular for storage in the fingerboard 165. This process is repeated until the intended length of drill string 120 is removed from the wellbore 102.

The well construction system 100 may also comprise a plurality of fire and gas sensors 178 located at different locations (e.g., the rig floor 114, the wellsite structure 112) of the well construction system 100. The fire and gas sensors 178 may each be operable to generate signals indicative of fire and/or smoke. The fire and gas sensors 178 may also be or comprise qualitative gas analyzers operable to generate signals indicative of flammable and/or other hazardous gasses being released from the wellbore 102 or otherwise present at the well construction system 100.

The surface equipment 110 of the well construction system 100 may also comprise a control center 190 from which various portions of the well construction system 100, such as the top drive 116, the hoisting system, the tubular handling system, the drilling fluid circulation system, the well control system, the BHA 124, and the fire and gas sensors 178, among other examples, may be monitored and controlled. The control center 190 may be located on the rig floor 114 or another location of the well construction system 100, such as the wellsite surface 104. The control center 190 may comprise a facility 191 (e.g., a room, a cabin, a trailer, etc.) containing a control workstation 197, which may be operated by a human wellsite operator 195 to monitor and control various wellsite equipment or portions of the well construction system 100. The control workstation 197 may comprise or be communicatively connected with a processing device 192 (e.g., a controller, a computer, etc.), such as may be operable to receive, process, and output information to monitor operations of and provide control to one or more portions of the well construction system 100. For example, the processing device 192 may be communicatively connected with the various surface and downhole equipment described herein, and may be operable to receive signals from and transmit signals to such equipment to perform various operations described herein. The processing device 192 may store executable programs, instructions, and/or operational parameters or set-points, including for implementing one or more aspects of the operations described herein. The processing device 192 may be located within and/or outside of the facility 191.

The control workstation 197 may be operable for entering or otherwise communicating commands to the processing device 192 by the wellsite operator 195, and for displaying or otherwise communicating information from the processing device 192 to the wellsite operator 195. The control workstation 197 may comprise a plurality of human-machine interface (HMI) devices, including one or more input devices 194 (e.g., a keyboard, a mouse, a joystick, a touchscreen, etc.) and one or more output devices 196 (e.g., a video monitor, a printer, audio speakers, etc.). Communication between the control center 190, the processing device 192, the input and output devices 194, 196, and the various wellsite equipment may be via wired and/or wireless communication means. However, for clarity and ease of understanding, such communication means are not depicted, and a person having ordinary skill in the art will appreciate that such communication means are within the scope of the present disclosure.

The well construction system 100 also includes stationary and/or mobile video cameras 198 disposed or utilized at various locations within the well construction system 100. The video cameras 198 capture videos of various portions, equipment, or subsystems of the well construction system 100, and perhaps the wellsite operators 195 and the actions they perform, during or otherwise in association with the wellsite operations, including while performing repairs to the well construction system 100 during a breakdown. For example, the video cameras 198 may capture videos of the entire well construction system 100 and/or specific portions of the well construction system 100, such as the top drive 116, the iron roughneck 151, the PHM 163, the fingerboard 165, and/or the catwalk 131, among other examples. The video cameras 198 generate corresponding video signals (i.e., video feeds) comprising or otherwise indicative of the captured videos. The video cameras 198 may be in signal communication with the processing device 192, such as may permit the video signals to be processed and transmitted to the control workstation 197 and, thus, permit the wellsite operators 195 to view various portions or components of the well construction system 100 on one or more of the output devices 196. The processing device 192 or another portion of the control workstation 197 may be operable to record the video signals generated by the video cameras 198.

Well construction systems within the scope of the present disclosure may include more or fewer components than as described above and depicted in FIG. 1. Additionally, various equipment and/or subsystems of the well construction system 100 shown in FIG. 1 may include more or fewer components than as described above and depicted in FIG. 1. For example, various engines, motors, hydraulics, actuators, valves, and/or other components not explicitly described herein may be included in the well construction system 100, and are within the scope of the present disclosure.

Figure 2:
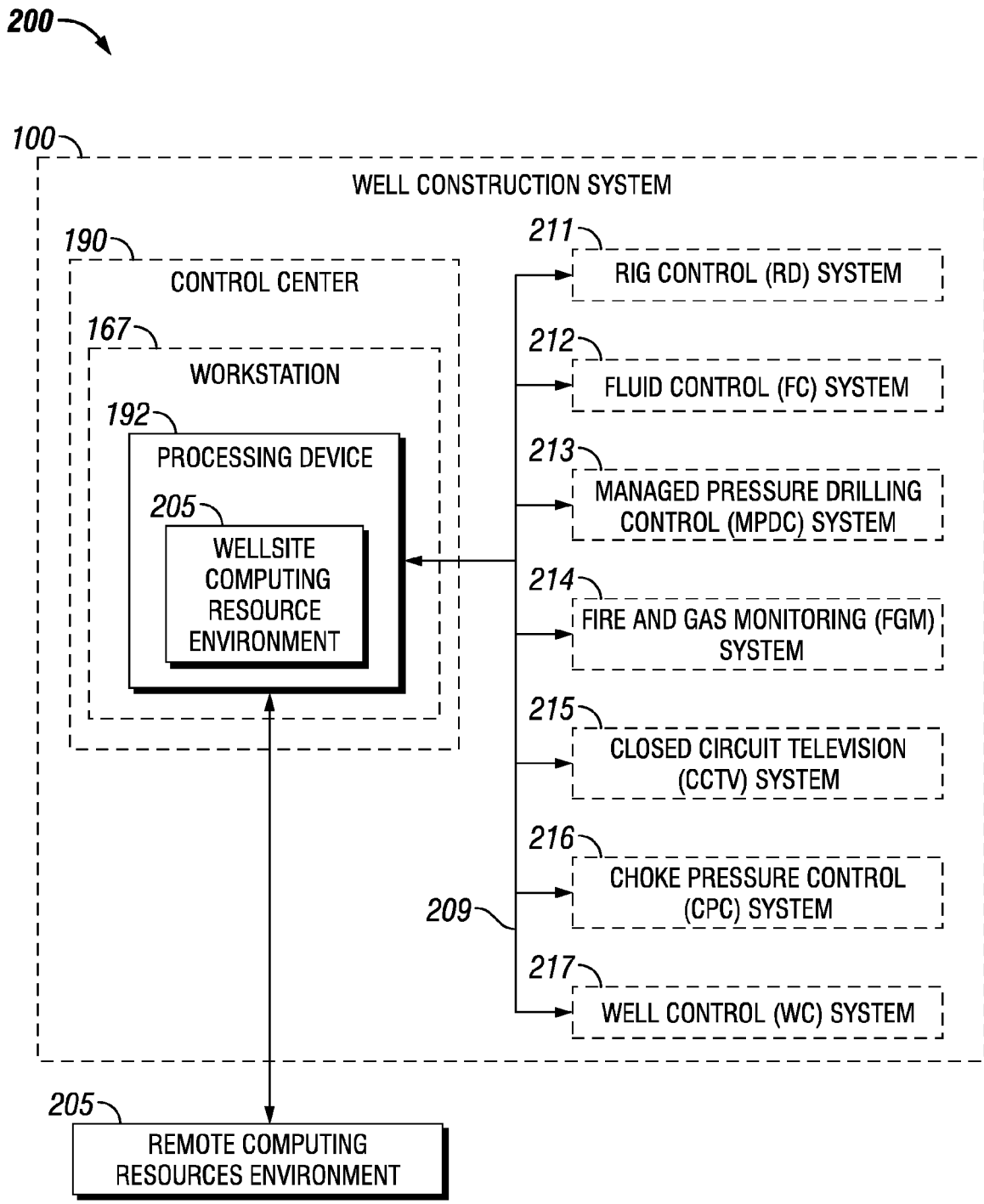
FIG. 2 is a schematic view of at least a portion of an example implementation of apparatus according to one or more aspects of the present disclosure.

FIG. 2 is a schematic view of at least a portion of an example implementation of a control system 200 for the well construction system 100 according to one or more aspects of the present disclosure. The following description refers to FIGS. 1 and 2, collectively.

The control system 200 may be utilized to monitor and control various portions, components, and equipment of the well construction system 100 described herein, which may be grouped into several subsystems, each operable to perform a corresponding operation and/or a portion of the well construction operations described herein. The subsystems may include a rig control (RC) system 211, a fluid control (FC) system 212, a managed pressure drilling control (MPDC) system 213, a fire and gas monitoring (FGM) system 214, a closed-circuit television (CCTV) system 215, a choke pressure control (CPC) system 216, and a well pressure control (WC) system 217. The control workstation 197 may be utilized to monitor, configure, control, and/or otherwise operate one or more of the subsystems 211-217.

The RC system 211 may include the wellsite structure 112, the drill string hoisting system or equipment (e.g., the draw works 119 and the top drive 116), drill string rotation system or equipment (e.g., the top drive 116 and/or the rotary table and kelly), the reciprocating slip 161, the drill pipe handling system or equipment (e.g., the catwalk 131, the PHM 163, the fingerboard 165, and the iron roughneck 151), electrical generators, and other equipment. Accordingly, the RC system 211 may perform power generation and drill pipe handling, hoisting, and rotation operations. The RC system 211 may also serve as a support platform for drilling equipment and staging ground for rig operations, such as connection make up and break out operations described above. The FC system 212 may include the drilling fluid 140, the pumps 144, valves 166, drilling fluid loading equipment, the solids and gas treatment equipment 170, and/or other fluid control equipment. Accordingly, the FC system 212 may perform fluid operations of the well construction system 100. The MPDC system 213 may include the choke manifold 162, the downhole pressure sensors 186, and/or other equipment. The FGM system 214 may comprise the gas sensors 174, the fire and gas sensors 178, and/or other equipment. The CCTV system 215 may include the video cameras 198, one or more other input devices 194 (e.g., a keyboard, a touchscreen, etc.), one or more video output devices 196 (e.g., video monitors), various communication equipment (e.g., modems, network interface cards, etc.), and/or other equipment. The CCTV system 215 may be utilized to capture real-time video of various portions or subsystems 211-217 of the well construction system 100 and display video signals from the video cameras 198 on the video output devices to display in real-time the various portions or subsystems 211-217 of the well construction system 100. The CPC system 216 may comprise the choke manifold 162 and/or other equipment, and the WC system 217 may comprise the BOP equipment 130, 132, the BOP control unit 137, and the BOP control station (e.g., BOP control station 370 shown in FIG. 5) for controlling the BOP control unit 137 and the BOP equipment 130, 132.

The control system 200 may include a wellsite computing resource environment 205, which may be located at the wellsite 104 as part of the well construction system 100, and a remote computing resource environment 206, which may be located offsite (i.e., not at the wellsite 104). The control system 200 may also include various local controllers (e.g., controllers 241-247 shown in FIG. 3) associated with the subsystems 211-217 and/or individual components or equipment of the well construction system 100. As described above, each subsystem 211-217 of the well construction system 100 may include actuators (e.g., actuators 231-237 shown in FIG. 3) and sensors (e.g., sensors 221-227 shown in FIG. 3) for performing operations of the well construction system 100. These actuators and sensors may be monitored and/or controlled via the wellsite computing resource environment 205, the remote computing resource environment 206, and/or the corresponding local controllers. For example, the wellsite computing resource environment 205 and/or the local controllers may be operable to monitor the sensors of the wellsite subsystems 211-217 in real-time, and to provide real-time control commands to the subsystems 211-217 based on the received sensor data. Data may be generated by both sensors and computation, and may be utilized for coordinated control among two or more of the subsystems 211-217.

The control system 200 may be in real-time communication with the various components of the well construction system 100. For example, the local controllers may be in communication with various sensors and actuators of the corresponding subsystems 211-217 via local communication networks (not shown) and the wellsite computing resource environment 205 may be in communication with the subsystems 211-217 via a data bus or network 209. As described below, data or sensor signals generated by the sensors of the subsystems 211-217 may be made available for use by processes (e.g., processes 274, 275 shown in FIG. 3) and/or devices of the wellsite computing resource environment 205. Similarly, data or control signals generated by the processes and/or devices of the wellsite computing resource environment 205 may be automatically communicated to various actuators of the subsystems 211-217, perhaps pursuant to predetermined programming, such as to facilitate well construction operations and/or other operations described herein.

The remote computing resource environment 206, the wellsite computing resource environment 205, and the subsystems 211-217 of the well construction system 100 may be communicatively connected with each other via a network connection, such as via a wide-area-network (WAN), a local-area-network (LAN), and/or other networks also within the scope of the present disclosure. A "cloud" computing environment is one example of a remote computing resource environment 206. The wellsite computing resource environment 205 may be or form at least a portion of the processing device 192 and, thus, may form a portion of or be communicatively connected with the control workstation 197.

Figure 3:
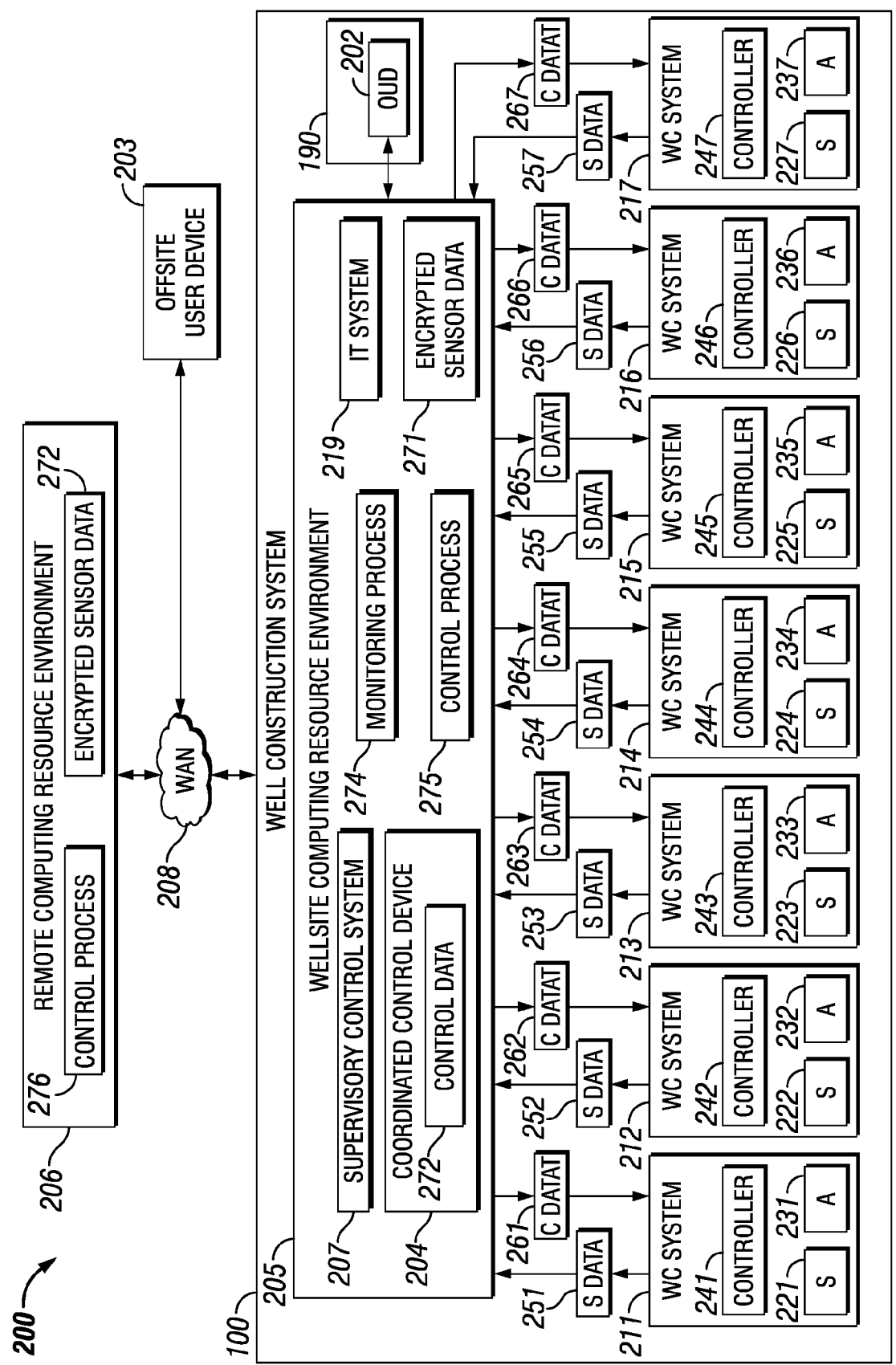
FIG. 3 is a schematic view of at least a portion of an example implementation of apparatus according to one or more aspects of the present disclosure.

FIG. 3 is a schematic view of an example implementation of the control system 200 shown in FIG. 2 communicatively connected with the subsystems 211-217 of the well construction system 100, including the RC system 211, the FC system 212, the MPDC system 213, the FGM system 214, the CCTV system 215, the CPC system 216, and the WC system 217. The following description refers to FIGS. 1-3, collectively.

An example implementation of the well construction system 100 may include one or more onsite user devices 202 communicatively connected with the wellsite computing resource environment 205. The onsite user devices 202 may be or comprise stationary user devices intended to be stationed at the well construction system 100 and/or portable user devices. For example, the onsite user devices 202 may include a desktop, a laptop, a smartphone, a personal digital assistant (PDA), a tablet component, a wearable computer, or other suitable devices. The onsite user devices 202 may be operable to communicate with the wellsite computing resource environment 205 of the well construction system 100 and/or the remote computing resource environment 206. The onsite user device 202 may be or comprise at least a portion of the control workstation 197 shown in FIG. 1 and described above. The onsite user device 202 may be located within the facility 191.

The wellsite computing resource environment 205 and/or other portions of the well construction system 100 may further comprise an information technology (IT) system 219 operable to communicatively connect various portions of the wellsite computing resource environment 205 and/or communicatively connect the wellsite computing resource environment 205 with other portions of the well construction system 100. The IT system 219 may include communication conduits, software, computers, and other IT equipment facilitating communication between one or more portions of the wellsite computing resource environment 205 and/or between the wellsite computing resource environment 205 and another portion of the well construction system 100, such as the remote computing resource environment 206, the onsite user device 202, and the subsystems 211-217.

The control system 200 may include (or otherwise be utilized in conjunction with) one or more offsite user devices 203. The offsite user devices 203 may be or comprise a desktop computer, a laptop computer, a smartphone and/or other portable smart device, a PDA, a tablet/touchscreen computer, a wearable computer, and/or other devices. The offsite user devices 203 may be operable to receive and/or transmit information (e.g., for monitoring functionality) from and/or to the well construction system 100, such as by communication with the wellsite computing resource environment 205 via the network 208. The offsite user devices 203 may be utilized for monitoring functions, but may also provide control processes for controlling operation of the various subsystems 211-217 of the well construction system 100. The offsite user devices 203 and/or the wellsite computing resource environment 205 may also be operable to communicate with the remote computing resource environment 206 via the network 208. The network 208 may be a WAN, such as the internet, a cellular network, a satellite network, other WANs, and/or combinations thereof.

The subsystems 211-217 of the well construction system 100 may include sensors 221-227, actuators 231-237, and local controllers 241-247. The controllers 241-247 may be programmable logic controllers (PLCs) and/or other controllers having aspects similar to the example processing device 700 shown in FIG. 13. The RC system 211 may include one or more sensors 221, one or more actuators 231, and one or more controllers 241. The FC system 212 may include one or more sensors 222, one or more actuators 232, and one or more controllers 242. The MPDC system 213 may include one or more sensors 223, one or more actuators 233, and one or more controllers 243. The FGM system 214 may include one or more sensors 224, one or more actuators 234, and one or more controllers 244. The CCTV system 215 may include one or more sensors 225, one or more actuators 235, and one or more controllers 245. The CPC system 216 may include one or more sensors 226, one or more actuators 236, and one or more controllers 246. The WC system 217 may include one or more sensors 227, one or more actuators 237, and one or more controllers 247 (e.g., a BOP control station 370 shown in FIG. 5).

The sensors 221-227 may include sensors utilized for operation of the various subsystems 211-217 of the well construction system 100. For example, the sensors 221-227 may include cameras, position sensors, pressure sensors, temperature sensors, flow rate sensors, vibration sensors, current sensors, voltage sensors, resistance sensors, gesture detection sensors or devices, voice actuated or recognition devices or sensors, and/or other examples.

The sensors 221-227 may be operable to provide sensor data to the wellsite computing resource environment 205, such as to the coordinated control device 204. For example, the sensors 221-227 may provide sensor data 251-257, respectively. The sensor data 251-257 may include signals or information indicative of equipment operation status (e.g., on or off, up or down, set or release, etc.), drilling parameters (e.g., depth, hook load, torque, etc.), auxiliary parameters (e.g., vibration data of a pump), flow rate, temperature, operational speed, position, and pressure, among other examples. The acquired sensor data 251-257 may include or be associated with a timestamp (e.g., date and/or time) indicative of when the sensor data 251-257 was acquired. The sensor data 251-257 may also or instead be aligned with a depth or other drilling parameter.

Acquiring the sensor data 251-257 at the coordinated control device 204 may facilitate measurement of the same physical properties at different locations of the well construction system 100, wherein the sensor data 251-257 may be utilized for measurement redundancy to permit continued well construction operations. Measurements of the same physical properties at different locations may also be utilized for detecting equipment conditions among different physical locations at the wellsite surface 104 or within the wellbore 102. Variation in measurements at different wellsite locations over time may be utilized to determine equipment performance, system performance, scheduled maintenance due dates, and the like. For example, slip status (e.g., set or unset) may be acquired from the sensors 221 and communicated to the wellsite computing resource environment 205. Acquisition of fluid samples may be measured by a sensor, such as the sensors 186, 223, and related with bit depth and time measured by other sensors. Acquisition of data from the video cameras 198, 225 may facilitate detection of arrival and/or installation of materials or equipment at the well construction system 100. The time of arrival and/or installation of materials or equipment may be utilized to evaluate degradation of material, scheduled maintenance of equipment, and other evaluations.

The coordinated control device 204 may facilitate control of one or more of the subsystems 211-217 at the level of each individual subsystem 211-217. For example, in the FC system 212, sensor data 252 may be fed into the controller 242, which may respond to control the actuators 232. However, for control operations that involve multiple systems, the control may be coordinated through the coordinated control device 204. For example, coordinated control operations may include the control of downhole pressure during tripping. The downhole pressure may be affected by both the FC system 212 (e.g., pump rate), the MPDC 213 (e.g., choke position of the MPDC), and the RC system 211 (e.g., tripping speed). Thus, when it is intended to maintain certain downhole pressure during tripping, the coordinated control device 204 may be utilized to direct the appropriate control commands to two or more (or each) of the participating subsystems.

Control of the subsystems 211-217 of the well construction system 100 may be provided via a three-tier control system that includes a first tier of the local controllers 241-247, a second tier of the coordinated control device 204, and a third tier of the supervisory control system 207. Coordinated control may also be provided by one or more controllers 241-247 of one or more of the subsystems 211-217 without the use of a coordinated control device 204. In such implementations of the control system 200, the wellsite computing resource environment 205 may provide control processes directly to these controllers 241-247 for coordinated control.

The sensor data 251-257 may be received by the coordinated control device 204 and utilized for control of the subsystems 211-217. The sensor data 251-257 may be encrypted to produce encrypted sensor data 271. For example, the wellsite computing resource environment 205 may encrypt sensor data from different types of sensors and systems to produce a set of encrypted sensor data 271. Thus, the encrypted sensor data 271 may not be viewable by unauthorized user devices (either offsite user devices 203 or onsite user devices 202) if such devices gain access to one or more networks of the well construction system 100. The encrypted sensor data 271 may include a timestamp and an aligned drilling parameter (e.g., depth), as described above. The encrypted sensor data 271 may be communicated to the remote computing resource environment 206 via the network 208 and stored as encrypted sensor data 272.

The wellsite computing resource environment 205 may provide the encrypted sensor data 271, 272 available for viewing and processing offsite, such as via the offsite user devices 203. Access to the encrypted sensor data 271, 272 may be restricted via access control implemented in the wellsite computing resource environment 205. The encrypted sensor data 271, 272 may be provided in real-time to offsite user devices 203 such that offsite personnel may view real-time status of the well construction system 100 and provide feedback based on the real-time sensor data. For example, different portions of the encrypted sensor data 271, 272 may be sent to the offsite user devices 203. The encrypted sensor data 271, 272 may be decrypted by the wellsite computing resource environment 205 before transmission, and/or decrypted on the offsite user device 203 after encrypted sensor data is received. The offsite user device 203 may include a thin client (not shown) configured to display data received from the wellsite computing resource environment 205 and/or the remote computing resource environment 206. For example, multiple types of thin clients (e.g., devices with display capability and minimal processing capability) may be utilized for certain functions or for viewing various sensor data 251-257.

The wellsite computing resource environment 205 may include various computing resources utilized for monitoring and controlling operations, such as one or more computers having a processor and a memory. For example, the coordinated control device 204 may include a processing device (e.g., processing device 700 shown in FIG. 13), having a processor and memory for processing the sensor data, storing the sensor data, and issuing control commands responsive to the sensor data. As described above, the coordinated control device 204 may control various operations of the subsystems 211-217 via analysis of sensor data 251-257 from one or more of the wellsite subsystems 211-217 to facilitate coordinated control between the subsystems 211-217. The coordinated control device 204 may generate control data 273 (e.g., signals, commands, coded instructions) to execute control of the subsystems 211-217. The coordinated control device 204 may transmit the control data 273 to one or more subsystems 211-217. For example, control data 261 may be sent to the RC system 211, control data 262 may be sent to the FC system 212, control data 263 may be sent to the MPDC system 213, control data 264 may be sent to the FGM system 214, control data 265 may be sent to the CCTV system 215, control data 266 may be sent to the CPC system 216, and control data 267 may be sent to the WC system 217. The control data 261-267 may include, for example, wellsite operator commands (e.g., turn on or off a pump, switch on or off a valve, update a physical property set-point, etc.). The coordinated control device 204 may include a fast control loop that directly obtains sensor data 251-257 and executes, for example, a control algorithm. The coordinated control device 204 may include a slow control loop that obtains data via the wellsite computing resource environment 205 to generate control commands.

The coordinated control device 204 may intermediate between the supervisory control system 207 and the local controllers 241-247 of the subsystems 211-217, such as may permit the supervisory control system 207 to control the subsystems 211-217. The supervisory control system 207 may include, for example, devices for entering control commands to perform operations of the subsystems 211-217. The coordinated control device 204 may receive commands from the supervisory control system 207, process such commands according to a rule (e.g., an algorithm based upon the laws of physics for drilling operations), and provide control data to one or more subsystems 211-217. The supervisory control system 207 may be provided by the wellsite operator 195 and/or process monitoring and control program. In such implementations, the coordinated control device 204 may coordinate control between discrete supervisory control systems and the subsystems 211-217 while utilizing control data 261-267 that may be generated based on the sensor data 251-257 received from the subsystems 211-217 and analyzed via the wellsite computing resource environment 205. The coordinated control device 204 may receive the control data 251-257 and then dispatch control data 261, including interlock commands, to each subsystem 211-217. The coordinated control device 204 may also or instead just listen to the control data 251-257 being dispatched to each subsystem 221-227 and then initiate the machine interlock commands to the relevant local controller 241-247.

The coordinated control device 204 may run with different levels of autonomy. For example, the coordinated control device 204 may operate in an advice mode to inform the wellsite operators 195 to perform a specific task or take specific corrective action based on sensor data 251-257 received from the various subsystems 211-217. While in the advice mode, the coordinated control device 204 may, for example, advise or instruct the wellsite operator 195 to perform a standard work sequence when gas is detected on the rig floor 114, such as to close the annular BOP 132. Furthermore, if the wellbore 102 is gaining or losing drilling fluid 140, the coordinated control device 204 may, for example, advise or instruct the wellsite operator 195 to modify the density of the drilling fluid 140, modify the pumping rate of the drilling fluid 140, and/or modify the pressure of the drilling fluid within the wellbore 102.

The coordinated control device 204 may also operate in a system/equipment interlock mode, whereby certain operations or operational sequences are prevented based on the received sensor data 251-257. While operating in the interlock mode, the coordinated control device 204 may manage interlock operations among the various equipment of the subsystems 211-217. For example, if a pipe ram of the BOP stack 130 is activated, the coordinated control device 204 may issue an interlock command to the RC system controller 241 to stop the draw works 119 from moving the drill string 120. However, if a shear ram of the BOP stack 130 is activated, the coordinated control device 204 may issue an interlock command to the controller 241 to operate the draw works 119 to adjust the position of the drill string 120 within the BOP stack 130 before activating the shear ram, so that the shear ram does not align with a shoulder of the tubulars forming the drill string 120.

The coordinated control device 204 may also operate in an automated sequence mode, whereby certain operations or operational sequences are automatically performed based on the received sensor data 251-257. For example, the coordinated control device 204 may activate an alarm and/or stop or reduce operating speed of the pipe handling equipment when a wellsite operator 195 is detected close to a moving iron roughneck 151, the PHM 163, or the catwalk 131. As another example, if the wellbore pressure increases rapidly, the coordinated control device 204 may close the annular BOP 132, close one or more rams of the BOP stack 130, and/or adjust the choke manifold 162.

The wellsite computing resource environment 205 may comprise or execute a monitoring process 274 (e.g., an event detection process) that may utilize the sensor data 251-257 to determine information about status of the well construction system 100 and automatically initiate an operational action, a process, and/or a sequence of one or more of the subsystems 211-217. The monitoring process 274 may initiate the operational action to be caused by the coordinated control device 204. Depending on the type and range of the sensor data 251-257 received, the operational actions may be executed in the advice mode, the interlock mode, or the automated sequence mode.

For example, the monitoring process 274 may determine a drilling state, equipment health, system health, a maintenance schedule, or combination thereof, and initiate an advice to be generated. The monitoring process 274 may also detect abnormal drilling events, such as a wellbore fluid loss and gain, a wellbore washout, a fluid quality issue, or an equipment event based on job design and execution parameters (e.g., wellbore, drilling fluid, and drill string parameters), current drilling state, and real-time sensor information from the surface equipment 110 (e.g., presence of hazardous gas at the rig floor, presence of wellsite operators in close proximity to moving pipe handling equipment, etc.) and the BHA 124, initiating an operational action in the automated mode. The monitoring process 274 may be connected to the real-time communication network 209. The coordinated control device 204 may initiate a counteractive measure (e.g., a predetermined action, process, or operation) based on the events detected by the monitoring process 274.

The term "event" as used herein may include, but not be limited to, an operational and safety related event described herein and/or another operational and safety related event that can take place at a well construction system. The events described herein may be detected by the monitoring process 274 based on the sensor data 251-257 (e.g., sensor signals or information) received and analyzed by the monitoring process 274.

The wellsite computing resource environment 205 may also comprise or execute a control process 275 that may utilize the sensor data 251-257 to optimize drilling operations, such as the control of drilling equipment to improve drilling efficiency, equipment reliability, and the like. For example, the acquired sensor data 252 may be utilized to derive a noise cancellation scheme to improve electromagnetic and mud pulse telemetry signal processing. The remote computing resource environment 206 may comprise or execute a control process 276 substantially similar to the control process 275 that may be provided to the wellsite computing resource environment 205. The monitoring and control processes 274, 275, 276 may be implemented via, for example, a control algorithm, a computer program, firmware, or other hardware and/or software.

The wellsite computing resource environment 205 may include various computing resources, such as a single computer or multiple computers. The wellsite computing resource environment 205 may further include a virtual computer system and a virtual database or other virtual structure for collected data, such as may include one or more resource interfaces (e.g., web interfaces) that facilitate the submission of application programming interface (API) calls to the various resources through a request. In addition, each of the resources may include one or more resource interfaces that facilitate the resources to access each other (e.g., to facilitate a virtual computer system of the computing resource environment to store data in or retrieve data from the database or other structure for collected data). The virtual computer system may include a collection of computing resources configured to instantiate virtual machine instances. A wellsite operator 195 may interface with the virtual computer system via the offsite user device 203 or the onsite user device 202. Other computer systems or computer system services may be utilized in the wellsite computing resource environment 205, such as a computer system or computer system service that provides computing resources on dedicated or shared computers/servers and/or other physical devices. The wellsite computing resource environment 205 may include a single server (in a discrete hardware component or as a virtual server) or multiple servers (e.g., web servers, application servers, or other servers). The servers may be, for example, computers arranged in physical and/or virtual configuration.

The wellsite computing resource environment 205 may also include a database that may be or comprise a collection of computing resources that run one or more data collections. Such data collections may be operated and managed by utilizing API calls. The data collections, such as the sensor data 251-257, may be made available to other resources in the wellsite computing resource environment 205, or to user devices (e.g., onsite user device 202 and/or offsite user device 203) accessing the wellsite computing resource environment 205. The remote computing resource environment 206 may include computing resources similar to those described above, such as a single computer or multiple computers (in discrete hardware components or virtual computer systems).

Figure 4:
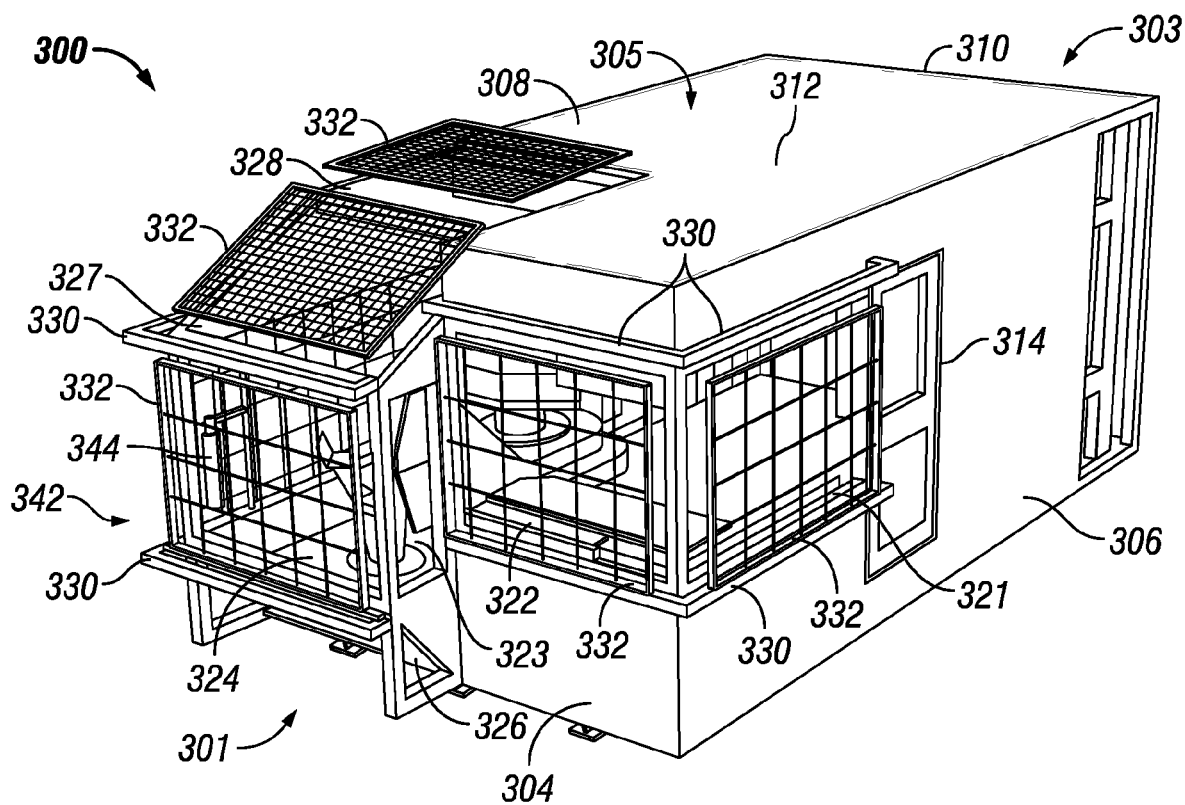
FIG. 4 is a perspective view of at least a portion of an example implementation of apparatus according to one or more aspects of the present disclosure.
Figure 5:
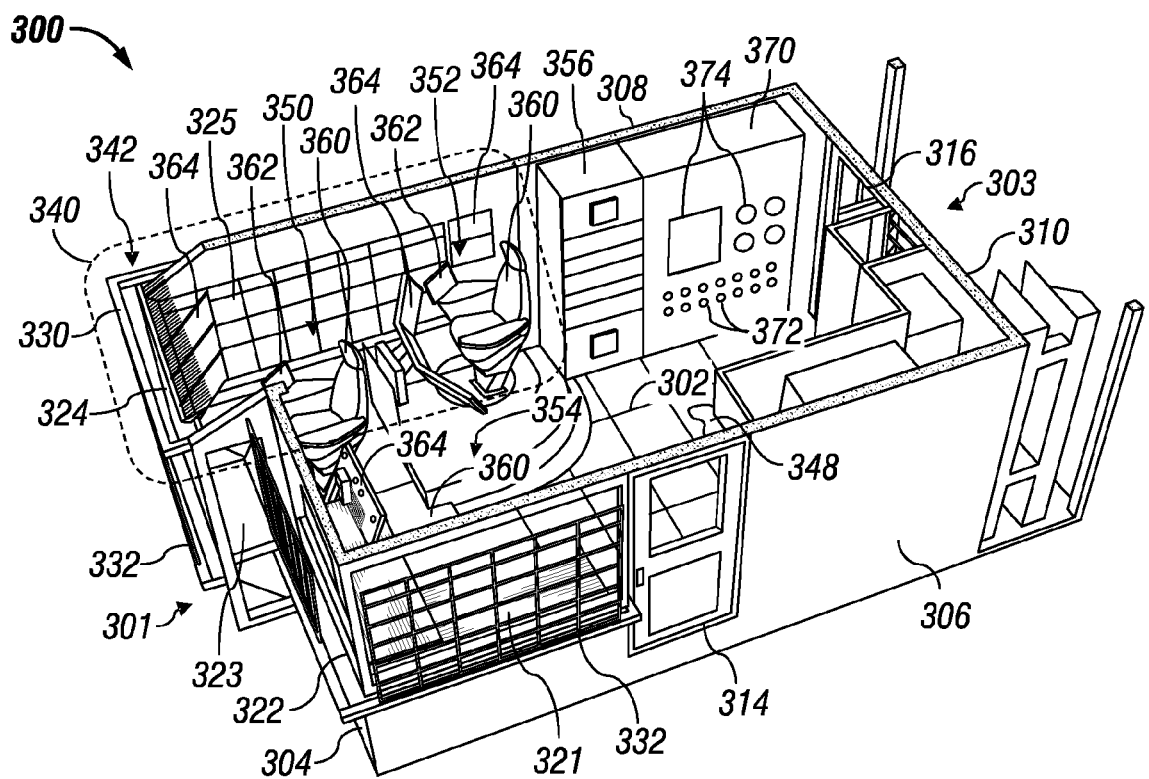
FIG. 5 is a perspective sectional view of the apparatus shown in FIG. 4 according to one or more aspects of the present disclosure.

FIGS. 4 and 5 are perspective and sectional views of at least a portion of an example implementation of a control center 300 according to one or more aspects of the present disclosure. The control center 300 may be or form at least a portion of the control center 190 shown in FIG. 1. The following description refers to FIGS. 1, 4, and 5, collectively.

The control center 300 comprises a facility 305 (e.g., a room, a cabin, a trailer, etc.) containing various control devices for monitoring and controlling the subsystems 211-217 and other portions of the well construction system 100. The facility 305 may comprise a front side 301, which may be directed toward or located closest to the drill string 120 being constructed by the well construction system 100 and a rear side 303, which may be directed away from the drill string 120. The facility 305 may comprise a floor 302, a front wall 304, a left wall 306, a right wall 308, a rear wall 310, and a roof 312. The facility 305 may also have a side door 314, a rear door 316, and a plurality of windows 321-328 in one or more of the walls 304, 306, 308, 310 and/or the roof 312. Each of the windows 321-328 may be surrounded by structural framing 330 connected with the walls and supporting window safety guards 332 (e.g., bars, grills) in front of or along the windows 321-328.

The facility 305 may have an observation area 340 at the front side 301 of the facility 305 from which a wellsite operator 195 will have an optimal or otherwise improved view of the drill string 120, the rig floor 114, and/or other portions of the well construction system 100. The observation area 340 may be surrounded or defined by windows 323-328 on several sides to increase wellsite operator's 195 horizontal and vertical angle of view of the well constriction system 100. A portion 342 of the observation area 340 (e.g., windows 323-327) may protrude or extend out past other portions of the facility 305 (e.g., front wall 304) to facilitate the optimal view of the well construction system 100 by the wellsite operators 195. The observation area 340 may be located on a side of the facility 305. The observation area 318 may be surrounded by or at least partially defined by a front window 324 permitting the wellsite operator 195 to look forward, two side windows 323, 325 permitting the wellsite operator 195 to look sideways (i.e., left and right), a lower window 326 permitting the wellsite operator 195 to look downwards, and one or more upper windows 327, 328 permitting the wellsite operator 195 to look upwards. The lower window 326 and/or at least one upper window 327 may extend diagonally with respect to the front window 324.

The facility 305 may include a plurality of ancillary systems operable to control various features of the facility 305. For example, the facility 305 may comprise internal environmental control systems for controlling environmental conditions within the facility 305. The environmental control systems may include dimmable lights in separate areas of the facility 305 to facilitate light settings for different operations, dimmable windows 321-328 for sun shading and heat reduction, a heating, ventilation, and air conditioning (HVAC) system for controlling temperature, fresh air supply, and/or humidity within the facility 305. The ancillary systems of the facility 305 may further comprise window wiper/washing devices 344 and/or defog devices (not shown), such as fans and/or heaters, each operatively connected in association with a corresponding window 321-328 to clean, wipe, or otherwise maintain visibility through the window 321-328 during rain, snow, and/or other weather conditions. The facility 305 may further contain a public announcement and general alarm (PAGA) system 348 which may be utilized by the wellsite operator 195 to communicate verbal messages and alarms to other wellsite operators 195 located within and outside of the facility 305.

The control center 300 may comprise one or more wellsite operator control workstations within the facility 305. The workstations may be utilized by the wellsite operators 195 to monitor and control the subsystems 211-217, the ancillary systems, and other portions of the well construction system 100. For example, the observation area 340 may contain a first control workstation 350 located adjacent the windows 323, 324, 325, 326, 328 and at least partially within the extended portion 342 of the observation area 340, such as may permit the wellsite operator 195 utilizing the control workstation 350 to have an unobstructed or otherwise optimal view of the drill string 120, the rig floor 114, and/or other portions of the well construction system 100. The observation area 340 may also contain a second control workstation 352 located adjacent (e.g., behind) the first control workstation 350 and adjacent the window 325, but not within the extended portion 342 of the observation area 340. The control workstation 352 may be elevated at least partially above the control workstation 350 to reduce the obstruction of view caused by the control workstation 350 and, thus, permit the wellsite operator 195 utilizing the control workstation 352 to view the drill string 120, the rig floor 114, and/or other portions of the well construction system 100 over the control workstation 350 via the front window 324. The control center 300 may also comprise a third control workstation 354 located adjacent the control workstations 350, 352 and adjacent the windows 321, 322, but not within the observation area 340.

The control center 300 may further comprise a processing device 356 (e.g., a controller, a computer, a server, etc.) operable to provide control to one or more portions of the well construction system 100 and/or operable to monitor operations of one or more portions of the well construction system 100. For example, the processing device 356 may be communicatively connected with the various surface and downhole equipment described herein and operable to receive signals from and transmit signals to such equipment to perform various operations described herein. The processing device 356 may store executable programs, instructions, and/or operational parameters or set-points, including for implementing one or more aspects of the operations described herein. The processing device 356 may be communicatively connected with the control workstations 350, 352, 354. Although the processing device 356 is shown located within the facility 305, the processing device 356 may be located outside of the facility 305. Furthermore, although the processing device 356 is shown as a single device that is separate and distinct from the control workstations 350, 352, 354, one or more of the control workstation 350, 352, 354 may comprise a corresponding processing device 356 disposed in association with or forming at least a portion of such corresponding processing device 356.

The control workstations 350, 352, 354 may be operable to enter or otherwise communicate commands to the processing device 356 by the wellsite operator 195 and to display or otherwise communicate information from the processing device 356 to the wellsite operator 195. One or more of the control workstations 350, 352, 354 may comprise an operator chair 360 and an HMI system comprising one or more input devices 362 (e.g., a keyboard, a mouse, a joystick, a touchscreen, a microphone, etc.) and one or more output devices 364 (e.g., a video monitor, a printer, audio speakers, a touchscreen, etc.). The input and output devices 362, 364 may be disposed in association with and/or integrated with the operator chair 360 to permit the wellsite operator 195 to enter commands or other information to the processing device 356 and receive information from the processing device 356 and other portions of the well construction system 100. One or more of the control workstations 350, 352, 354 may be or form at least a portion of the control workstation 197 shown in FIG. 1, and the processing device 356 may be or form at least a portion of the processing device 192 shown in FIG. 1.

The control center 300 may further contain a BOP control station 370 (e.g., control panel) of the WC system 217 operable to monitor and control one or more portions of the WC system 217. For example, the BOP control station 370 may be communicatively connected with the BOP control unit 137 and the BOP equipment 130, 132, and operable to monitor and control operations of the BOP control unit 137 and the BOP equipment 130, 132.

The BOP control station 370 may be operable communicate to the BOP control unit 137 control commands entered by the wellsite operator 195 for controlling the BOP equipment 130, 132 and to display or otherwise communicate information indicative of operational status of the BOP equipment 130, 132 and the BOP control unit 137 to the wellsite operator 195. The BOP control station 370 may comprise a processing device (e.g., processing device 700 shown in FIG. 13) operable to store executable programs, instructions, and/or operational parameters or set-points, including for implementing one or more BOP operations described herein. The BOP control station 370 may further comprise an HMI system comprising one or more input devices 372 (e.g., buttons, keys, a touchscreen, etc.) and one or more output devices 374 (e.g., a video monitor, gauges, audio speakers, a touchscreen, etc.). The input and output devices 372, 374 may be disposed in association with and/or integrated with a housing or enclosure of the BOP control station 370 to permit the wellsite operator 195 to enter commands or other information to the BOP control station 370 to control the BOP equipment 130, 132 and receive information from the BOP control station 370 to monitor operational status of the BOP equipment 130, 132.

The BOP control unit 370 may be communicatively connected with one or more of the control workstations 350, 352, 354, such as may permit monitoring and control of one or more portions of the WC system 217 via the control workstations 350, 352, 354. For example, one or more of the control workstations 350, 352, 354 or the processing device 356 may be communicatively connected directly with the processing device of the BOP control station 370 or indirectly, such as via the input and output devices 372, 374 of the BOP control station 370. Such connection may permit the control workstations 350, 352, 354 to receive information indicative of operational status of the BOP control unit 137 and the BOP equipment 130, 132 via the BOP control station 370. Such connection may further permit the control workstations 350, 352, 354 to transmit control commands to the BOP control unit 137 and the BOP equipment 130, 132 via the BOP control station 370. Such connection may also or instead facilitate control of the BOP control station 370 via the control workstations 350, 352, 354, such as may cause the BOP control station 370 to control the BOP control unit 137 and the BOP equipment 130, 132 as directed by or from the control workstations 350, 352, 354.

The control workstations 350, 352, 354 may be operable to display the information indicative of operational status of the BOP control unit 137 and the BOP equipment 130, 132 to the wellsite operator 195 via the output devices 364 to permit the wellsite operator to monitor the operational status of the BOP control unit 137 and the BOP equipment 130, 132 while sitting in the corresponding operator chair 360. The control workstations 350, 352, 354 may be further operable to receive the control commands from the wellsite operator 195 via the input devices 362 while sitting in the corresponding operator chair 360 for transmission to the BOP control station 370 to control the BOP control unit 137 and the BOP equipment 130, 132.

The operator workstations 350, 352, 354 may be further utilized to monitor and control the ancillary and other systems of the facility 305. For example, the operator workstations 350, 352, 354 may be operable to monitor and control the dimmable lights, the dimmable windows 321-328, the HVAC system, the PAGA system 348, and other portions of the control center 300 communicatively connected with the processing device 356 and/or the operator workstations 350, 352, 354.

Figure 6:
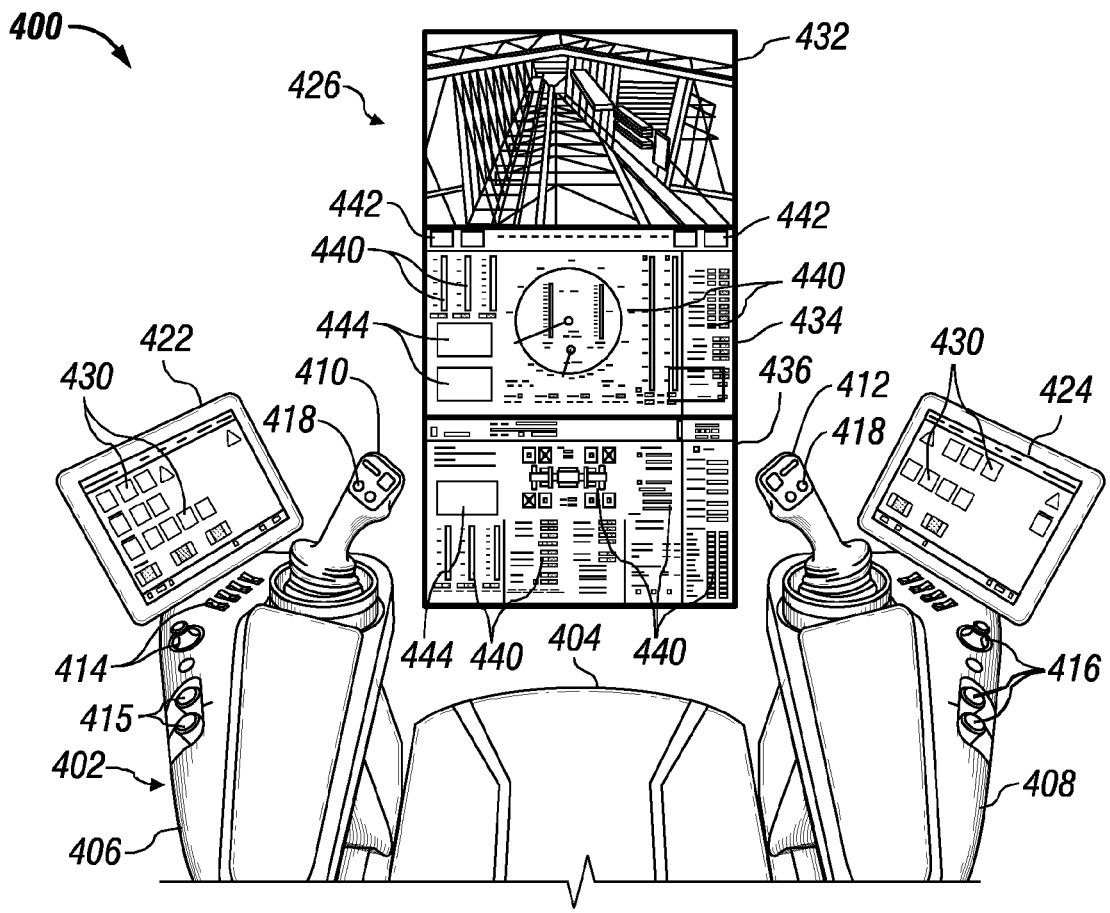
FIG. 6 is a top view of a portion of an example implementation of the apparatus shown in FIG. 5 according to one or more aspects of the present disclosure.

FIG. 6 is a top view of a portion of an example implementation of a wellsite operator control workstation 400 communicatively connected with and operable to control the well construction system 100 according to one or more aspects of the present disclosure. The control workstation 400 may facilitate receiving and displaying various information, such as sensor signals or information (e.g., sensor data 251-257), control commands (e.g., control data 261-267), processes taking place, events being detected, and operational status of various equipment of the subsystems 211-217 of the well construction system 100. The following description refers to FIGS. 1-6, collectively.

The control workstation 400 comprises an operator chair 402 (e.g., driller's chair) and an HMI system comprising a plurality of input and output devices integrated with, supported by, or otherwise disposed in association with the operator chair 402. The input devices permit the wellsite operator 195 to enter commands or other information to control the wellsite equipment of the well construction system 100, and the output devices permit the wellsite operator 195 to receive sensor signals and other information indicative of operational status of the wellsite equipment. The operator chair 402 may include a seat 404, a left armrest 406, and a right armrest 408.

The input devices of the control workstation 400 may include a plurality of physical controls, such as a left joystick 410, a right joystick 412, and/or other physical controls 414, 415, 416, 418, such as buttons, keys, switches, knobs, dials, slider bars, a mouse, a keyboard, and a microphone. One or more of the joysticks 410, 412 and/or the physical controls 414, 415, 416 may be integrated into or otherwise supported by the corresponding armrests 406, 408 of the operator chair 402 to permit the wellsite operator 195 to operate these input devices from the operator chair 402. Furthermore, one or more of the physical controls 418 may be integrated into the corresponding joysticks 410, 412 to permit the wellsite operator 195 to operate these physical controls 418 while operating the joysticks 410, 412. The physical controls may comprise emergency stop (E-stop) buttons 415, which may be electrically connected to E-stop relays of one or more pieces of wellsite equipment (e.g., the iron roughneck 151, the PHM 163, the draw works 119, the top drive 116, etc.), such that the wellsite operator 195 can shut down the wellsite equipment during emergencies and other situations.

The output devices of the control workstation 400 may include one or more video output devices 426 (e.g., video monitors), printers, speakers, and other output devices disposed in association with the operator chair 402 and operable to display to the wellsite operator 195 sensor signals and other information indicative of operational status of the well construction system 100. The video output devices 426 may be implemented as one or more LCD displays, LED displays, plasma displays, cathode ray tube (CRT) displays, and/or other types of displays.

The video output devices 426 may be disposed in front of or otherwise adjacent the operator chair 402. The video output devices 426 may include a plurality of video output devices 432, 434, 436, each dedicated to displaying predetermined information in a predetermined (e.g., programmed) manner. Although the video output devices 426 are shown comprising three video output devices 432, 434, 436, the video output devices 426 may be or comprise one, two, four, or more video output devices.

The video output devices 432, 434, 436 may each display in a predetermined manner selected sensor signals or information indicative of operational status of a selected portion of the well construction system 100. For example, the video output devices 434, 436 may display sensor signals or information 440 (e.g., sensor data 251-257) generated by the various sensors (e.g., sensors 221-227) of the well construction system 100 to permit the wellsite operator 195 to monitor operational status of the subsystems 211-217. The information 440 may be displayed in the form of virtual or computer generated lists, menus, tables, graphs, bars, gauges, lights, and schematics, among other examples.

One or more of the video output devices 426 may be configured to display video signals (i.e., video feeds) generated by one or more of the video cameras 198. For example, the video output device 432 may be dedicated for displaying the video signals generated by one or more of the video cameras 198. When displaying the video signals from multiple video cameras 198, the video output device 432 may display multiple video windows, each displaying a corresponding video signal. Furthermore, one or more of the other video output devices 434, 436 may also display the video signals from one or more of the video cameras 198. For example, one or both of the video output devices 434, 436 may display one or more video windows 444 (e.g., overlays), each displaying a video signal from a corresponding one of the video cameras 198. The video windows 444 may be embedded or inset along or adjacent the sensor information 440. Sourcing (i.e., selection) of the video cameras 198 whose video signals are to be displayed on the video output devices 426 may be selected manually by the wellsite operator 195 or automated via the control system 200, such as based on operational events (e.g., drilling events, well construction operation stage, etc.) at the well construction system 100, such that video signals relevant to an event currently taking place are displayed. The video windows 444 may also or instead display web pages and/or other software applications (e.g., historical operational trends, alarm tracking information) that may be run concurrently with the main software system displaying the information 440 shown in the video output devices 426.

The control workstation 400 may further comprise combination devices operable as both input and output devices to display information to the wellsite operator 195 and receive commands or information from the wellsite operator 195. Such devices may be or comprise touchscreens 422, 424 (i.e., touchpads) operable to display a plurality of software (e.g., virtual, computer generated) buttons, switches, knobs, dials, icons, and/or other software controls 430 permitting the wellsite operator 195 to operate (e.g., click, selected, move) the software controls 430 via finger contact with the touchscreens 422, 424 to control the various wellsite equipment of the subsystems 211-217. The software controls 430 may also be operated by the physical controls 414, 416, the joysticks 410, 412, or other input devices of the control workstation 400. The software controls 430 and/or other features displayed on the touchscreens 422, 424 may also display sensor signals or information (e.g., sensor data 251-257), operational settings, set-points, and/or status of selected wellsite equipment for viewing by the wellsite operator 195. For example, the software controls 430 may change color, move in position or direction, and/or display the sensor information, set-points, and/or operational values (e.g., temperature, pressure, position). The touchscreens 422, 424 may be disposed on, supported by, or integrated into the armrests 406, 408 or other parts of the operator chair 402 to permit the wellsite operator 195 to operate the software controls 430 displayed on the touchscreens 422, 424 from the operator chair 402.

Each video output device 426 and touchscreen 422, 424 may display (i.e., generate) a plurality of display screens (i.e., an integrated display system), each displaying to the wellsite operator 195 selected sensor signals or information 440 indicative of operational status of the well construction system 100 and software controls 442, 430 for controlling selected portions of the well construction system, respectively. Each display screen may integrate the software controls 442, 430 and/or sensor information 440 from one or more pieces of wellsite equipment (e.g., subsystems 211-217) with information generated by the control system 200 (e.g., the monitoring process 274, the control process 275, and the control data 261-267, 273) for viewing and/or operating by the wellsite operator 195. The display screens may be shown or displayed alternately on one or more of the video output devices 426 and/or the touchscreens 422, 424 or simultaneously on one or more of these devices. The display screens intended to be displayed on the video output devices 426 and/or the touchscreens 422, 424 may be selected by the wellsite operator 195 via the physical controls 414, 416, 418 and/or software controls 442, 430. The display screens intended to be displayed on the video output devices 426 and/or the touchscreens 422, 424 may also or instead be selected automatically by the control system 200 based on operational events detected (e.g., equipment failures, hazardous drilling conditions) or planned (e.g., changing phases or stages of the well construction operations) at the well construction system 100, such that information relevant to the event currently taking place is displayed. Each display screen generated by the touchscreens 422, 424 may display software controls 430 operable by the wellsite operator 195 to control the wellsite equipment associated with the software controls 430, and each display screen generated by the video output devices 426 may display information 440 indicative of operational status of the wellsite equipment associated with the information 440. Accordingly, the display screens displayed on the touchscreens 422, 424 may be referred to hereinafter as control screens, and the display screens displayed on the video output devices 426 may be referred to hereinafter as status screens.

Figure 7:
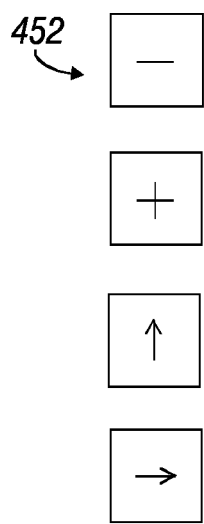
FIGS. 7-9 are example implementations of software controls displayed by the apparatus shown in FIG. 6 according to one or more aspects of the present disclosure.
Figure 8:
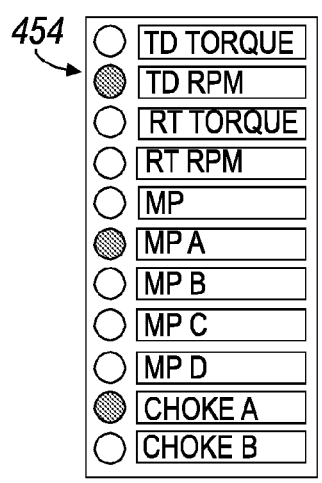
Figure 9:
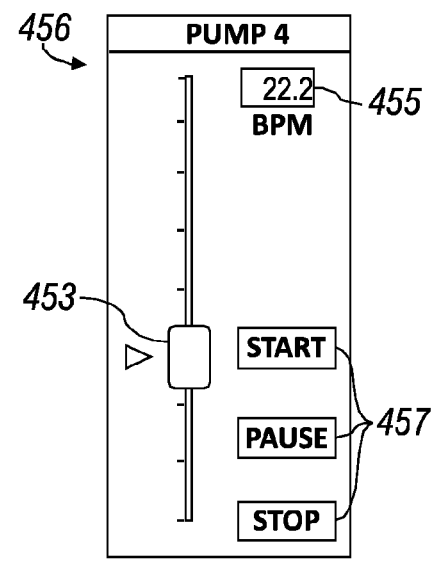

The touchscreens 422, 424 may be operable to display one or more control screens (e.g., configuration screens), which may be utilized to operate, set, adjust, configure, or otherwise control the subsystems 211-217 or other wellsite equipment. Each control screen may display one or more software controls 430, such as may permit the wellsite operator 195 to operate, set, adjust, configure, or otherwise control the subsystems 211-217 or other wellsite equipment via finger contact with the touchscreens 422, 424 from the operator chair 402. FIGS. 7-9 are example implementations of software controls 452, 454, 456 that may be displayed on the touchscreens 422, 424 and operated by the wellsite operator 195 to operate, set, adjust, configure, or otherwise control the subsystems 211-217 or other wellsite equipment of the well construction system 100. The following description refers to FIGS. 6-9, collectively.

The software controls 452, 454, 456 may be pressed, clicked, selected, moved, or otherwise operated via the physical controls 414, 416 and/or via finger contact by the wellsite operator 195 to increase, decrease, change, or otherwise enter operational parameters, set-points, and/or instructions for controlling one or more pieces of wellsite equipment of the well construction system 100. The software controls 452, 454, 456 may also display the entered and/or current operational parameters on or in association with the software controls 452, 454, 456 for viewing by the wellsite operator 195. The operational parameters, set-points, and/or instructions associated with the software controls 452, 454, 456 may include equipment operational status (e.g., on or off, up or down, set or release, position, speed, temperature, etc.), drilling parameters (e.g., depth, hook load, torque, etc.), auxiliary parameters (e.g., vibration data of a pump), and fluid parameters (e.g., flow rate, pressure, temperature, etc.), among other examples.

The software controls 452 may be or comprise software buttons, which may be operated to increase, decrease, change, or otherwise enter different operational parameters, set-points, and/or instructions for controlling one or more portions of the well construction system 100 associated with the software controls 452. The software controls 454 may be or comprise a list or menu of items (e.g., equipment, processes, operational stages, equipment subsystems, etc.) related to one or more aspects of the well construction system 100, which may be operated to select one or more items on the list. The selected items may be highlighted, differently colored, or otherwise indicated, such as via a checkmark, a circle, or a dot appearing in association with the selected items. The software controls 456 may be or comprise a combination of different software controls, which may be operated to increase, decrease, change, or otherwise enter different operational parameters, set-points, and/or instructions for controlling one or more portions of the well construction system 100 associated with the software controls 456, such as a pump of the well construction system 100. The software controls 456 may include a slider bar 453, which may be moved or otherwise operated along a graduated bar to increase, decrease, or otherwise change pump speed or another operational parameter associated with the slider bar 453. The entered pump speed may be shown in a display window 455. The software controls 456 may also include software buttons 457, such as may be operated to start, pause, and stop operation of the pump or another portion of the well construction system 100 associated with the software buttons 457.

FIGS. 10-14 are example implementations of control screens 501-505 (e.g., configuration screens or menus) that may be displayed on the touchscreens 422, 424 according to one or more aspects of the present disclosure. Each control screen 501-505 may be operated via finger contact with the touchscreens 422, 424 by the wellsite operator 195 to operate, set, adjust, configure, or otherwise control the subsystems 211-217 or other wellsite equipment of the well construction system 100 associated with or displayed on the control screen 501-505. The following description refers to FIGS. 10-14, collectively.

Each control screen, including the control screens 501-505, may display a selection bar 510 for switching between or selecting which control screen is to be displayed on the corresponding touchscreen 422, 424 and/or which status screen is to be displayed on each of the video output devices 426. Each control screen may also comprise an equipment control area 518 for displaying software controls for controlling well construction operations and/or wellsite equipment associated with the control screen. The selection bar 510 may comprise an equipment menu button 512, which when operated by the wellsite operator 195, may cause a control screen selection menu 514 (e.g., a dropdown or pop-up menu) to appear. The selection menu 514 may contain a plurality of buttons 516, each associated with and listing a corresponding well construction operation or wellsite equipment to be controlled. The wellsite operator 195 may operate (e.g., click on, touch, and/or otherwise select) one of the buttons 516 to select a well construction operation or wellsite equipment, thereby causing a corresponding control screen for controlling the associated well construction operation or wellsite equipment to be displayed.

Figure 10:
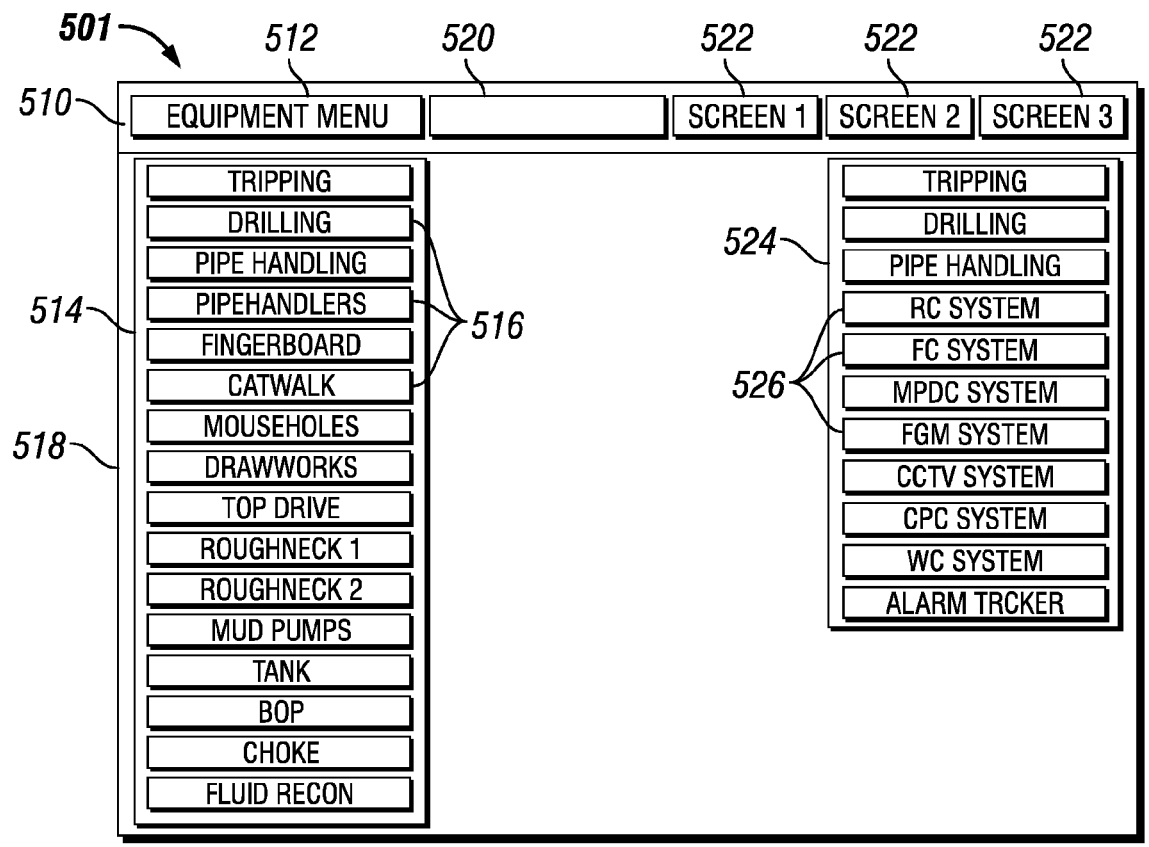
FIGS. 10-21 are example implementations of screens displayed by the apparatus shown in FIG. 6 according to one or more aspects of the present disclosure.

After one of the buttons 516 is selected, a plurality of software controls 530 (shown in FIGS. 11-14) may appear in the equipment control area 518, and the well construction operation or wellsite equipment that is selected may be listed or otherwise identified in a control screen identification area 520. The software controls 530 or other information displayed in the equipment control area 518 will change when the wellsite operator 195 switches between the various control screens by selecting different buttons 516. As shown in FIG. 10, example control screens that may be selected for display on the touchscreens 422, 424 may include a tripping control screen displaying software controls for controlling automatic operation of wellsite equipment collectively operable to perform the tripping operations, a drilling control screen displaying software controls for controlling automatic operation of wellsite equipment collectively operable to perform the drilling operations, a drill pipe handling control screen displaying software controls for controlling automatic operation of wellsite equipment collectively operable to move drill pipes at the wellsite, and a plurality of individual equipment control screens each displaying software controls for automatically and/or manually controlling operation of individual wellsite equipment, such as the pipe handlers, the fingerboard 165, the catwalk 131, the top drive 116, the roughneck 151, the choke 162, and fluid reconditioning equipment 170, among other examples. Although not described herein, the control screens within the scope of the present disclosure may include control screens displaying software controls for controlling other individual wellsite equipment and/or wellsite equipment subsystems (e.g., subsystems 211-217).

Each control screen, including the control screens 501-505, may also be utilized to switch between or select which status screen is to be displayed on which video output device 432, 434, 436. For example, the selection bar 510 may comprise status screen selection buttons 522, each associated with a corresponding one of the video output devices 432, 434, 436 and, when operated by the wellsite operator 195, operable to cause a corresponding status screen selection menu 524 (e.g., a dropdown or pop-up menu) to appear. Each selection menu 524 may contain a plurality of buttons 526, each associated with and listing a corresponding well construction operation, wellsite equipment, and/or subsystem (e.g., subsystem 211-217) of the well construction system 100 to be displayed. The wellsite operator 195 may operate (e.g., click on, touch, and/or otherwise select) one of the buttons 522 and buttons 526 to select one of the video output devices 432, 434, 436 and a well construction operation, wellsite equipment, or subsystem, thereby causing a corresponding status screen displaying sensor signals or information 440 indicative of operational status of the selected well construction operation, wellsite equipment, or subsystem to be displayed on the selected video output device 432, 434, 436.

Each of the buttons 522 may also be displayed on one or more of the video output devices 432, 434, 436. Thus, each of the buttons 522 may be implemented as the software controls 442 (shown in FIG. 6) and displayed on one or more display screens 601-606 (shown in FIGS. 16-21) displayed on one or more of the video output devices 432, 434, 436. When operated by the wellsite operator 195 via finger contact or an input device (e.g., the joystick 410, 412) a status screen selection menu 524 (e.g., a dropdown or pop-up menu) may appear on a corresponding video output device 432, 434, 436. The wellsite operator 195 may then operate one of the buttons 526 to select a well construction operation, wellsite equipment, or a subsystem, thereby causing a corresponding status screen (e.g., status screens 601-606 shown in FIGS. 16-21) displaying sensor signals or information 440 indicative of operational status of the selected well construction operation, wellsite equipment, or subsystem to be displayed on the video output device 432, 434, 436. The status screens that may be displayed on the video output devices 432, 434, 436 are described in more detail below.

When operated, the software controls 530 may activate, deactivate, start, stop, configure, or otherwise control operation of the wellsite equipment associated with the software controls 530. The software controls 530 may initiate automatic operation of the wellsite equipment associated with the control screen, such as by operating an "AUTO" software button. The software controls 530 may also cause manual control of the wellsite equipment associated with the control screen to be given to the wellsite operator 195, such as by operating a "MANUAL" software button. The software controls 530 may be grouped by related equipment and/or related operations, which may be identified by text 532 associated with each group of software controls 532.

Furthermore, each software control 530 may list or otherwise identify the piece of equipment or operation that is controlled or otherwise associated with the software control 530. One or more of the software controls 530 may list or otherwise indicate the operational status (i.e., feedback) of the wellsite equipment or operation associated with the software control 530. One or more of the software controls 530 may also display graphical symbols (e.g., arrows, bars, geometric shapes indicative of a piece of equipment, exclamation points, etc.), which may be indicative of the operation and/or operational status associated with the software controls 530. For example, one or more of the software controls 530 may change color, text, shape, graphical symbols, or otherwise change to indicate that a piece of wellsite equipment associated with the software control 530 is activated, deactivated, or in a predetermined position, or that an operation associated with the software control 530 has commenced, stopped, or is in a particular stage.

Figure 11:
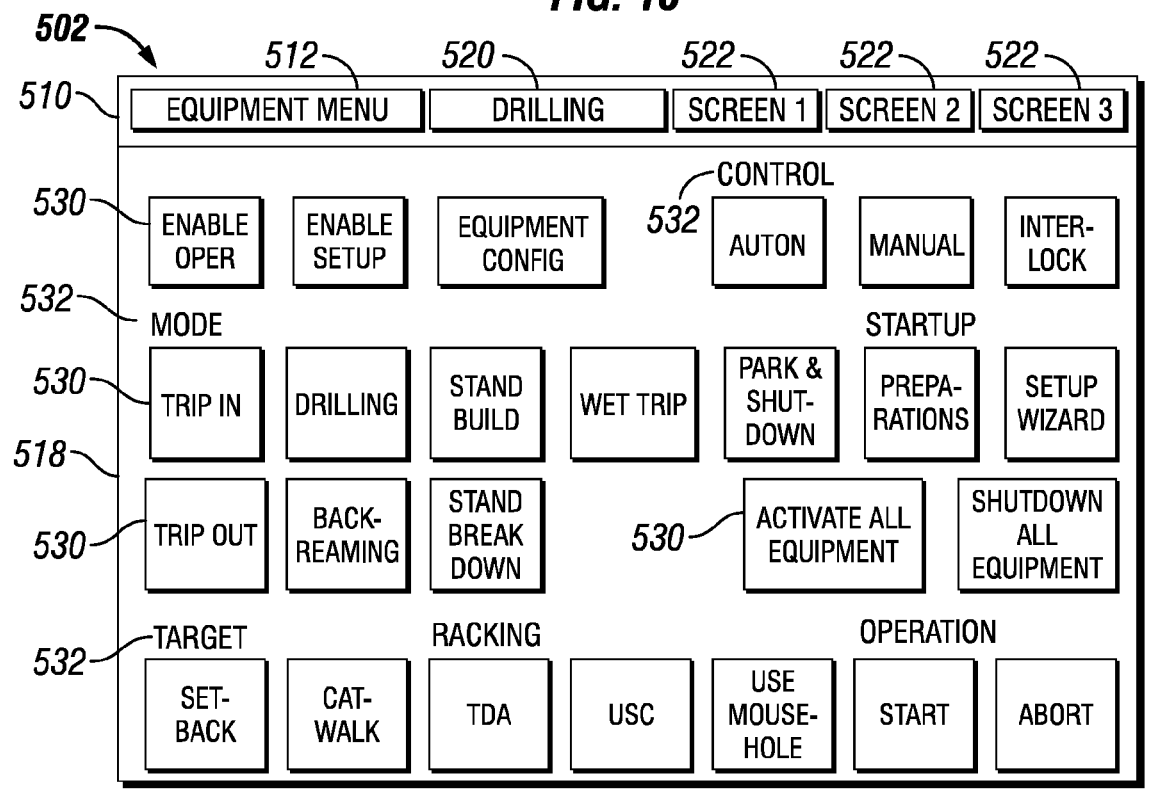

FIG. 11 is an example implementation of a "DRILLING" control screen 502 that may be utilized to control automated and/or manual operation of a plurality of wellsite equipment associated with and/or collectively operable to perform drilling operations according to one or more aspects of the present disclosure. The control screen 502 may display in the equipment control area 518 various software controls 530 for controlling various wellsite equipment and/or operational parameters of the drilling operations performed by well construction system 100. For example, when operated, the software controls 530 may activate, deactivate, start, stop, configure, or otherwise control automated operation of the wellsite equipment associated with the drilling operations. Such wellsite equipment may include the top drive 116, the draw works 119, the pump 114, and the BOP equipment 130, 132 among other examples.

Figure 12:
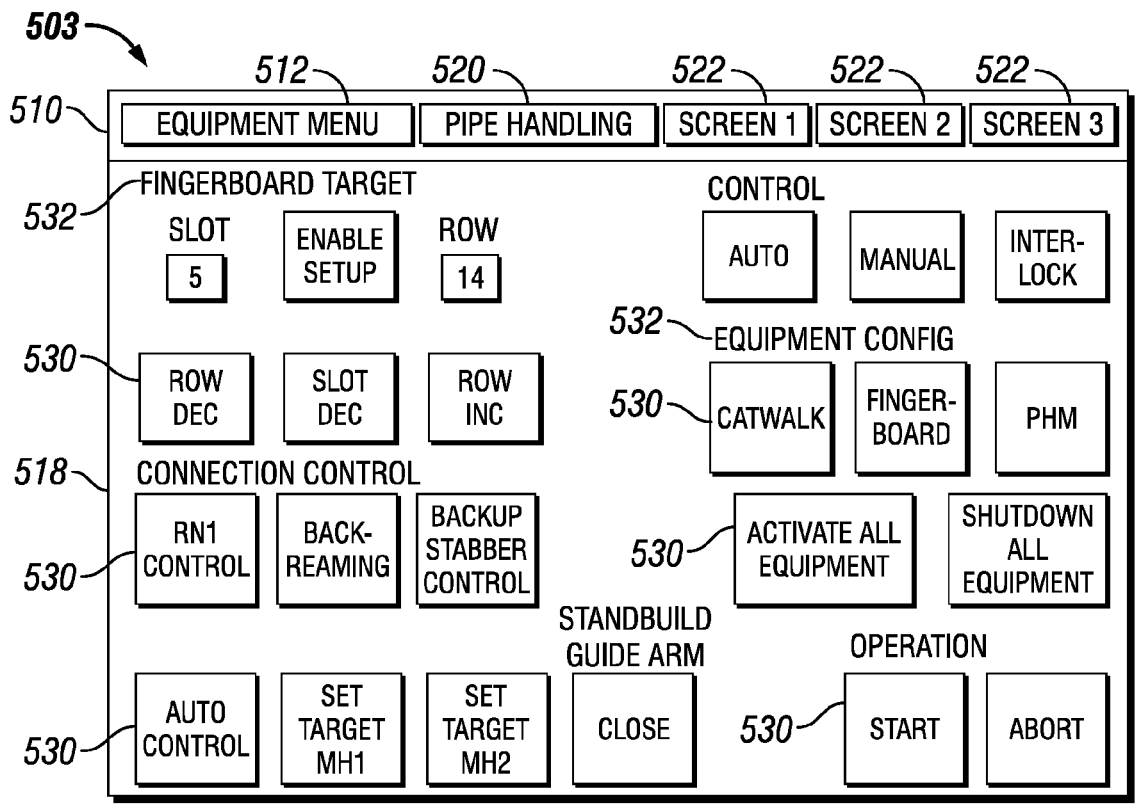

FIG. 12 is an example implementation of an "PIPE HANDLING" control screen 503 that may be utilized to control automated and/or manual operation of a plurality of wellsite equipment associated with and/or collectively operable to perform drill pipe handling (e.g., moving, storing) operations according to one or more aspects of the present disclosure. The control screen 503 may display in the equipment control area 518 various software controls 530 for controlling various wellsite equipment and/or operational parameters of the drill pipe handling operations performed by well construction system 100. For example, when operated, the software controls 530 may activate, deactivate, start, stop, configure, or otherwise control automated operation of the wellsite equipment associated with the drill pipe handling operations. Such wellsite equipment may include the catwalk 131, the fingerboard 165, the PHM 163, the iron roughneck 151, and the reciprocating slip 161, among other examples.

Figure 13:
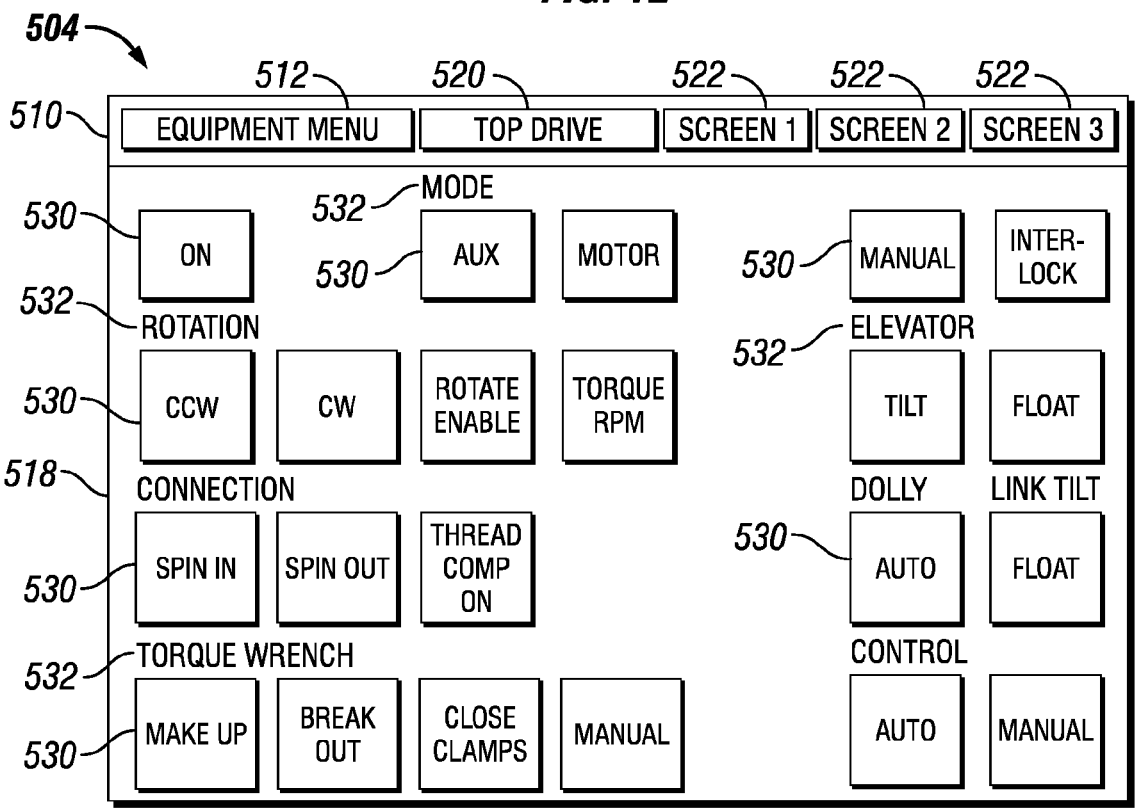

FIG. 13 is an example implementation of a "TOP DRIVE" control screen 504 that may be utilized to control automated and/or manual operation of the top drive 116 according to one or more aspects of the present disclosure. The control screen 504 may display in the equipment control area 518 various software controls 530 for configuring or controlling the various operations performed by the top drive 116 and/or operational parameters associated with the top drive 116. For example, when operated, the software controls 530 may activate, deactivate, start, stop, configure, or otherwise control operation of one or more portions of the top drive 116, such as the drive shaft 125, the grabber, the swivel, the tubular handling assembly 127, and other portions of the top drive 116. The software controls 530 may also be utilized to control other wellsite equipment that may be directly or closely associated with or operate in close association with the top drive 116, such as the iron roughneck 151.

Figure 14:
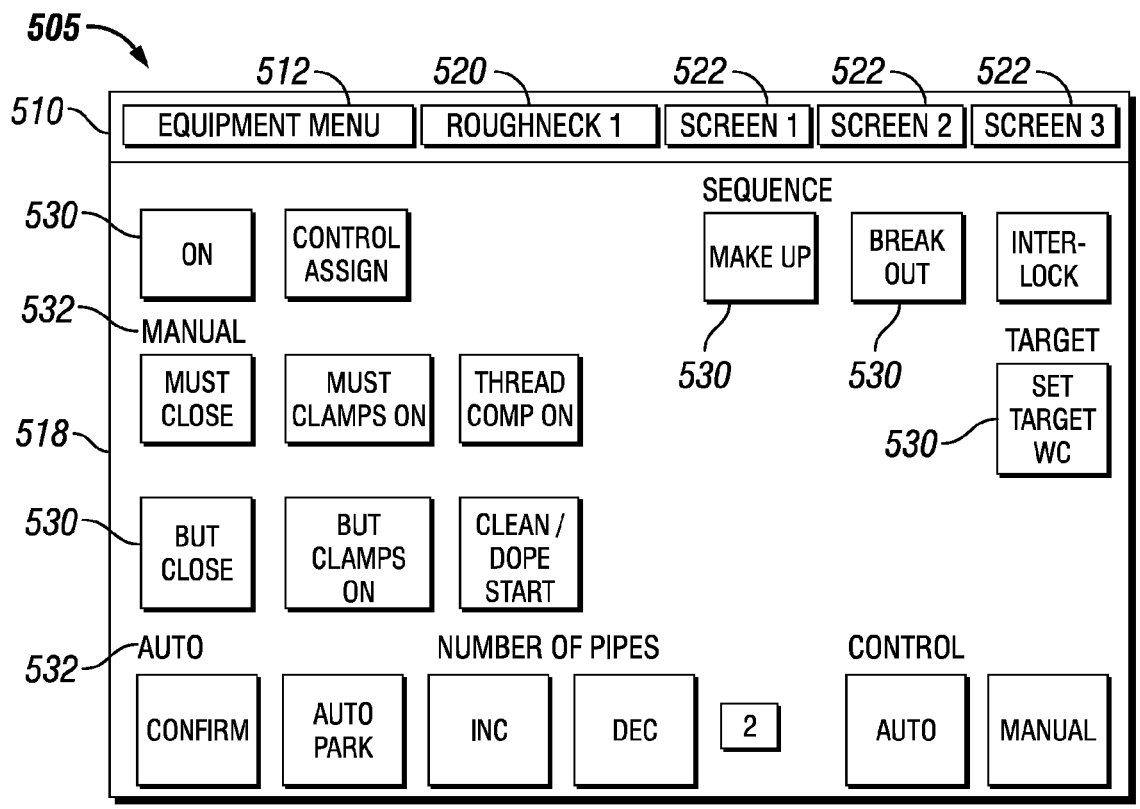

FIG. 14 is an example implementation of a "ROUGHNECK 1" control screen 505 that may be utilized to control automated and/or manual operation of one of the iron roughnecks 151 according to one or more aspects of the present disclosure. The control screen 505 may display in the equipment control area 518 various software controls 530 for configuring or controlling the various operations performed by the iron roughneck 151 and/or operational parameters associated with the iron roughneck 151. For example, when operated, the software controls 530 may activate, deactivate, start, stop, configure, or otherwise control operation of one or more portions of the iron roughneck 151, such as the spinner and the torque wrench, including the lower tong and upper tongs and the associated clamps. The software controls 530 may also be utilized to control other wellsite equipment that may be directly or closely associated with or operate in close association with the iron roughneck 151.

The video output devices 126 and/or the touchscreens 422, 424 may also display manual control guide menus or screens utilized by the wellsite operator 195 to guide or assist the wellsite operator 195 to manually control selected operations of the well construction system 100 or an individual piece of wellsite equipment. The guide screens may display control functions of a selected one of the joysticks 410, 412, the associated physical controls 418, and/or other physical controls 414, 416 with respect to a selected operation or a piece of wellsite equipment. Manual control may be initiated, for example, when the "MANUAL" software control 530 button is selected on one of the control screens displayed on one of the touchscreens 422, 424. Thereafter, the control system 200 may abort automatic operation of the associated wellsite equipment, transfer operational control to a predetermined joystick 410, 412 and/or other physical controls 414, 416, and display a corresponding manual control guide listing the control functions for manually controlling the wellsite equipment associated with the control screen.

Figure 15:
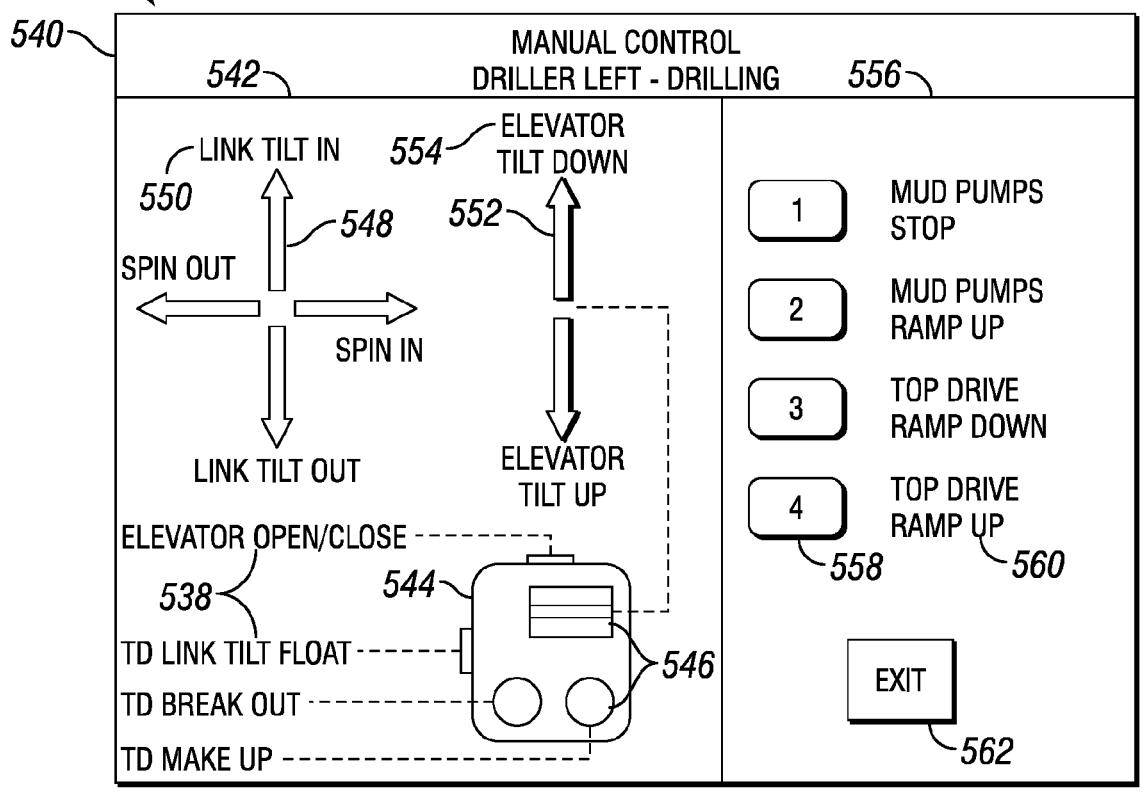

FIG. 15 is an example implementation of a manual control guide screen 506 displaying control functions for controlling drilling operations via the left joystick 410 and physical controls 414. The guide screen 506 may display a title bar 540 identifying operation or wellsite equipment to be controlled and the joystick 410 and/or physical controls 414 for controlling such operation or wellsite equipment. The guide screen 506 may comprise a joystick control area 542 displaying a schematic view 544 of the joystick 410 and a schematic view 546 of the associated physical controls 418 (e.g., joystick buttons and thumb lever). Each schematic button 546 is associated with text 538 describing control functions of each corresponding physical button 418 of the joystick 410. The joystick control area 542 may further display arrows 548 and corresponding text 550 describing control functions associated with movements of the joystick 410, and arrows 552 and corresponding text 554 describing control functions associated with movement of the joystick thumb lever 418. The guide screen 506 may also comprise a button control area 556 displaying schematic views 558 of the corresponding physical controls 414. The button control area 556 may further display text 560 describing control functions associated with operation of each of the corresponding physical controls 414. The guide screen 506 may further display an "EXIT" software control 562, which may be operated to abort manual control of the drilling operations and close the guide screen 506.

As described above with respect to FIG. 6, an operator workstation within the scope of the present disclosure may display on one or more of the video output devices 426 a plurality of status screens, each displaying selected sensor signals or information (e.g., sensor data 251-257) generated by various sensors (e.g., sensors 221-227) of the wellsite construction system 100, such as may permit the wellsite operator to monitor operations, wellsite equipment, and/or equipment subsystems (e.g., subsystems 211-217) described herein. FIGS. 16-21 are views of example implementations of status screens 601-606 displayed on one or more of the video output devices 426 according to one or more aspects of the present disclosure. The following description refers to FIGS. 16-21, collectively.

The status screens, including the status screens 601-606, may be displayed alternatingly on one of the video output devices 426. Some of the status screens may display operational status of a well construction operation (e.g., tripping, drilling, pipe handling, etc.) involving a plurality of pieces of wellsite equipment operating in a coordinated manner to perform such operation, which may permit the wellsite operator 195 to monitor operational status or parameters of such operation on a single status screen. Some of the status screens may display operational status of a single piece of wellsite equipment or a subsystem (e.g., subsystem 211-217) of wellsite equipment, such as may also permit the wellsite operator 195 to monitor operational status or parameters of a single piece of equipment or an equipment subsystem. As described above, the status screen and the corresponding operation, wellsite equipment, or equipment subsystem may be selected via the touchscreens 422, 424. As shown in FIG. 10, example status screens that may be selected for display may include a tripping status screen displaying information indicative of operational status of the tripping operations, a drilling status screen displaying information indicative of operational status of the drilling operations, a pipe handing status screen displaying information indicative of operational status of the drill pipe handling operations, and a plurality of subsystem status screens each displaying information indicative of operational status of the corresponding subsystem of the well construction system 100. Although not described herein, the status screens within the scope of the present disclosure may also or instead include status screens displaying information indicative of operational status of individual pieces of wellsite equipment described herein.

The status screens, including the status screens 601-606, may comprise a wellsite status screen indicator and alarm window or area 610 (e.g., banner), which may visually indicate which operation or wellsite equipment is being displayed on a selected video output device 426 and if safety or operational alarms associated with an operation or wellsite equipment are active. For example, the area 610 may include a plurality of indicators 612 (e.g., text, icons, graphics, etc.) listing operations, wellsite equipment, and/or equipment subsystems that may be displayed via corresponding status screens. The indicator 612 corresponding to the operation, wellsite equipment, or equipment subsystem of the currently displayed status screen may appear or become lit, highlighted, or otherwise marked to indicate to the wellsite operator 195 which status screen is displayed. The area 610 may further include a plurality of alarm or event indicators 614 (e.g., lights), each associated with a corresponding operation, wellsite equipment, or equipment subsystem indicator 612. One or more of the indicators 614 may activate (e.g., light up, change color, etc.), such as via operation of the control system 200 (shown in FIG. 3), to visually inform the wellsite operator 195 of an alarm or operational event taking place at or associated with a corresponding operation, wellsite equipment, or equipment subsystem. Responsive to the event indicator 614 being activated, the wellsite operator 195 may switch to a status screen corresponding to the activated event indicator 614 to assess the event and/or implement appropriate counteractive measures or actions. Instead of manually changing between the status screens, the status screens may change automatically to show the status screen corresponding to the operation, wellsite equipment, or equipment subsystem experiencing the event.

The status screens, including the status screens 601-606, may further comprise a primary operational status window or area 616, displaying selected sensor signals or information indicative of operational status of the operation, wellsite equipment, or equipment subsystem associated with the displayed status screen. The information displayed in the primary operational status area 616 may be generated by the actual wellsite equipment performing the operation or forming the equipment subsystem associated with the displayed status screen. The information displayed in the primary operational status area 616 may change when a different display screen is displayed, such as via a software control 522, 442 and/or the menu 524 displayed on one of the video output devices 434, 436 or touchscreens 422, 424. The information in the primary operational status area 616 may be displayed in the form of lists, menus, tables, graphs, bars, gauges, lights, and schematics, among other examples.

The primary operational status area 616 may also display alarm tracking information indicative of safety and operational alarms associated with various equipment and subsystems of the well construction system 100. The alarm tracking information may include information listing and describing currently active alarms and alarms that were active in the past. The alarm list may be filtered or arranged by group, priority, and/or type, among other criteria. The wellsite operator 195 may acknowledge the alarms and block/unblock selected alarms. The alarm or event indicators 614 may also comprise or operate as software controls 442, which when operated (e.g., touched, clicked), may cause the alarm tracking information to be displayed in the area 616.

The status screens, including the status screens 601-606, may further comprise a secondary operational status window or area 618 (e.g., banner), displaying selected sensor signals or information indicative of operational status of drilling operations and/or general status of the well construction operations, such as may permit the wellsite operator to monitor progress of the drilling operations and/or other well construction operations while monitoring a specific operation, wellsite equipment, or equipment subsystem displayed in the primary operational status area 616. The secondary operational status area 618 may also display sensor signals or information indicative of operational status of other wellsite equipment that is related to, but not necessarily performing, the drilling operations. The information that is displayed in the secondary operational status area 618 may remain unchanged or change partially when a different status screen is displayed, such as may permit the wellsite operator 195 to monitor progress of the drilling operations and/or other well construction operations while monitoring different operations, wellsite equipment, or equipment subsystems associated with the different status screens.

However, the information that is displayed in the secondary operational status area 618 may change when a different status screen is displayed. The changing information may permit the wellsite operator 195 to monitor operational status of other wellsite equipment that is related to, but not necessarily directly performing the operation displayed in the primary operational status area 616 and/or monitor operational status of other wellsite equipment that is related to the wellsite equipment or equipment subsystem displayed in the primary operational status area 616. The information in the secondary operational status area 618 may be displayed in the form of lists, menus, tables, graphs, bars, gauges, lights, and schematics, among other examples.

Figure 16:
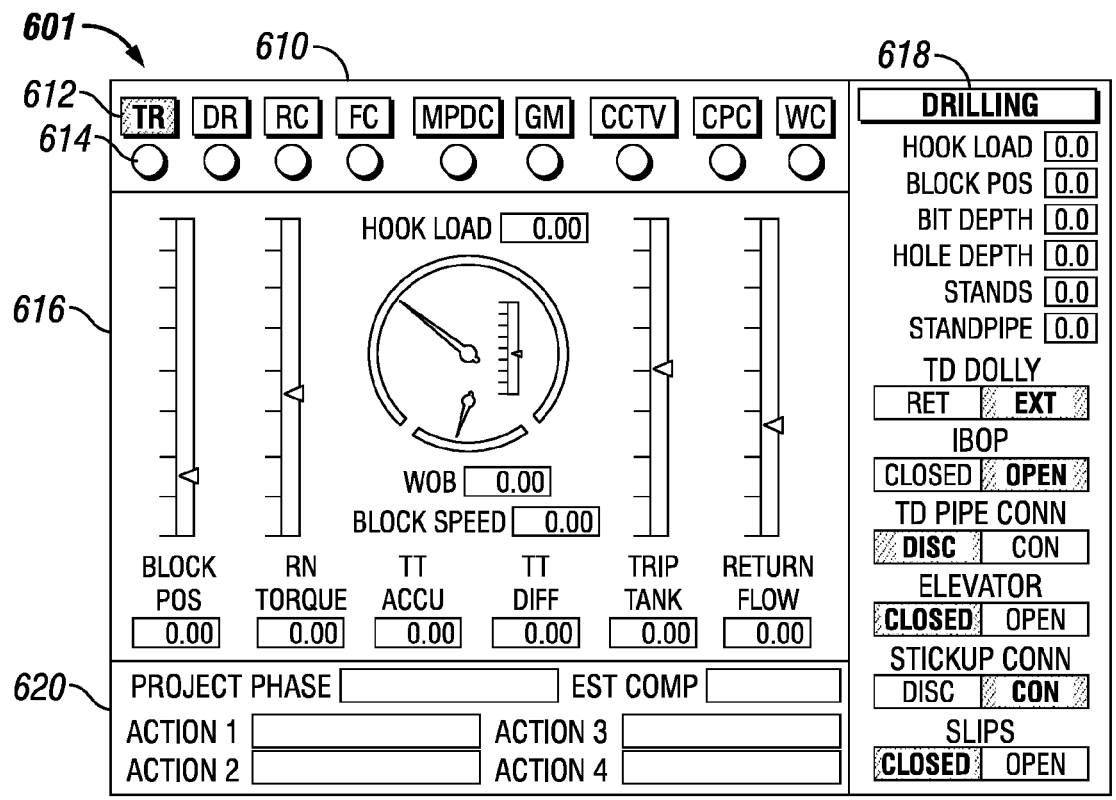
Figure 17:
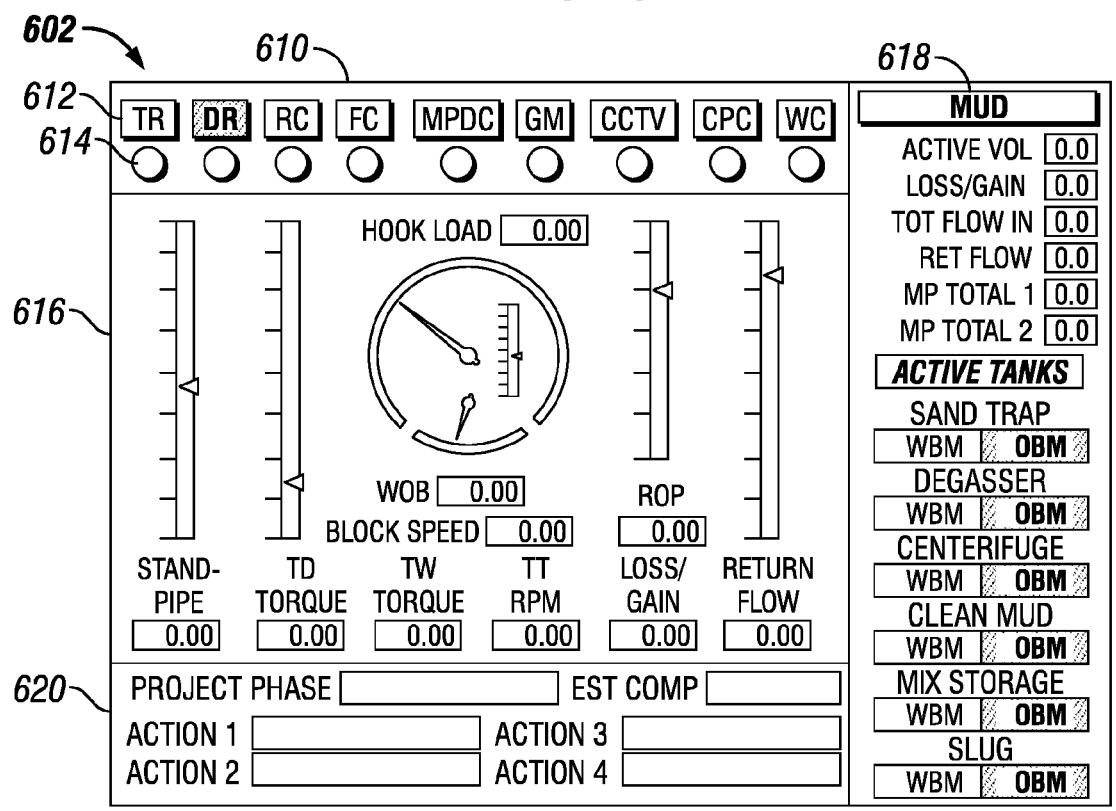

Each status screen, including the status screens 601-606, may also comprise a detailed description window or area 620 (e.g., banner) listing and/or describing one or more aspects related to the operation, wellsite equipment, or equipment subsystem displayed in the primary operational status area 616 or another aspect of the well construction operations. For example, as shown in FIGS. 16 and 17, the description area 620 may display general and/or detailed description of work or activities (e.g., a construction or job plan) that was, is, or will be performed or overseen at the wellsite by the wellsite operator 195. The description area 620 may display proactive information regarding the work and/or call-to-actions guiding future work. The description of work may include a title or name of the project stage or phase, an estimated completion date (i.e., deadline) for completing the project stage, and/or a list of operational steps or actions to be implemented by the wellsite operator 195 during the project stage. However, the control system 200 may automatically operate the wellsite equipment or subsystem to automatically implement such steps or actions pursuant to the construction or job plan, such as by transmitting predetermined control commands to a corresponding piece of wellsite equipment or subsystem. Such automated operations may be initiated, for example, by operating an "AUTO" software button 530 on an associated control screen, as described above.

Figure 18:
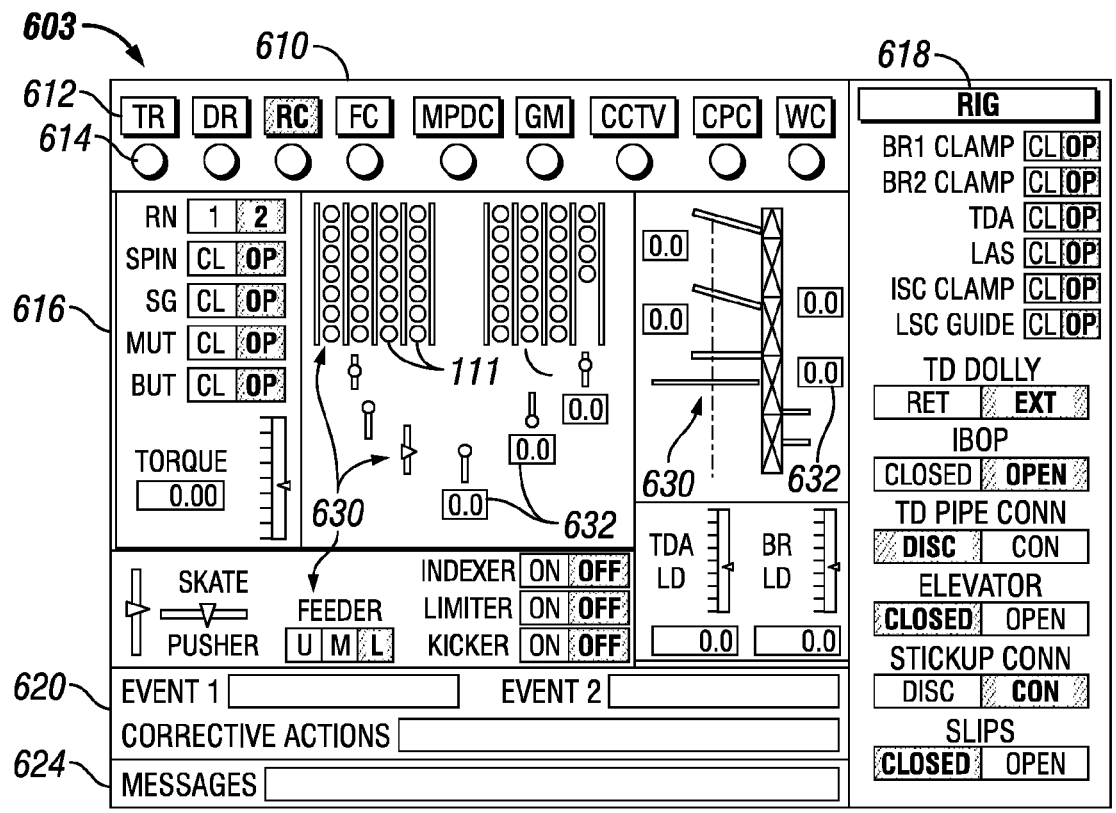
Figure 19:
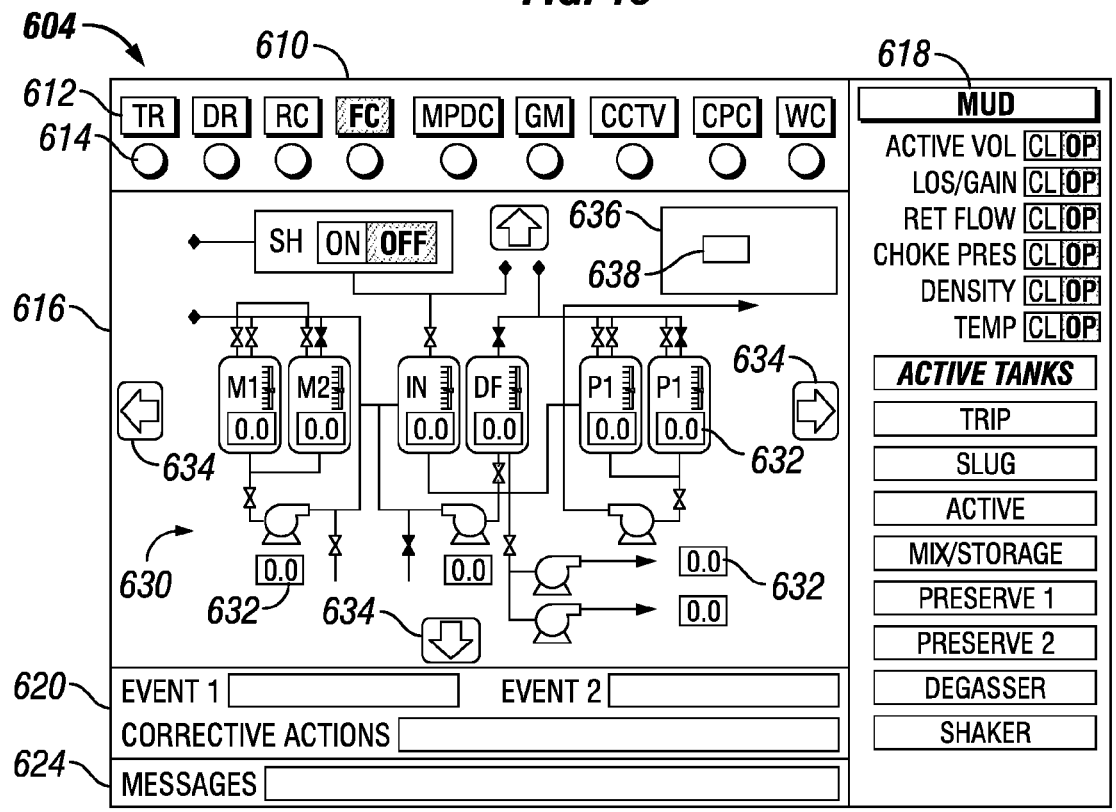
Figure 20:
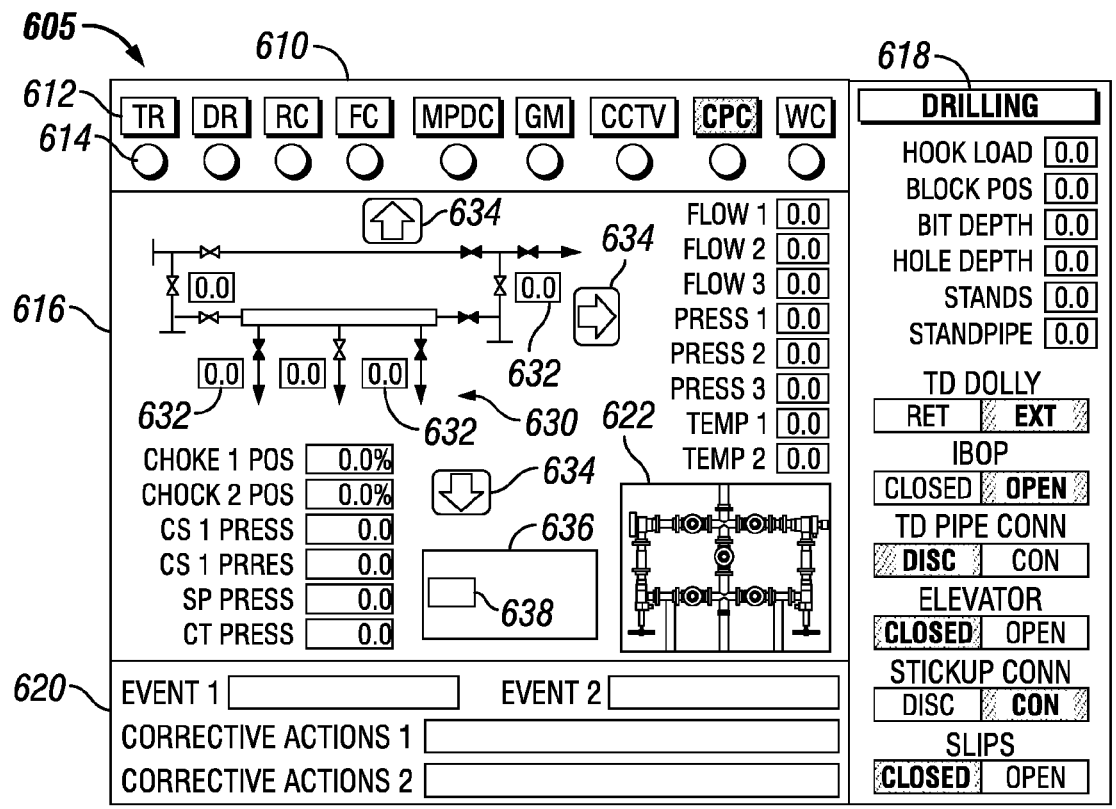

As shown in FIGS. 18-20, the description area 620 may also or instead display detailed description or information related to the events detected or otherwise taking place at the well construction system 100. The description area 620 may also list and/or describe one or more counteractive measures (e.g., corrective actions, operational sequences) related to the event that may be performed or otherwise implemented in response to the event. Depending on the event and/or mode (e.g., advice, interlock, automated) in which the control system 200 (e.g., the computing resource environment 205) is operating, the description area 620 may describe the corrective action to be initiated or otherwise implemented by the wellsite operator 195. However, the control system 200 may automatically implement the corrective action, or cause the corrective action to be automatically implemented, such as by transmitting predetermined control commands to a corresponding piece of wellsite equipment or subsystem. The information displayed in the description area 620 may just display events and/or corrective actions related to the operation, wellsite equipment, or equipment subsystem shown in the primary operational status area 616 and, thus, change when switching between the status screens. However, when events are detected, the information displayed in the description area 620 may remain unchanged when switching between the status screens, and may list each detected event and/or corresponding corrective action, such as in chronological order or in the order of importance. As described above, the control system 200 may automatically change the status screen to show the operation, wellsite equipment, or equipment subsystem experiencing the event.

One or more of the status screens 601-606 (e.g., status screens 603, 604) may further include a message window or area 624 (e.g., box). The message area 624 may display text messages that are received and/or sent by the wellsite operator 195 sitting at the control workstation 400. The text messages may be sent by other wellsite operators 195 working on the well construction system 100 or other company personnel at a remote location. The text messages may be typed by the wellsite operator 195 using a physical keyboard (not shown) or a software keyboard displayed on one of the touchpads 422, 424. The message area 624 may also or instead display computer-generated text messages informing the wellsite operator 195 of operational status of wellsite equipment and/or well construction progress. The message area 624 may also or instead display computer-generated text messages informing the wellsite operator 195 of an improper operation, such as if/when the wellsite operator 195 is attempting to execute a prohibited operation or an operation that is not recommended. The message area 624 may then display text messages informing the wellsite operator 195 of a proper or recommended operation that may be executed by the wellsite operator 195.

Each status screen, including the status screens 601-606, may further include one or more video windows 622 (shown in FIGS. 20 and 21), each displaying in real-time a video signal from a predetermined video camera 198 to display wellsite equipment associated with the operation, wellsite equipment, or equipment subsystem displayed in the primary operational status area 616. The video windows 622 may be embedded or inset on the corresponding status screens, such as within the primary operational status area 616. The view shown in the video window 622 may be manually or automatically switched between different video cameras 198 to show different wellsite equipment or different views of the wellsite equipment. The video windows 622 may also or instead comprise software overlays running concurrently with the main control software displaying the information shown on the screens 601-606. The software overlays 622 may display web pages and/or other software applications running concurrently with the main control software.

As described above, the status screens to be displayed on the video output devices 426 may be selected via the touchscreens 422, 424. However, the status screens, including the sensor signals or information displayed in the indicator and alarm area 610, the primary operational status area 616, the secondary operational status area 618, the detailed description area 620, and/or the windows 622, may automatically change based on successive stages of the well construction operations. For example, while the well construction operations progress through successive stages (e.g., tripping, drilling, pipe handling, etc.), the control system 200 may cause the video output devices 426 to automatically change and display a status screen comprising information indicative of operational status of wellsite equipment performing or otherwise associated with a current stage of the well construction operations.

Each status screen, including the status screens 601-606, may be adjusted or otherwise configured by the wellsite operator 195 to display one or more of the various information areas 610, 616, 618, 620 in an intended position on each status screen. For example, the indicator and alarm area 610 may be displayed at the top of the status screens, the detailed description area 620 may be displayed at the bottom of the status screens, the primary operational status area 616 may be displayed in the middle on the left side of the status screens, and the secondary operational status area 618 may be displayed on the right side of the status screens. Furthermore, the location and/or size (i.e., dimensions) of the video windows 622 displayed on each status screen may also be adjusted or otherwise selected. The relative location of the information areas 610, 616, 618, 620 and the video windows 622 on the status screens may also be selected, for example, via one or more of the physical controls 414, 416, 418, such as by dragging and dropping the information areas 610, 616, 618, 620 and/or the video windows 622 to an intended location on the status screens.

FIG. 16 is an example implementation of a status screen 601 displaying sensor signals or information indicative of operational status of various wellsite equipment associated with and collectively operable to perform drill pipe tripping operations according to one or more aspects of the present disclosure. When the wellsite operator 195 or the control system 200 causes the tripping operations status screen 601 to be displayed on one of the video output devices 426, the indicator 612 associated with the tripping operations, such as letters "TR," may appear or become highlighted to visually indicate to the wellsite operator 195 that the tripping operations status screen is being displayed. The primary operational status area 616 may display information, such as hook load, weight-on-bit, travelling block position, roughneck torque, trip tank accumulation or volume, and return flow, among other examples. The secondary operational status area 618 may display information related to drilling operations, such as hook load, traveling block position, drill bit depth, wellbore depth, number of stands or tubulars in the wellbore, standpipe pressure, top drive dolly location, inside BOP position, top drive pipe connection status, elevator status, stickup connection status, and slips status, among other examples. The description area 620 may display a work plan (i.e., well construction plan) related to the tripping operations, including actions or steps that will be performed or overseen at the wellsite by the wellsite operator 195 during the tripping operations. However, the description area 620 may also or instead display information indicative of operational events, as described above.

FIG. 17 is an example implementation of a status screen 602 displaying sensor signals or information indicative of operational status of various wellsite equipment associated with and collectively operable to perform drilling operations according to one or more aspects of the present disclosure. When the wellsite operator 195 or the control system 200 causes the drilling operations status screen 602 to be displayed on one of the video output devices 426, the indicator 612 associated with the drilling operations, such as letters "DR," may appear or become highlighted to visually indicate to the wellsite operator 195 that the drilling operations status screen is being displayed. The primary operational status area 616 may display information, such as hook load, travelling block speed, weight-on-bit, rate of penetration, standpipe pressure, top drive torque, torque wrench torque, top drive rotational speed, drilling fluid loss/gain, and drilling fluid return flow, among other examples. The secondary operational status area 618 may display information related to drilling operations, such as information related to or indicative of drilling fluid (i.e., mud) operational status and/or active tank operational status. The description area 620 may display a work plan (i.e., well construction plan) related to the drilling operations, including actions or steps that will be performed or overseen at the wellsite by the wellsite operator 195 during the drilling operations. However, the description area 620 may also or instead display information indicative of operational events, as described above.

As described above, the status screens may display sensor signals or information indicative of operational status of wellsite equipment subsystems (e.g., subsystems 211-217). FIG. 18 is an example implementation of an RC system status screen 603 displaying sensor signals or information indicative of operational status of the RC system 211 according to one or more aspects of the present disclosure. When the wellsite operator 195 or the control system 200 causes the RC system status screen 603 to be displayed on one of the video output devices 426, the indicator 612 associated with the RC system 211, such as letters "RC," may appear or become highlighted to visually indicate to the wellsite operator 195 that the RC system status screen 603 is being displayed. The primary operational status area 616 may display sensor signals or information related to various pieces of wellsite equipment forming the RC system 211, such as the iron roughneck 151, the fingerboard 165, the PHM 163, and the catwalk 131, among other examples. The primary operational status area 616 may also display schematic representations 630 of such wellsite equipment to visually display to the wellsite operator 195 operational status (e.g., position) of such wellsite equipment. For example, the schematic representations 630 of the drill floor 114, catwalk 131, the fingerboard 165, the iron roughneck 151, and the PHM 163 may visually indicate to the wellsite operator 195 in real-time movements and positions of various portions of such wellsite equipment. The RC system status screen 603 may include schematic representations 630 of a skate and a pusher of the catwalk 131, of a tubular delivery arm (TDA), a lower stabilizing arm (LSA), a setback guide arm (SGA), an intermediate stand constraint (ISC), and a lower stand constraint (LSC) of the PHM 163, and of the fingerboard 165 containing the drill pipe 111, among other examples. Portions of the schematic representations 630 (e.g., various arms of the PHM 163) may change position and/or color to visually indicate to the wellsite operator 195 various positions and movements of the represented wellsite equipment. The primary operational status area 616 may also display sensor signals or information indicative of operational status of the wellsite equipment within text boxes 632 located in association with the schematic representations 630 of the wellsite equipment. The secondary operational status area 618 may display information related to drilling operations and/or additional information related to operational status of the RC system 211, such as additional information that is not displayed in the primary operational status area 616. The description area 620 may display information indicative of operational events, as described above. However, the description area 620 may also or instead display a work plan related to tripping, drilling, or other wellsite construction operations.

FIG. 19 is an example implementation of an FC system status screen 604 displaying sensor signals or information indicative of operational status of the FC system 212 according to one or more aspects of the present disclosure. When the wellsite operator 195 or the control system 200 causes the FC system status screen 604 to be displayed on one of the video output devices 426, the indicator 612 associated with the FC system 212, such as letters "FC," may appear or become highlighted to visually indicate to the wellsite operator 195 that the FC system status screen 604 is being displayed. The primary operational status area 616 may display sensor signals or information related to various pieces of wellsite equipment forming the FC system 212, such as the solids and gas control equipment 170, the drilling fluid container 142, and the drilling fluid pumps 144, among other examples. The primary operational status area 616 may also display schematic representations 630 of such wellsite equipment to visually display to the wellsite operator 195 operational status of such wellsite equipment. The schematic representations 630 may include, for example, the drilling fluid pumps 144, the drilling fluid tanks 142, and various portions of the solids and gas control equipment 170, including a shaker and a plurality of tanks, such as pre-mix tanks, intermediate tanks, and pill tanks, among other examples. The primary operational status area 616 may visually indicate to the wellsite operator 195 in real-time operational status, fluid levels, flow rates, flow directions, and valve positions of the wellsite equipment forming the FC system 212. Portions of the schematic representations 630 (e.g., fluid valves) may change position and/or color to visually indicate to the wellsite operator 195 operational status (e.g., positions) of such wellsite equipment. The primary operational status area 616 may also display sensor signals or information indicative of operational status of the wellsite equipment within text boxes 632 located in association with the schematic representations 630 of the wellsite equipment.

Selected display screens (e.g., display screens 604, 605) showing portions of the FC system 212 or other fluid subsystems or equipment (e.g., fluid reconditioning equipment 170, choke manifolds 162, mud pumps 144, fluid pipes 148, 146, etc.) may include "next screen" software controls 634 (e.g., buttons), which when operated (e.g., touched, clicked), may change the fluid subsystem or equipment currently being shown in the primary operational status area 616 to another fluid subsystem or equipment that is physically adjacent to or connected with (and thus "next") the fluid subsystem or equipment that is currently shown. The software controls 634 may permit the wellsite operator 195 to scroll (i.e., move) in each direction to show a subsequent portion (e.g., a fluid subsystem or equipment) of the entire fluid system of the well construction system 100 by operating a corresponding software control 634. The selected display screens may also show a scaled-down representation 636 (e.g., a map) of the entire fluid system and a bracket 638 that moves with respect to the scaled-down representation 636 while the wellsite operator 195 scrolls through the entire fluid system, thereby indicating which portion of the entire fluid system the wellsite operator 195 is viewing.

The secondary operational status area 618 may display information related to drilling operations and/or additional information related to operational status of the FC system 212, such as additional information that is not displayed in the primary operational status area 616. The description area 620 may display information indicative of operational events, as described above. However, the description area 620 may also or instead display a work plan related to tripping, drilling, or other wellsite construction operations.

FIG. 20 is an example implementation of a CPC system status screen 605 displaying sensor signals or information indicative of operational status of the CPC system 216 according to one or more aspects of the present disclosure. When the wellsite operator 195 or the control system 200 causes the CPC system status screen 605 to be displayed on one of the video output devices 426, the indicator 612 associated with the CPC system 216, such as letters "CPC," may appear or become highlighted to visually indicate to the wellsite operator 195 that the CPC system status screen 605 is being displayed. The primary operational status area 616 may display sensor signals or information related to various pieces of wellsite equipment forming the CPC system 216, such as the choke manifold 162 and related wellsite equipment. The primary operational status area 616 may also display schematic representations 630 of the wellsite equipment to visually display to the wellsite operator 195 operational status of such wellsite equipment. The schematic representations 630 may include, for example, various fluid control valves (e.g., ball valves, adjustable chokes) of the choke manifold 162 and a plurality of fluid control valves fluidly connected with the choke manifold 162. The primary operational status area 616 may visually indicate to the wellsite operator 195 in real-time operational status, fluid flow rates, fluid pressures, and valve positions of the wellsite equipment forming the CPC system 216. Portions of the schematic representations 630 (e.g., fluid valves) may change position and/or color to indicate to the wellsite operator 195 operational status (e.g., positions) of such wellsite equipment. The primary operational status area 616 may also display sensor signals or information indicative of operational status of the wellsite equipment within text boxes 632 located in association with the schematic representations 630 of the wellsite equipment. The secondary operational status area 618 may display information related to drilling operations and/or additional information related to operational status of the CPC system 216, such as additional information that is not displayed in the primary operational status area 616. The description area 620 may display information indicative of operational events, as described above. However, the description area 620 may also or instead display a work plan related to tripping, drilling, or other wellsite construction operations. A video window 622 showing a real-time view of the choke manifold 162 or another portion of the CPC system 216 may be displayed in the primary operational status area 616 or another area of the CPC system status screen 605.

Figure 21:
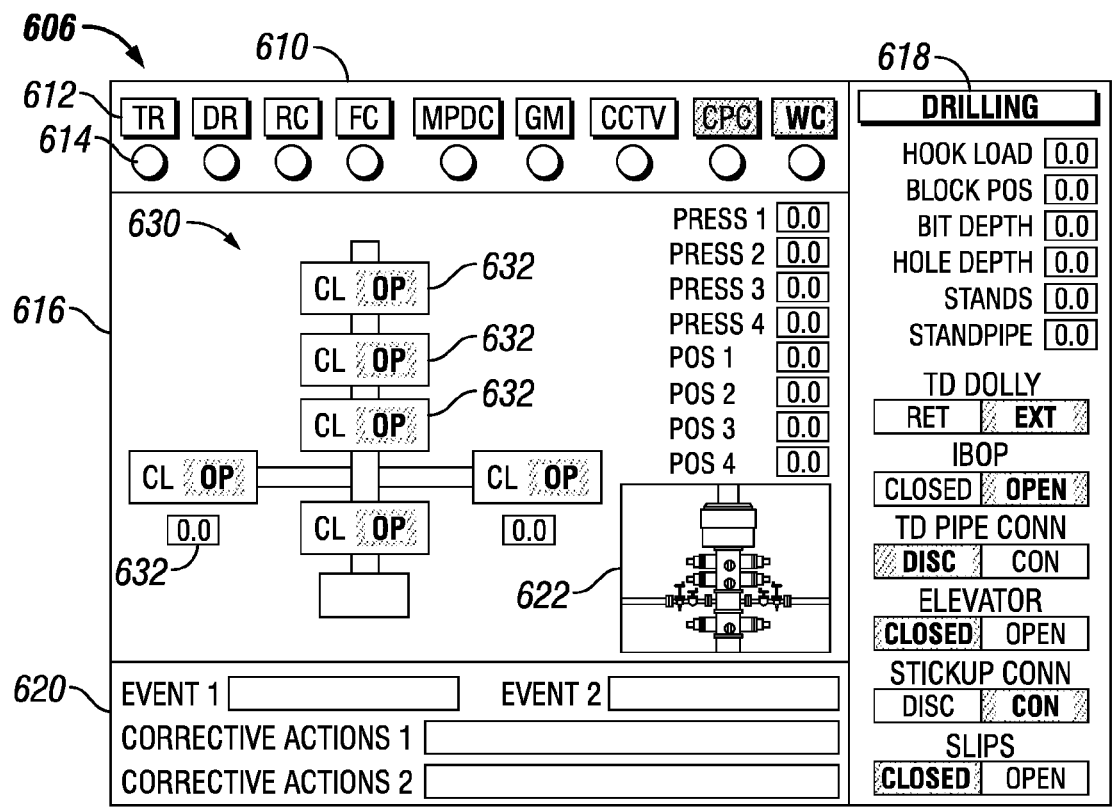

FIG. 21 is an example implementation of a WC system status screen 606 displaying sensor signals or information indicative of operational status of the WC system 217 according to one or more aspects of the present disclosure. When the wellsite operator 195 or the control system 200 causes the WC system status screen 606 to be displayed on one of the video output devices 426, the indicator 612 associated with the WC system 217, such as letters "WC," may appear or become highlighted to visually indicate to the wellsite operator 195 that the WC system status screen 606 is being displayed. The primary operational status area 616 may display sensor signals or information related to various pieces of wellsite equipment forming the WC system 217, such as the BOP equipment 130, 132. Information displayed in the primary operational status area 616 may include, for example, information related to risers/diverters, POD controls, POD regulators, analog sensor values (e.g., pressure, position), BOP event alarm signals, and inclination sensors. The primary operational status area 616 may visually indicate to the wellsite operator 195 in real-time operational status, fluid pressures, and operational positions of the wellsite equipment forming the CPC system 216. The primary operational status area 616 may also display schematic representations 630 of the wellsite equipment to visually display to the wellsite operator 195 operational status of such wellsite equipment. The schematic representations 630 may include, for example, the BOP stack 130 and the annular fluid control device 132, and visually indicate to the wellsite operator 195 operational status (e.g., position) of the various rams and valves of the BOP stack 130 and the annular fluid control device 132. Portions of the schematic representations 630 (e.g., fluid valves, rams) may change position and/or color to indicate to the wellsite operator 195 operational status (e.g., positions) of such wellsite equipment. The primary operational status area 616 may also display sensor signals or information indicative of operational status of the wellsite equipment within text boxes 632 located in association with the schematic representations 630 of the wellsite equipment. The secondary operational status area 618 may display information related to drilling operations and/or additional information related to operational status of the WC system 217, such as additional information that is not displayed in the primary operational status area 616. The description area 620 may display information indicative of operational events, as described above. However, the description area 620 may also or instead display a work plan related to tripping, drilling, or other wellsite construction operations. A video window 622 showing a real-time view of the BOP equipment 130, 132 or another portion of the WC system 217 may be displayed in the primary operational status area 616 or another area of the WC system status screen 606.

The operator workstation 400 may also be utilized by the wellsite operator 195 to control various features or portions of the facility 305. For example, the operator workstation 400 may display, on one or more of the video output devices 426 and/or the touchscreens 422, 424, one or more software tools (i.e., computer programs) operable to configure or otherwise control the various ancillary systems of the facility 305. Each software tool may display, on one or more of the video output devices 426 and/or the touchscreens 422, 424, one or more configuration display screens or menus, which may be utilized to set, adjust, or otherwise configure the various features or portions of the facility 305. The configuration display screens or menus may be displayed on the touchscreens 422, 424 to permit the wellsite operator 195 to operate the displayed software controls 430 via finger contact with the touchscreens 422, 424 from the operator chair 404.

One or more of the touchscreens 422, 424 may display a tool selection bar displaying a plurality of software icons, buttons, or other software controls operable by the wellsite operator 195 to display corresponding configuration screens or menus for configuring or otherwise controlling the well construction system 100, including the subsystems 211-217 and ancillary systems. FIGS. 22-28 show example implementations of a tool selection bar 708 and various configuration menus generated by the processing device 192 and/or other processing devices and displayed on one or more of the touchscreens 422, 424 according to one or more aspects of the present disclosure. Each configuration menu may be utilized to configure or otherwise control selected portions of the well construction system 100 by the wellsite operator 195 via finger contact with the touchscreens 422, 424. The tool selection bar 708 may be displayed on one or both of the touchscreens 422, 424 independently of which configuration menu is displayed, such as may permit the wellsite operator 195 to quickly switch between different configuration menus, each associated with a corresponding portion and/or subsystem of the well construction system 100.

Figure 22:
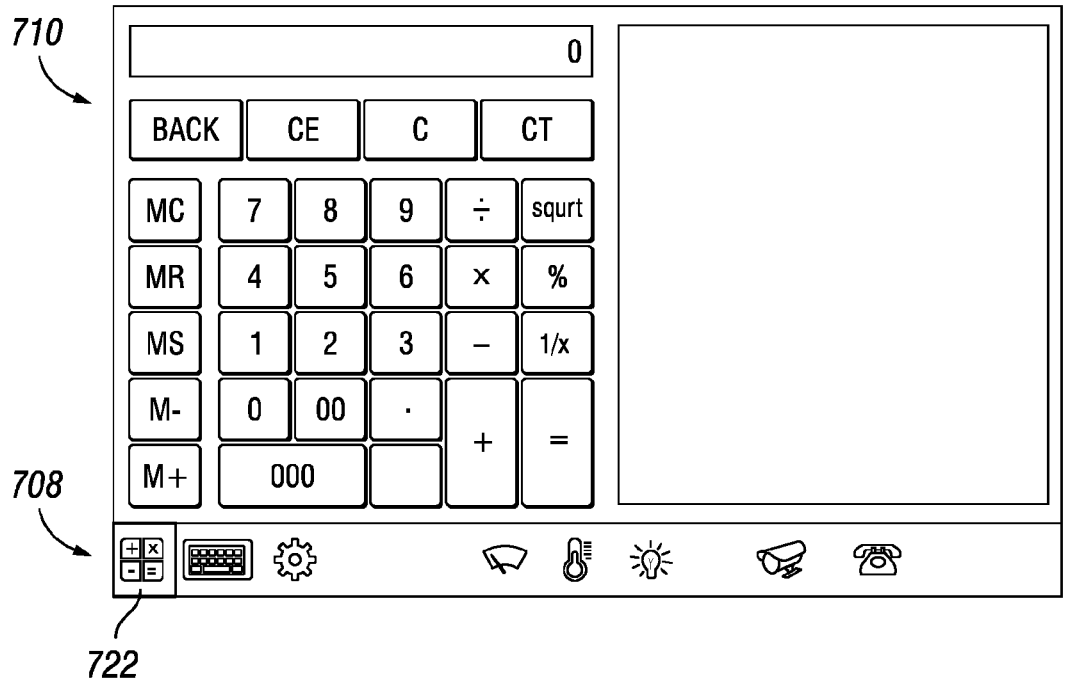
FIGS. 22-28 are views of example implementations of control menus displayed by the apparatus shown in FIG. 6 according to one or more aspects of the present disclosure.
Figure 23:
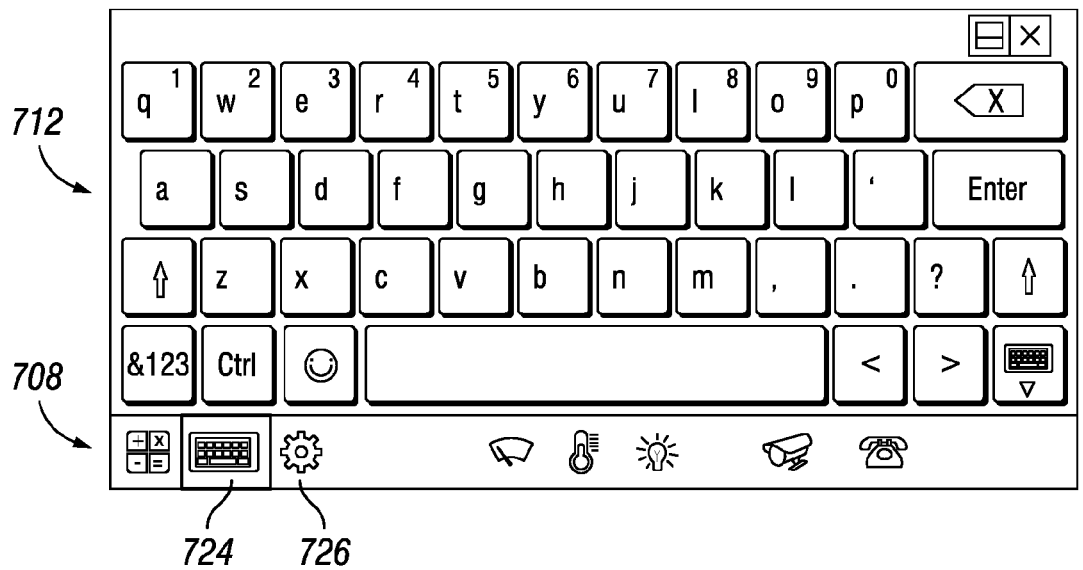

As shown in FIG. 22, configuration menu 710 may be or comprise a calculator, which may be displayed when a calculator tool icon 722 is selected (i.e., touched) on the selection bar 708. The calculator may be utilized by the wellsite operator 195 to perform mathematical calculations, such as to determine operational parameters to be entered into the processing device 192. As shown in FIG. 23, configuration menu 712 may be or comprise a software keyboard, which may be displayed when a keyboard tool icon 724 is selected on the selection bar 708. The keyboard may be utilized by the wellsite operator 195 to enter text commands into the processing device 192 and/or to compose text messages to be transmitted to other wellsite operators 195 located at or off the wellsite 104. The configuration menu 708 may further display a configuration tool icon 726, which when selected, may display a configuration screen/menu preference menu (not shown) for configuring how the various configuration menus or screens are displayed to the wellsite operator 195.

Figure 24:
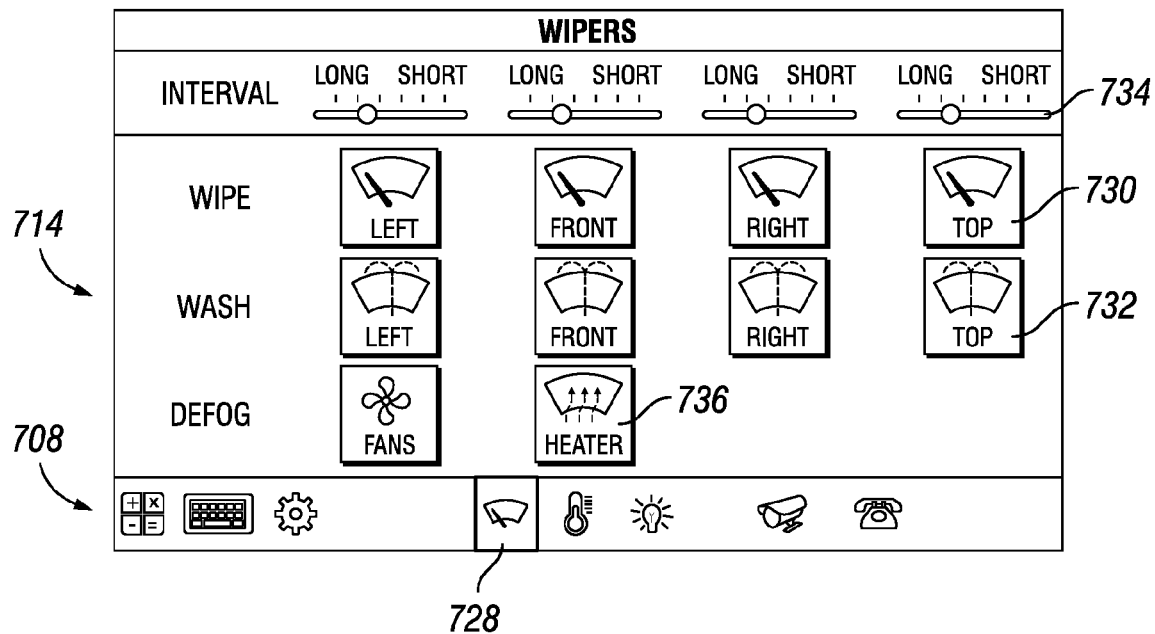
Figure 25:
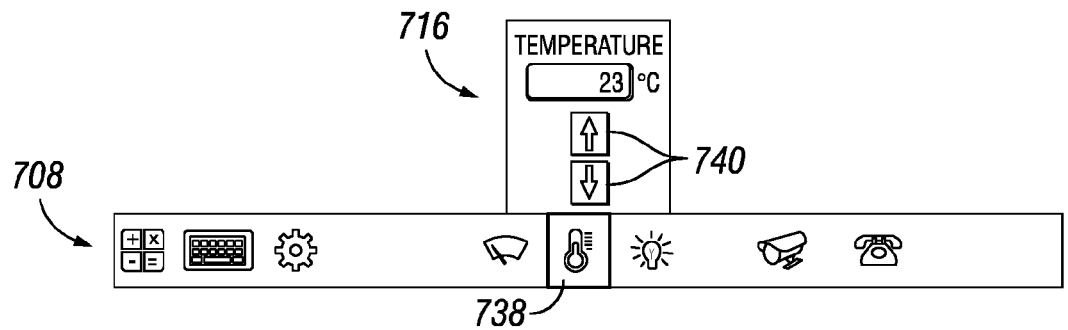
Figure 26:
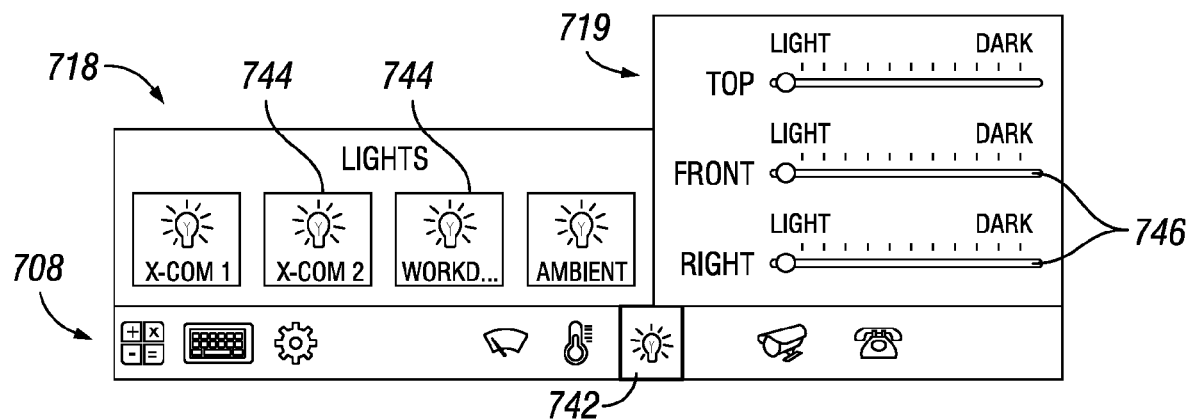

As shown in FIG. 24, the tool selection bar 708 may further include a windows control tool icon 728 for displaying a window control menu 714 when selected. The window control menu 714 may comprise wiper software controls 730 and washer software controls 732 operable to activate the wiper/washing devices 344 of the facility 305. The window control menu 714 may further comprise interval software controls 734 operable to set time intervals at which the windows 321-328 of the facility 305 are wiped and/or washed. The window control menu 714 may also comprise defog device software controls 736 operable to operate window fans and/or heaters of the facility 305 to prevent or minimize condensation on the windows 321-328. As shown in FIG. 25, the tool selection bar 708 may further include a climate control tool icon 738 for displaying a temperature control menu 716 when selected. The temperature control menu 716 may comprise temperature adjustment software controls 740 operable to increase and decrease the temperature within the facility 305 when operated. As shown in FIG. 26, the tool selection bar 708 may further include the lighting control tool icon 742 for displaying one or more control menus 718, 719 when selected. The control menu 718 may comprise light selection software controls 744 operable to select a light, a group of lights, or a lighting zone to be adjusted. The control menu 719 may comprise window tint software controls 746 operable to increase and decrease tint level of the windows 321-328 associated with the tint software controls 746 to adjust the amount of sunlight entering the facility 305.

Figure 27:
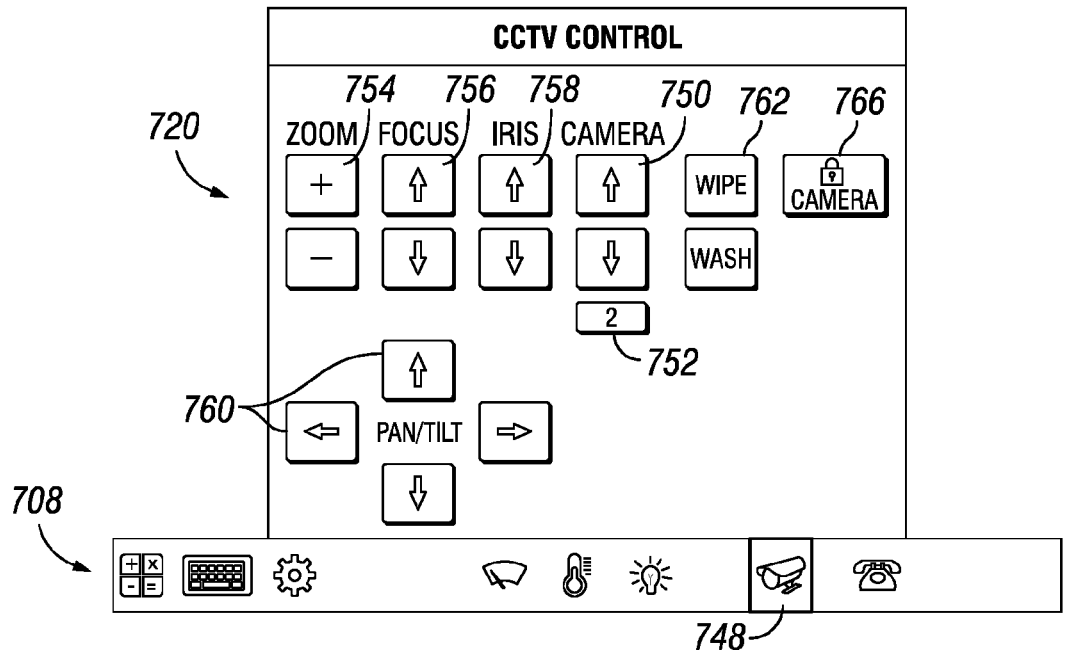

As shown in FIG. 27, the tool selection bar 708 may also include the CCTV control tool icon 748 for displaying the CCTV control menu 720 when selected. The CCTV control menu 720 may comprise a plurality of software controls collectively operable to configure or otherwise control the CCTV system 215, including the video cameras 198. The CCTV control menu 720 may comprise software controls 750 for selecting the video cameras 198 to be configured or controlled. When the software controls 750 are operated, name or number of the video camera 198 selected for configuration may appear in a display window 752. After a video camera 198 is selected, the software controls 754 may be operated to increase or decrease the zoom of the selected video camera 198, the software controls 756 may be operated to increase or decrease the focus of the selected video camera 198, the software controls 758 may be operated to increase or decrease the iris (i.e., aperture) of the selected video camera 198, and the software controls 760 may be operated to increase or decrease the pan and tilt of the selected video camera 198. Additional software controls 762, 764 may be operated to wipe and wash, respectively, the selected video camera 198. The configuration menu 720 may also include a video camera lock software control 766 operable lock video camera settings and/or controls, such as to inhibit unauthorized wellsite operators 195 from configuring or otherwise controlling the locked video cameras 198.

Figure 28:
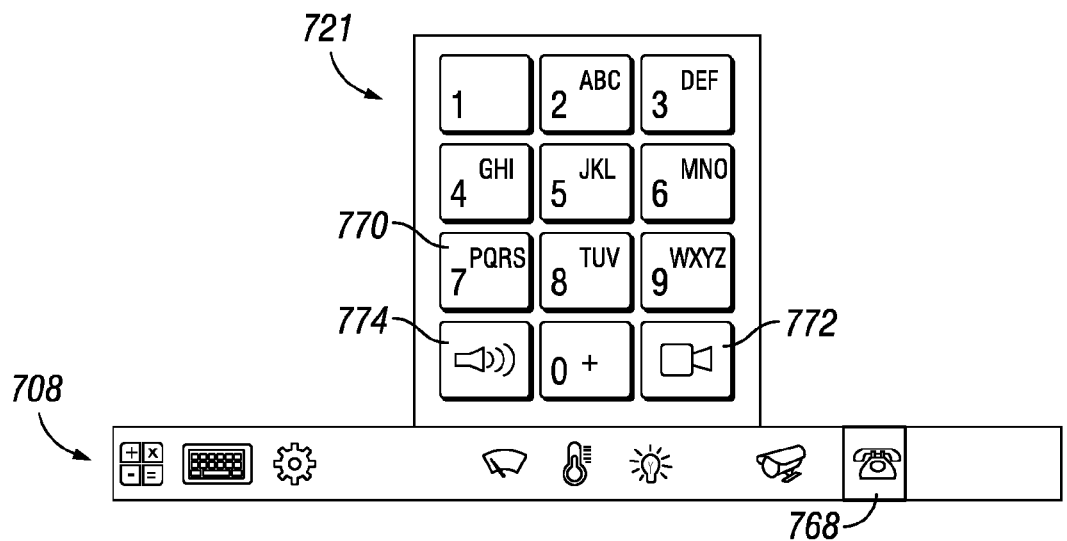

As shown in FIG. 28, the tool selection bar 708 may also include a PAGA/phone tool icon 768 for displaying a PAGA and phone control menu 721 when selected. The PAGA and phone control menu 721 may comprise a phone dialing pad 770, which may be utilized to initiate a phone call, and a video conference button 772, which may be utilized to initiate a video camera to conduct a video conference call. The PAGA and phone control menu 721 may comprise a PAGA button 774 operable to activate the PAGA system 348 to permit the wellsite operator 195 to make a public announcement to other wellsite operators 195 at the wellsite 104.

As shown in FIGS. 22-28, the selected one of the icons 722, 724, 726, 728, 738, 742, 748, 768 of the selection bar 708 may be highlighted, differently colored, or otherwise distinguished from the non-selected icons, such as to inform the wellsite operator 195 which configuration menu is currently being displayed. It is to be understood that the configuration menus and corresponding icons described above are merely examples, and additional and/or different configuration menus and corresponding icons are also within the scope of the present disclosure.

Figure 29:
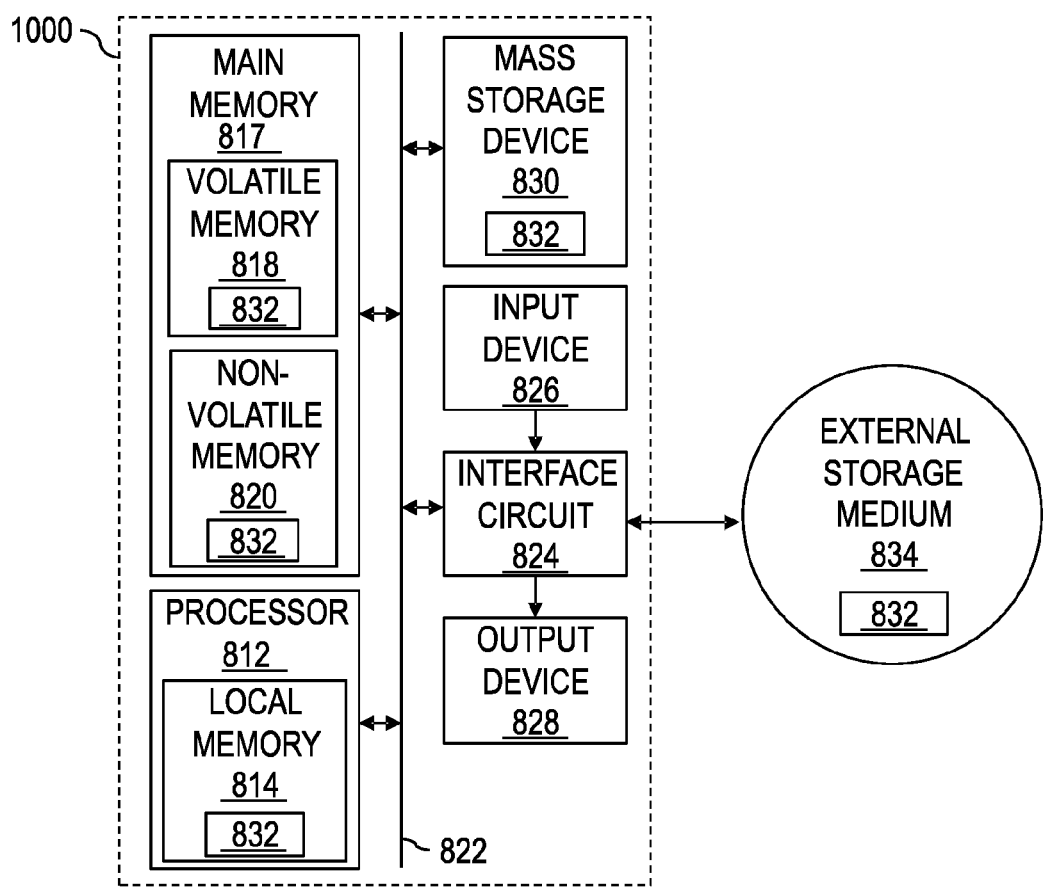
FIG. 29 is a schematic view of at least a portion of an example implementation of apparatus according to one or more aspects of the present disclosure.

FIG. 29 is a schematic view of at least a portion of an example implementation of a processing device 800 according to one or more aspects of the present disclosure. The processing device 800 may form at least a portion of one or more electronic devices utilized at the well construction system 100. For example, the processing device 800 may be or form at least a portion of the processing devices 188, 192, 356, the BOP control station 370, and the control workstations 350, 352, 354, 400. The processing device 800 may form at least a portion of the control system 200, including the wellsite computing resource environment 205, the coordinated control device 204, the supervisory control system 207, the local controllers 241-247, the onsite user devices 202, and the offsite user devices 203.

The processing device 800 may be in communication with various sensors, actuators, controllers, and other devices of the subsystems 211-217, the ancillary systems, and/or other portions of the well construction system 100. The processing device 800 may be operable to receive coded instructions 832 from the wellsite operators 195 via the wellsite control workstation 400 and the sensor data 251-257 generated by the sensors 221-227, process the coded instructions 832 and the sensor data 251-257, and communicate the control data 261-267 to the local controllers 241-247 and/or the actuators 231-237 of the subsystems 211-217 to execute the coded instructions 832 to implement at least a portion of one or more example methods and/or operations described herein, and/or to implement at least a portion of one or more of the example systems described herein.

The processing device 800 may be or comprise, for example, one or more processors, special-purpose computing devices, servers, personal computers (e.g., desktop, laptop, and/or tablet computers), personal digital assistants, smartphones, internet appliances, and/or other types of computing devices. The processing device 800 may comprise a processor 812, such as a general-purpose programmable processor. The processor 812 may comprise a local memory 814, and may execute coded instructions 832 present in the local memory 814 and/or another memory device. The processor 812 may execute, among other things, the machine-readable coded instructions 832 and/or other instructions and/or programs to implement the example methods and/or operations described herein. The programs stored in the local memory 814 may include program instructions or computer program code that, when executed by the processor 812 of the processing device 800, may cause the subsystems 211-217, the ancillary systems, and/or individual pieces of wellsite equipment of the well construction system 100 to perform the example methods and/or operations described herein. The processor 812 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Of course, other processors from other families are also appropriate.

The processor 812 may be in communication with a main memory 817, such as may include a volatile memory 818 and a non-volatile memory 820, perhaps via a bus 822 and/or other communication means. The volatile memory 818 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 820 may be, comprise, or be implemented by read-only memory, flash memory, and/or other types of memory devices. One or more memory controllers (not shown) may control access to the volatile memory 818 and/or non-volatile memory 820.

The processing device 800 may also comprise an interface circuit 824. The interface circuit 824 may be, comprise, or be implemented by various types of standard interfaces, such as an Ethernet interface, a universal serial bus (USB), a third generation input/output (3GIO) interface, a wireless interface, a cellular interface, and/or a satellite interface, among others. The interface circuit 824 may also comprise a graphics driver card. The interface circuit 824 may also comprise a communication device, such as a modem or network interface card to facilitate exchange of data with external computing devices via a network (e.g., Ethernet connection, digital subscriber line (DSL), telephone line, coaxial cable, cellular telephone system, satellite, etc.). One or more of the local controllers 241-247, the sensors 221-227, and the actuators 231-237 may be connected with the processing device 800 via the interface circuit 824, such as may facilitate communication between the processing device 800 and the local controllers 241-247, the sensors 221-227, and/or the actuators 231-237.

One or more input devices 826 may also be connected to the interface circuit 824. The input devices 826 may permit the wellsite operators 195 to enter the coded instructions 832, such as control commands, processing routines, and/or operational settings and set-points. The input devices 826 may be, comprise, or be implemented by a keyboard, a mouse, a joystick, a touchscreen, a track-pad, a trackball, an isopoint, and/or a voice recognition system, among other examples. One or more output devices 828 may also be connected to the interface circuit 824. The output devices 828 may be, comprise, or be implemented by video output devices (e.g., an LCD, an LED display, a CRT display, a touchscreen, etc.), printers, and/or speakers, among other examples. The processing device 800 may also communicate with one or more mass storage devices 830 and/or a removable storage medium 834, such as may be or include floppy disk drives, hard drive disks, compact disk (CD) drives, digital versatile disk (DVD) drives, and/or USB and/or other flash drives, among other examples.

The coded instructions 832 may be stored in the mass storage device 830, the main memory 817, the local memory 814, and/or the removable storage medium 834. Thus, the processing device 800 may be implemented in accordance with hardware (perhaps implemented in one or more chips including an integrated circuit, such as an ASIC), or may be implemented as software or firmware for execution by the processor 812. In the case of firmware or software, the implementation may be provided as a computer program product including a non-transitory, computer-readable medium or storage structure embodying computer program code (i.e., software or firmware) thereon for execution by the processor 812. The coded instructions 832 may include program instructions or computer program code that, when executed by the processor 812, may cause the various subsystems 211-217, the ancillary systems, or individual pieces of wellsite equipment of the well construction system 100 to perform intended methods, processes, and/or operations disclosed herein.

In view of the entirety of the present disclosure, including the figures and the claims, a person having ordinary skill in the art will readily recognize that the present disclosure introduces an apparatus comprising a workstation operable to control a well construction system for performing well construction operations at an oil/gas wellsite, wherein the workstation comprises: a chair for a human wellsite operator; a video output device disposed in association with the chair and operable to display information indicative of operational status of the well construction operations; and input devices disposed in association with the chair and operable for entering control commands for controlling the well construction system by the human wellsite operator while sitting in the chair, wherein the input devices comprise a touchscreen operable via finger contact by the human wellsite operator, wherein the touchscreen is operable to display a plurality of control screens each associated with a different piece of equipment of the well construction system, and wherein each control screen is operable via finger contact with the touchscreen by the human wellsite operator to control the associated piece of equipment.

The workstation may comprise or be communicatively connected to a processor and a memory operable to store a computer program code.

The chair may comprise an armrest, and the input devices may be supported by the armrest. The input devices may comprise a joystick, a button, a switch, and/or a knob.

The touchscreen may be operable by the human wellsite operator to control: a drill pipe handling equipment operable to move drill pipe at the oil/gas wellsite; a drill string make up and brake out equipment operable to connect and disconnect drill pipe; a drill string hoisting equipment operable to move a drill string within a wellbore; a drill string rotation equipment operable to rotate the drill string within the wellbore; a fluid control equipment operable to pump drilling fluid through the drill string; and a well pressure control equipment operable to control wellbore pressure.

The input devices may comprise a joystick, the touchscreen may be operable to facilitate manual control of a selected piece of equipment via the joystick, and the touchscreen may be further operable to display control functions of the joystick with respect to the selected piece of equipment.

The touchscreen may be operable to display a selection menu listing the pieces of equipment, the selection menu may be operable via finger contact by the human wellsite operator to select a piece of equipment to be controlled by the human wellsite operator, and the touchscreen may be further operable to display a control screen associated with and operable to control the selected piece of equipment.

Each control screen may display a plurality of software controls operable via finger contact with the touchscreen by the human wellsite operator to enter operational settings for the associated piece of equipment, and at least one of the software controls may indicate operational status of the associated piece of equipment. The software controls may comprise buttons, switches, selection menus, knobs, slide bars, and/or a keyboard.

The plurality of control screens may be a plurality of first control screens, the touchscreen may be further operable to display a plurality of second control screens each associated with a plurality of equipment, and each second control screen may be operable via finger contact with the touchscreen by the human wellsite operator to control automatic operation of the associated plurality of equipment. The touchscreen may be operable via finger contact by the human wellsite operator to: give manual control of a selected piece of equipment to the human wellsite operator via an associated one of the first control screens; and initiate automatic operation of a selected plurality of equipment via an associated one of the second control screens.

The video output device may be further operable to display information indicative of operational status of an equipment subsystem comprising a plurality of pieces of equipment. The information may be displayed in association with schematic drawings of the pieces of equipment forming the equipment subsystem.

The video output device may be operable to display a plurality of status screens comprising: a tripping status screen displaying information indicative of operational status of different pieces of equipment associated with tripping operations; and a drilling status screen displaying information indicative of operational status of different pieces of equipment associated with drilling operations. The plurality of status screens may further comprise one or more of: a drill pipe handling status screen displaying information indicative of operational status of different pieces of equipment associated with drill pipe handling operations; a drilling fluid status screen displaying information indicative of operational status of different pieces of equipment associated with drilling fluid mixing and pumping operations; a drill string rotation status screen displaying information indicative of operational status of different pieces of equipment associated with drill string rotation operations; and a well pressure control status screen displaying information indicative of operational status of different pieces of equipment associated with well pressure control operations.

The video output device may be further operable to automatically display different information indicative of operational status of the well construction operations based on successive stages of the well construction operations.

The video output device may be further operable to: display information indicative of operational status of selected pieces of equipment; and while the well construction operations progress through successive stages, automatically display information indicative of operational status of different pieces of equipment associated with a current stage of well construction operations.

The video output device may be further operable to display a plurality of status screens each associated with a different stage of the well construction operations, wherein each of the status screens may display information indicative of operational status of different pieces of equipment associated with a different stage of the well construction operations, and the video output device may be further operable to automatically display a different one of the status screens while the well construction operations progress through different stages of the well construction operations.

The video output device may be operable to display: an equipment status area for displaying information indicative of operational status of selected pieces of equipment; and a well construction status area for displaying information indicative of construction status of the well. The information indicative of construction status of the well may comprise one or more of wellbore depth and drill bit depth.

The video output device may be further operable to display a list of operational steps of the well construction operations to be performed.

The workstation may be further operable to: receive sensor information from a plurality of sensors of the well construction system; detect operational events occurring in the well construction system based on the received sensor information; and upon detecting one of the operational events, automatically display on the video output device information indicative of operational status of a piece of equipment associated with the detected operational event.

The workstation may be further operable to: detect an operational event associated with a piece of equipment; and upon detecting the operational event, automatically display on the video output device information indicative of corrective action to be taken by the human wellsite operator in response to the detected operational event.

The workstation may be further operable to: automatically cause the well construction system to perform the well construction operations pursuant to a predetermined construction plan; detect an operational event during the well construction operations; and upon detecting the operational event, automatically cause the well construction system to perform a predetermined corrective operation in response to the detected operational event.

The present disclosure also introduces an apparatus comprising a control system operable to control a well construction system for performing well construction operations at an oil/gas wellsite, wherein the well construction system comprises a plurality of pieces of equipment, and wherein the control system comprises: a processor and memory storing a computer program code; a touchscreen operable via finger contact with the touchscreen by a human wellsite operator to enter control commands to control automated operation of one or more of the pieces of equipment; and a video output device operable to display information indicative of operational status of the well construction system.

The control system may be or comprise a workstation comprising a chair for the human wellsite operator, and the video output device and the touchscreen may be disposed in association with the chair to permit the human wellsite operator to view the video output device and enter control commands for controlling the well construction system via the touchscreen while sitting in the chair. The chair may comprise an armrest, and the touchscreen may be supported by the armrest.

The control system may comprise a joystick, a button, a switch, and/or a knob.

The touchscreen may be operable by the human wellsite operator to control: a drill pipe handling equipment operable to move drill pipe at the oil/gas wellsite; a drill string make up and brake out equipment operable to connect and disconnect drill pipe; a drill string hoisting equipment operable to move a drill string within a wellbore; a drill string rotation equipment operable to rotate the drill string within the wellbore; a fluid control equipment operable to pump drilling fluid through the drill string; and a well pressure control equipment operable to control wellbore pressure.

The control system may comprise a joystick, the touchscreen may be operable to transfer manual control of a selected one or more pieces of equipment to the joystick, and the touchscreen may be further operable to display control functions of the joystick with respect to the selected one or more pieces of equipment.

The touchscreen may be operable to display a selection menu listing the pieces of equipment, wherein the selection menu may be operable via finger contact by the human wellsite operator to select one or more pieces of equipment to be controlled by the human wellsite operator, and wherein the touchscreen may be further operable to display a control screen associated with and operable to control the selected one or more pieces of equipment.

The touchscreen may be operable to display a plurality of control screens each associated with a different one or more pieces of equipment, and each control screen may be operable via finger contact with the touchscreen by the human wellsite operator to control the associated one or more pieces of equipment. Each control screen may display a plurality of software controls operable via finger contact with the touchscreen by the human wellsite operator to enter operational settings for the associated one or more pieces of equipment, and at least one of the software controls may indicate operational status of the associated one or more pieces of equipment. The software controls may comprise buttons, switches, selection menus, knobs, slide bars, and/or a keyboard. Each control screen may be operable by the human wellsite operator to: give manual control of the associated one or more pieces of equipment to the human wellsite operator; and initiate automatic operation of the associated one or more pieces of equipment.

The video output device may be further operable to display information indicative of operational status of selected one or more pieces of equipment. The information may be displayed in association with schematic drawings of the one or more pieces of equipment.

The video output device may be operable to display a plurality of status screens comprising: a tripping status screen displaying information indicative of operational status of different pieces of equipment associated with tripping operations; and a drilling status screen displaying information indicative of operational status of different pieces of equipment associated with drilling operations. The plurality of status screens may further comprise one or more of: a drill pipe handling status screen displaying information indicative of operational status of different pieces of equipment associated with drill pipe handling operations; a drilling fluid status screen displaying information indicative of operational status of different pieces of equipment associated with drilling fluid mixing and pumping operations; a drill string rotation status screen displaying information indicative of operational status of different pieces of equipment associated with drill string rotation operations; and a well pressure control status screen displaying information indicative of operational status of different pieces of equipment associated with well pressure control operations.

The video output device may be further operable to automatically display different information indicative of operational status of the well construction operations based on successive stages of the well construction operations.

The video output device may be further operable to: display information indicative of operational status of selected pieces of equipment; and while the well construction operations progress through successive stages, automatically display information indicative of operational status of different pieces of equipment associated with a current stage of well construction operations.

The video output device may be further operable to display a plurality of status screens each associated with a different stage of the well construction operations, each of the status screens may display information indicative of operational status of different pieces of equipment associated with a different stage of the well construction operations, and the video output device may be further operable to automatically display a different one of the status screens while the well construction operations progress through different stages of the well construction operations.

The video output device may be operable to display: an equipment status area for displaying information indicative of operational status of selected pieces of equipment; and a well construction status area for displaying information indicative of construction status of the well. The information indicative of construction status of the well may comprise one or more of wellbore depth and drill bit depth.

The video output device may be further operable to display a list of operational steps of the well construction operations to be performed.

The control system may be further operable to: receive sensor information from a plurality of sensors of the well construction system; detect operational events occurring in the well construction system based on the received sensor information; and upon detecting one of the operational events, automatically display on the video output device information indicative of operational status of a piece of equipment associated with the detected operational event.

The control system may be further operable to: detect an operational event associated with a piece of equipment; and upon detecting the operational event, automatically display on the video output device information indicative of corrective action to be taken by the human wellsite operator in response to the detected operational event.

The control system may be further operable to: automatically cause the well construction system to perform the well construction operations pursuant to a predetermined construction plan; detect an operational event during the well construction operations; and upon detecting the operational event, automatically cause the well construction system to perform a predetermined corrective operation in response to the detected operational event.

The present disclosure also introduces a method comprising operating a workstation to control a well construction system to perform well construction operations at an oil/gas wellsite, wherein operating the workstation comprises: displaying on a video output device information indicative of operational status of the well construction operations; displaying on a touchscreen a selected one of a plurality of control screens each associated with a different piece of equipment of the well construction system; and receiving control commands from a human wellsite operator via finger contact with the touchscreen to control operation of the piece of equipment associated with the selected one of the control screens.

The workstation may comprise or be communicatively connected to a processor and a memory operable to store a computer program code.

The workstation may comprise a chair for the human wellsite operator, and the video output device and the touchscreen may be disposed in association with the chair to permit the human wellsite operator to view the video output device and enter control commands for controlling the well construction system via the touchscreen while sitting in the chair.

The workstation may comprise a joystick, a button, a switch, and/or a knob.

The touchscreen may be operable by the human wellsite operator to control: a drill pipe handling equipment operable to move drill pipe at the oil/gas wellsite; a drill string make up and brake out equipment operable to connect and disconnect drill pipe; a drill string hoisting equipment operable to move a drill string within a wellbore; a drill string rotation equipment operable to rotate the drill string within the wellbore; a fluid control equipment operable to pump drilling fluid through the drill string; and a well pressure control equipment operable to control wellbore pressure.

The workstation may comprise a joystick, receiving the control commands from the human wellsite operator may comprise receiving the control commands from the human wellsite operator to facilitate manual control of a selected piece of equipment via the joystick, and the method may comprise displaying control functions of the joystick with respect to the selected piece of equipment.

The method may comprise: displaying on the touchscreen a selection menu listing the pieces of equipment of the well construction system; operating the selection menu via finger contact by the human wellsite operator to select a piece of equipment to be controlled by the human wellsite operator; and displaying on the touchscreen a control screen associated with and operable by the human wellsite operator to control the selected piece of equipment.

Each control screen may display a plurality of software controls operable via finger contact with the touchscreen by the human wellsite operator to enter operational settings for the associated piece of equipment, and at least one of the software controls may indicate operational status of the associated piece of equipment. The software controls may comprise buttons, switches, selection menus, knobs, slide bars, and/or a keyboard.

The plurality of control screens may be a plurality of first control screens, and the method may comprise: displaying on the touchscreen a plurality of second control screens each associated with a plurality of equipment; and operating each second control screen via finger contact with the touchscreen by the human wellsite operator to control automatic operation of the associated plurality of equipment.

Displaying on the video output device the information indicative of operational status of the well construction operations may comprise displaying on the video output device information indicative of operational status of an equipment subsystem comprising a plurality of pieces of equipment. The information may be displayed in association with schematic drawings of the pieces of equipment forming the equipment subsystem.

Displaying on the video output device the information indicative of operational status of the well construction operations may comprise displaying on the video output device a plurality of status screens comprising: a tripping status screen displaying information indicative of operational status of different pieces of equipment associated with tripping operations; and a drilling status screen displaying information indicative of operational status of different pieces of equipment associated with drilling operations. The plurality of status screens may further comprise one or more of: a drill pipe handling status screen displaying information indicative of operational status of different pieces of equipment associated with drill pipe handling operations; a drilling fluid status screen displaying information indicative of operational status of different pieces of equipment associated with drilling fluid mixing and pumping operations; a drill string rotation status screen displaying information indicative of operational status of different pieces of equipment associated with drill string rotation operations; and a well pressure control status screen displaying information indicative of operational status of different pieces of equipment associated with well pressure control operations.

Displaying on the video output device the information indicative of operational status of the well construction operations may comprise automatically displaying on the video output device different information indicative of operational status of the well construction operations based on successive stages of the well construction operations.

Displaying on the video output device the information indicative of operational status of the well construction operations may comprise: displaying information indicative of operational status of selected pieces of equipment; and while the well construction operations progress through successive stages, automatically displaying information indicative of operational status of different pieces of equipment associated with a current stage of well construction operations.

Displaying on the video output device the information indicative of operational status of the well construction operations may comprise: displaying on the video output device a plurality of status screens each associated with a different stage of the well construction operations, wherein each of the status screens may display information indicative of operational status of different pieces of equipment associated with a different stage of the well construction operations; and automatically displaying a different one of the status screens while the well construction operations progress through different stages of the well construction operations.

Displaying on the video output device the information indicative of operational status of the well construction operations may comprise displaying on the video output device: an equipment status area displaying information indicative of operational status of selected pieces of equipment; and a well construction status area displaying information indicative of construction status of the well. The information indicative of construction status of the well may comprise one or more of wellbore depth and drill bit depth.

The method may comprise displaying on the video output device a list of operational steps of the well construction operations to be performed.

The method may comprise: receiving sensor information from a plurality of sensors of the well construction system; detecting operational events occurring in the well construction system based on the received sensor information; and upon detecting one of the operational events, automatically displaying on the video output device information indicative of operational status of a piece of equipment associated with the detected operational event.

The method may comprise: detecting an operational event associated with a piece of equipment; and upon detecting the operational event, automatically displaying on the video output device information indicative of corrective action to be taken by the human wellsite operator in response to the detected operational event.

The method may comprise: automatically causing the well construction system to perform the well construction operations pursuant to a predetermined construction plan; detecting an operational event during the well construction operations; and upon detecting the operational event, automatically causing the well construction system to perform a predetermined corrective operation in response to the detected operational event.

The present disclosure also introduces a method comprising operating a control system to control a well construction system to perform well construction operations at an oil/gas wellsite, wherein the well construction system comprises a plurality of pieces of equipment, wherein the control system comprises a processor and memory storing a computer program code, and wherein operating the control system comprises: receiving control commands from a human wellsite operator via finger contact with a touchscreen to control operation of a selected first one or more of the pieces of equipment; and displaying on a video output device information indicative of operational status of a selected second one or more of the pieces of equipment.

The control system may be or comprise a workstation comprising a chair for the human wellsite operator, and the video output device and the touchscreen may be disposed in association with the chair to permit the human wellsite operator to view the video output device and enter control commands for controlling the well construction system via the touchscreen while sitting in the chair. The chair may comprise an armrest, and the touchscreen may be supported by the armrest.

The control system may comprise a joystick, a button, a switch, and/or a knob.

The touchscreen may be operable by the human wellsite operator to control: a drill pipe handling equipment operable to move drill pipe at the oil/gas wellsite; a drill string make up and brake out equipment operable to connect and disconnect drill pipe; a drill string hoisting equipment operable to move a drill string within a wellbore; a drill string rotation equipment operable to rotate the drill string within the wellbore; a fluid control equipment operable to pump drilling fluid through the drill string; and a well pressure control equipment operable to control wellbore pressure.

The control system may comprise a joystick, receiving the control commands from the human wellsite operator may comprise receiving the control commands from the human wellsite operator to facilitate manual control of a selected piece of equipment via the joystick, and the method may comprise displaying control functions of the joystick with respect to the selected piece of equipment.

The method may comprise: displaying on the touchscreen a selection menu listing the pieces of equipment of the well construction system; operating the selection menu via finger contact by the human wellsite operator to select the first one or more pieces of equipment to be controlled by the human wellsite operator; and displaying on the touchscreen a control screen associated with and operable by the human wellsite operator to control the selected first one or more pieces of equipment.

The method may comprise displaying on the touchscreen a plurality of control screens each associated with a different one or more pieces of equipment, and each control screen may be operable via finger contact with the touchscreen by the human wellsite operator to control the associated one or more pieces of equipment. Each control screen may display a plurality of software controls operable via finger contact with the touchscreen by the human wellsite operator to enter operational settings for the associated one or more pieces of equipment, and at least one of the software controls may indicate operational status of the associated one or more pieces of equipment. The software controls may comprise buttons, switches, selection menus, knobs, slide bars, and/or a keyboard. The method may comprise operating each control screen via finger contact with the touchscreen by the human wellsite operator to: give manual control of the associated one or more pieces of equipment to the human wellsite operator; and initiate automatic operation of the associated one or more pieces of equipment.

The information may be displayed in association with schematic drawings of the selected second one or more pieces of equipment.

The method may comprise displaying on the video output device a plurality of status screens comprising: a tripping status screen displaying information indicative of operational status of different pieces of equipment associated with tripping operations; and a drilling status screen displaying information indicative of operational status of different pieces of equipment associated with drilling operations. The plurality of status screens may further comprise one or more of: a drill pipe handling status screen displaying information indicative of operational status of different pieces of equipment associated with drill pipe handling operations; a drilling fluid status screen displaying information indicative of operational status of different pieces of equipment associated with drilling fluid mixing and pumping operations; a drill string rotation status screen displaying information indicative of operational status of different pieces of equipment associated with drill string rotation operations; and a well pressure control status screen displaying information indicative of operational status of different pieces of equipment associated with well pressure control operations.

The method may comprise automatically displaying on the video output device information indicative of operational status of different one or more pieces of equipment based on successive stages of the well construction operations.

The method may comprise, while the well construction operations progress through successive stages, automatically displaying on the video output device information indicative of operational status of different pieces of equipment associated with a current stage of well construction operations.

The method may comprise: displaying on the video output device a plurality of status screens each associated with a different stage of the well construction operations, wherein each of the status screens may display information indicative of operational status of different pieces of equipment associated with a different stage of the well construction operations; and automatically displaying a different one of the status screens while the well construction operations progress through different stages of the well construction operations.

The method may comprise displaying on the video output device: an equipment status area displaying information indicative of operational status of the selected second one or more pieces of equipment; and a well construction status area displaying information indicative of construction status of the well. The information indicative of construction status of the well may comprise one or more of wellbore depth and drill bit depth.

The method may comprise displaying on the video output device a list of operational steps of the well construction operations to be performed.

The method may comprise: receiving sensor information from a plurality of sensors of the well construction system; detecting operational events occurring in the well construction system based on the received sensor information; and upon detecting one of the operational events, automatically displaying on the video output device information indicative of operational status of a piece of equipment associated with the detected operational event.

The method may comprise: detecting an operational event associated with a piece of equipment; and upon detecting the operational event, automatically displaying on the video output device information indicative of corrective action to be taken by the human wellsite operator in response to the detected operational event.

The method may comprise: automatically causing the well construction system to perform the well construction operations pursuant to a predetermined construction plan; detecting an operational event during the well construction operations; and upon detecting the operational event, automatically causing the well construction system to perform a predetermined corrective operation in response to the detected operational event.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the scope of the present disclosure, and that they may make various changes, substitutions and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. An apparatus comprising:
    a workstation operable to control a well construction system for performing well construction operations at an oil/gas wellsite according to a well construction plan that comprises project phases, wherein the workstation comprises:
        a chair for a human wellsite operator, wherein the chair comprises a left armrest, a left touchscreen on the left armrest, a right armrest, and a right touchscreen on the right armrest wherein;
        a video output device disposed in association with the chair and operable to display:
            an equipment status area for displaying information indicative of operational status of selected pieces of equipment;
            a well construction status area for displaying information indicative of construction status of the well, wherein the information indicative of construction status of the well comprises one or more of wellbore depth and drill bit depth; and
            a list of operational steps of the well construction operations to be performed, wherein display of the list comprises a concurrent display of two or more of the operational steps and, responsive to detection of an event based on sensor data, one or more corrective actions for the event, wherein the list of operational steps is accompanied by a field that indicates that the list of operational steps are for one of the project phases, and wherein, the one or more corrective actions are accompanied by a field that indicates that the one or more corrective actions are for the event being of a particular event type;
        input devices disposed in association with the chair and operable for entering control commands for controlling the well construction system by the human wellsite operator while sitting in the chair, wherein the input devices comprise the left touchscreen operable via finger contact by the human wellsite operator and the right touchscreen operable via finger contact by the human wellsite operator, wherein each of the left touchscreen and the right touchscreen is operable to display a plurality of control screens each associated with a different piece of equipment of the well construction system, and wherein each control screen is operable via finger contact with a corresponding one of the left touchscreen and the right touchscreen by the human wellsite operator to control the associated piece of equipment.

2. The apparatus of claim 1 wherein one or more of the left touchscreen and the right touchscreen is operable to display a selection menu listing the selected pieces of equipment, wherein the selection menu is operable via finger contact by the human wellsite operator to select a piece of equipment to be controlled by the human wellsite operator, and wherein one or more of the left touchscreen and the right touchscreen is further operable to display a control screen associated with and operable to control the selected piece of equipment.

3. The apparatus of claim 1 wherein the plurality of control screens is a plurality of first control screens, wherein one or more of the left touchscreen and the right touchscreen is further operable to display a plurality of second control screens each associated with a plurality of equipment, and wherein each second control screen is operable via finger contact with a corresponding one or more of the left touchscreen and the right touchscreen by the human wellsite operator to control automatic operation of the associated plurality of equipment.

4. The apparatus of claim 3 wherein one or more of the left touchscreen and the right touchscreen is operable via finger contact by the human wellsite operator to:
    give manual control of a selected piece of equipment to the human wellsite operator via an associated one of the first control screens; and
    initiate automatic operation of a selected plurality of equipment via an associated one of the second control screens.

5. The apparatus of claim 1 wherein the video output device is further operable to display a text message area for displaying to the human wellsite operator sitting in the chair:
    sent text messages written and sent by the human wellsite operator via the workstation to other humans; and
    received text messages written and sent by the other humans.

6. The apparatus of claim 5 wherein one or more of the left touchscreen and the right touchscreen is operable to display a software keyboard that can be used by the human wellsite operator sitting in the chair to write text messages to be sent to the other humans.

7. The apparatus of claim 1, wherein the list of operational steps is accompanied by a field that indicates that the list of operational steps is to be completed within an estimated completion time.

8. An apparatus comprising:
a control system operable to control a well construction system for performing well construction operations at an oil/gas wellsite according to a well construction plan that comprises project phases, wherein the well construction system comprises a plurality of pieces of equipment, and wherein the control system comprises:
a processor and memory storing a computer program code;
a left touchscreen and a right touchscreen operable via finger contact therewith by a human wellsite operator to enter control commands to control automated operation of one or more of the pieces of equipment; and
a video output device operable to display information indicative of operational status of the well construction system and operable to display a list of operational steps of the well construction operations to be performed, wherein display of the list comprises a concurrent display of two or more of the operational steps and wherein the list of operational steps is accompanied by a field that indicates that the list of operational steps are for one of the project phases,
wherein the control system is further operable to:
receive sensor information from a plurality of sensors of the well construction system;
detect unintended operational events occurring in the well construction system based on the received sensor information; and
upon detecting one of the unintended operational events:
automatically display on the video output device information indicative of operational status of a piece of equipment associated with the detected unintended operational event;
automatically replace the display of the list by display on the video output device of one or more corrective actions accompanied by a field that indicates that the one or more corrective actions are for the detected unintended operational event being of a particular event type; and
automatically cause the well construction system to perform at least one of the one or more corrective actions to counteract the detected unintended operational event.

9. The apparatus of claim 8 wherein the control system is or comprises a workstation comprising a chair for the human wellsite operator, and wherein the video output device, the left touchscreen and the right touchscreen are separate devices that are disposed in association with the chair at different positions to permit the human wellsite operator to view the video output device and enter control commands for controlling the well construction system via one or more of the left touchscreen and the right touchscreen while sitting in the chair, wherein the chair comprises a left armrest and a right armrest, wherein the left touchscreen is on the left armrest and the right touchscreen is on the right armrest, and wherein the display information displayed to the video output device is selectable via the finger contact with one or more of the left touchscreen and the right touchscreen.

10. The apparatus of claim 8 wherein one or more of the left touchscreen and the right touchscreen is operable to display a selection menu listing the pieces of equipment, wherein the selection menu is operable via finger contact by the human wellsite operator to select one or more pieces of equipment to be controlled by the human wellsite operator, and wherein one or more of the left touchscreen and the right touchscreen is further operable to display a control screen associated with and operable to control the selected one or more pieces of equipment.

11. The apparatus of claim 8 wherein one or more of the left touchscreen and the right touchscreen is operable to display a plurality of control screens each associated with a different one or more pieces of equipment, and wherein each control screen is operable via finger contact with a corresponding one of the one or more of the left touchscreen and the right touchscreen by the human wellsite operator to control the associated one or more pieces of equipment.

12. The apparatus of claim 11 wherein each control screen displays a plurality of software controls operable via finger contact with one or more of the left touchscreen and the right touchscreen by the human wellsite operator to enter operational settings for the associated one or more pieces of equipment, and wherein at least one of the software controls indicates operational status of the associated one or more pieces of equipment.

13. The apparatus of claim 11 wherein each control screen is operable by the human wellsite operator to:
give manual control of the associated one or more pieces of equipment to the human wellsite operator; and
initiate automatic operation of the associated one or more pieces of equipment.

14. The apparatus of claim 8 wherein the video output device is operable to display a plurality of status screens comprising:
a tripping status screen displaying information indicative of operational status of different pieces of equipment associated with tripping operations; and
a drilling status screen displaying information indicative of operational status of different pieces of equipment associated with drilling operations.

15. The apparatus of claim 8 wherein the video output device is further operable to:
display information indicative of operational status of selected pieces of equipment; and
while the well construction operations progress through successive stages, automatically display information indicative of operational status of different pieces of equipment associated with a current stage of well construction operations.

16. The apparatus of claim 8 wherein the video output device is operable to display:
an equipment status area for displaying information indicative of operational status of selected pieces of equipment; and
a well construction status area for displaying information indicative of construction status of the well.

17. The apparatus of claim 16 wherein the information indicative of construction status of the well further comprises one or more of wellbore depth and drill bit depth.

18. The apparatus of claim 9 wherein the video output device is further operable to display a text message area for displaying to the human wellsite operator sitting in the chair:
sent text messages written and sent by the human wellsite operator via the workstation to other humans; and
received text messages written and sent by the other humans.

19. The apparatus of claim 18 wherein one or more of the left touchscreen and the right touchscreen is operable to display a software keyboard that can be used by the human wellsite operator sitting in the chair to write text messages to be sent to the other humans.

* * * * *